United States Patent
Zhang et al.

(10) Patent No.: US 10,701,678 B2
(45) Date of Patent: Jun. 30, 2020

(54) METHOD, SYSTEM AND APPARATUS FOR DOWNLINK SHARED CHANNEL RECEPTION IN COOPERATIVE MULTIPOINT TRANSMISSIONS

(71) Applicant: InterDigital Patent Holdings, Inc., Wilmington, DE (US)

(72) Inventors: Guodong Zhang, Syosset, NY (US); Ghyslain Pelletier, Montreal (CA); Afshin Haghighat, Ile-Bizard (CA); Paul Marinier, Brossard (CA); Christopher Cave, Dollard-des-Ormeaux (CA); Pascal M. Adjakple, Great Neck, NY (US); Allan Y. Tsai, Boonton, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 136 days.

(21) Appl. No.: 15/864,667

(22) Filed: Jan. 8, 2018

(65) Prior Publication Data

US 2018/0132215 A1  May 10, 2018

Related U.S. Application Data

(63) Continuation of application No. 14/459,034, filed on Aug. 13, 2014, now Pat. No. 9,867,174, which is a
(Continued)

(51) Int. Cl.
*H04W 72/04* (2009.01)
*H04B 7/024* (2017.01)
(Continued)

(52) U.S. Cl.
CPC .......... *H04W 72/042* (2013.01); *H04B 7/024* (2013.01); *H04L 5/0035* (2013.01); *H04W 68/005* (2013.01)

(58) Field of Classification Search
CPC .. H04W 68/005; H04W 72/042; H04B 7/024; H04L 5/0035; H04L 88/02
See application file for complete search history.

(56) References Cited

U.S. PATENT DOCUMENTS

| 8,300,587 B2 | 10/2012 | Chmiel |
| 2009/0249027 A1 | 10/2009 | Kim et al. |

(Continued)

FOREIGN PATENT DOCUMENTS

| KR | 10-2010-0088083 | 8/2010 |
| KR | 10-2010-0089744 | 8/2010 |

(Continued)

OTHER PUBLICATIONS

Nokia et al., "R1-093304 Considerations on Initialization and Mapping of DM-RS Sequence", Aug. 24-28, 2009, Nokia, 3GPP TSG RAN WG1 #58 Meeting, pp. 1-4 (Year: 2009).*

(Continued)

*Primary Examiner* — Un C Cho
*Assistant Examiner* — Shah M Rahman
(74) *Attorney, Agent, or Firm* — Julian F. Santos

(57) ABSTRACT

A method and apparatus may be used to enable reception of a downlink (DL) shared channel in a cooperative multipoint transmission (CoMP). The method and apparatus may determine whether CoMP is applied to a transmission. The method and apparatus may acquire other CoMP related information. The method and apparatus may apply to non-transparent CoMP scenarios.

18 Claims, 10 Drawing Sheets

Related U.S. Application Data continuation of application No. 13/345,611, filed on Jan. 6, 2012, now Pat. No. 8,842,622.

(60) Provisional application No. 61/430,647, filed on Jan. 7, 2011, provisional application No. 61/480,746, filed on Apr. 29, 2011, provisional application No. 61/556,062, filed on Nov. 4, 2011.

(51) Int. Cl.
*H04L 5/00* (2006.01)
*H04W 68/00* (2009.01)

(56) References Cited

U.S. PATENT DOCUMENTS

| | | |
|---|---|---|
| 2010/0195615 A1 | 8/2010 | Lee et al. |
| 2010/0303034 A1 | 12/2010 | Chen et al. |
| 2010/0322178 A1 | 12/2010 | Li et al. |
| 2011/0038310 A1 | 2/2011 | Chmiel et al. |
| 2011/0038344 A1 | 2/2011 | Chmiel et al. |
| 2011/0044250 A1* | 2/2011 | Han .................. H04B 7/0689 370/328 |
| 2011/0077038 A1 | 3/2011 | Montojo et al. |
| 2011/0085503 A1 | 4/2011 | Nam et al. |
| 2011/0287804 A1 | 11/2011 | Seo et al. |
| 2012/0057516 A1* | 3/2012 | Ahn .................... H04W 72/04 370/312 |
| 2012/0069790 A1* | 3/2012 | Chung ............... H04W 72/042 370/315 |
| 2012/0099536 A1 | 4/2012 | Lee et al. |
| 2012/0176982 A1* | 7/2012 | Zirwas ................ H04B 7/024 370/329 |
| 2012/0236798 A1* | 9/2012 | Raaf .................... H04L 5/0048 370/328 |
| 2012/0329468 A1* | 12/2012 | Chmiel ............... H04L 5/0007 455/450 |
| 2013/0039348 A1 | 2/2013 | Hu et al. |
| 2013/0064216 A1* | 3/2013 | Gao ..................... H04L 5/0053 370/329 |
| 2013/0242853 A1 | 9/2013 | Seo et al. |
| 2015/0117291 A1* | 4/2015 | Seo ....................... H04L 5/001 370/312 |

FOREIGN PATENT DOCUMENTS

| | | |
|---|---|---|
| KR | 10-2010-0127857 | 12/2010 |
| KR | 10-2010-0137357 | 12/2010 |
| RU | 2008115475 | 10/2009 |
| WO | WO-2006/138336 | 12/2006 |
| WO | WO-2007/035447 | 3/2007 |
| WO | WO-2010/081166 | 7/2010 |

OTHER PUBLICATIONS

"Decision on Grant", Russian Patent Application No. 2013136857, Nov. 2, 2016, 15 pages.

"Decision on Grant (English Translation)", Russian Patent Application No. 2013136857, Nov. 2, 2016, 9 pages.

"DL Control Signalling for Dual-layer Beamforming in Rel'9", 3GPP Tdoc R1-093892, 3GPP TSG RAN WG1 Meeting #58bis, Miyazaki, Japan, Oct. 12-16, 2009, 4 pages.

"International Search Report and Written Opinion", International Application No. PCT/US2012/020547, dated Apr. 2, 2012, 15 pages.

"Notice of Allowance", Korean Patent Application No. 10-2013-7020928, dated May 10, 2018, 2 pages.

"Official Notice of Rejection", Japanese Patent Application No. 2013-548590, dated Nov. 24, 2015, 5 pages.

"Official Notice of Rejection (English Translation)", Japanese Patent Application No. 2013-548590, dated Nov. 24, 2015, 6 pages.

Nokia Siemens Networks, et al., "Considerations on Initialization and Mapping of DM-RS Sequence", 3GPP Tdoc R1-093890, 3GPP TSG RAN WG1 #58bis Meeting, Miyazaki, Japan, Oct. 12-16, 2009, 5 pages.

Panasonic, "DL DM-RS with Inter-cell considerations", 3GPP Tdoc R1-0911747, 3GPP TSG RAN WG1 Meeting #57 San Francisco, USA, May 4-8, 2009, 5 pages.

Pantech, "DL DM-RS enhancements for Rel-11", 3GPP Tdoc R1-113830, 3GPP TSG RAN WG1 Meeting #67, San Francisco, USA, Nov. 14-18, 2011, 4 pages.

Samsung, et al., "New Study Item Proposal: Coordinated Multi-Point Operation for LTE", 3GPP Tdoc RP-100370, 3GPP TSG RAN#47, Vienna, Austria, RP-100370, Mar. 16-19, 2010, 5 pages.

Samsung, "Scrambling sequence for CoMP", 3GPP Tdoc R1-101178, 3GPP TSG RAN WG1 meeting #60, San Francisco, USA, 3 pages.

\* cited by examiner

METHOD, SYSTEM AND APPARATUS FOR DOWNLINK SHARED CHANNEL RECEPTION IN COOPERATIVE MULTIPOINT TRANSMISSIONS

CROSS-REFERENCE TO RELATED APPLICATIONS

This application is a continuation of U.S. patent application Ser. No. 14/459,034, filed 13 Aug. 2014, which is a continuation of U.S. patent application Ser. No. 13/345,611, filed 6 Jan. 2012, which claims the benefit of (i) U.S. Provisional (Prov.) Pat. Appln. Ser. No. 61/430,647, filed on 7 Jan. 2011, and entitled "Method and Apparatus for Demodulation Reference Signal Provisioning, Scrambling and Downlink Control for Coordinated Multi-Point Transmission and Reception", (ii) U.S. Prov. Pat. Appln. Ser. No. 61/480,746, filed on 29 Apr. 2011, and entitled "Method and Apparatus for Downlink Shared Channel Reception in Cooperative Multipoint Transmission", and (iii) U.S. Prov. Pat. Appln. Ser. No. 61/556,062, filed on 4 Nov. 2011, and entitled "Method and Apparatus for Downlink Shared Channel Reception in Cooperative Multipoint Transmission". U.S. patent application Ser. No. 13/345,611 and each of the U.S. Prov. Pat. Appln. Ser. Nos. 61/430,647, 61/480,746 and 61/556,062 are incorporated herein by reference.

BACKGROUND

Field

This application is related to wireless communications.

Related Art

A wireless (e.g., cellular) communications system may be evaluated based on its average cell throughput and its cell-edge throughput. Improving both the average cell throughput and cell-edge throughput performance may be generally desirable. While the average cell throughput performance may be improved by increasing received signal strength using, for example, power boosting techniques, cell-edge users may nonetheless experience low received signal strength, and the cell-edge throughput performance may be affected by the inter-cell interference (ICI). This may be true for wireless communications systems designed to operate with (and operate using) a frequency reuse factor of one, or close to one. This level of frequency reuse may be a key objective of communications systems employing orthogonal frequency division multiplex (OFDM) based networks, including, for example, fourth generation (4G) and future generation networks.

Notwithstanding such objective, operating using the frequency re-use factor of one, or close to one, implies that the wireless communications systems may become interference limited due to all cells being permitted to transmit (or transmitting) on all time and frequency resources simultaneously. Unfortunately, power boosting may not improve cell-edge throughput performance because signal strengths may be increased for both serving cell and interfering signals. Other techniques for improving cell-edge and other throughput performance, such as, coordinated multi-point (CoMP) transmission and reception, may be desirable.

SUMMARY

Methods, systems and apparatus for downlink shared channel reception in Cooperative Multi-Point (CoMP) transmissions are provided. Included among such methods, systems and apparatus is a method that may include receiving, at a wireless transmit and/or receive unit (WTRU), a first set of information for signaling to the WTRU that a first coordinated downlink transmission to the WTRU is forthcoming; determining, based on the first set of information, a first set of reception parameters to use to generate a first set of demodulation reference signals (DM-RS) for receiving the first coordinated downlink transmission, wherein the first set of reception parameters comprise a first identifier and a first scrambling identity; receiving, at the WTRU, a second set of reception information for signaling to the WTRU that a second coordinated downlink transmission to the WTRU is forthcoming; and determining, based on the second set of information, a second set of reception parameters to use to generate a second set of DM-RS for receiving the second coordinated downlink transmission, wherein the second set of reception parameters comprise a second identifier and a second scrambling identity.

Further included in the methods, systems and apparatus are a method and an apparatus that may be used to determine whether CoMP is applied to a transmission. The method and apparatus may be used to acquire other CoMP related information. The method and apparatus may apply to non-transparent CoMP scenarios. The methods may include, for example, dynamic methods and other state-based methods.

Also included among methods, systems and apparatus are a method and an apparatus that may be used to provide DM-RS ports and sequence to support the operation of CoMP and allow a CoMP device to demodulate a CoMP physical downlink shared channel (PDSCH).

Further included among methods, systems and apparatus are a method and an apparatus the may be used to detect a presence of co-scheduled CoMP devices in a multi-user multiple input multiple output (MU-MIMO) operation. Such method and apparatus may be used if a transmission (Tx) point uses system parameters other than its own to initialize the DM-RS sequence of a CoMP device that receives the PDSCH from the Tx point.

PDSCH scrambling may be performed to support the operation of CoMP and may allow a CoMP device to descramble the received CoMP PDSCH.

Included among methods, systems and apparatus are also a method and an apparatus that be used to maintain hybrid automatic repeat request (HARQ) processes across Tx points for JT CoMP with different data across Tx points.

The methods, systems and apparatus may also include a method and an apparatus that may be used to compensate a timing offset between Tx points at a receiver for JT CoMP with the same data across Tx points using different DM-RS sequences and/or ports.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Example Communications Systems Architecture

FIGS. 1A-1F are block diagrams illustrating an example communications system 100 in which one or more embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Figure 1A:
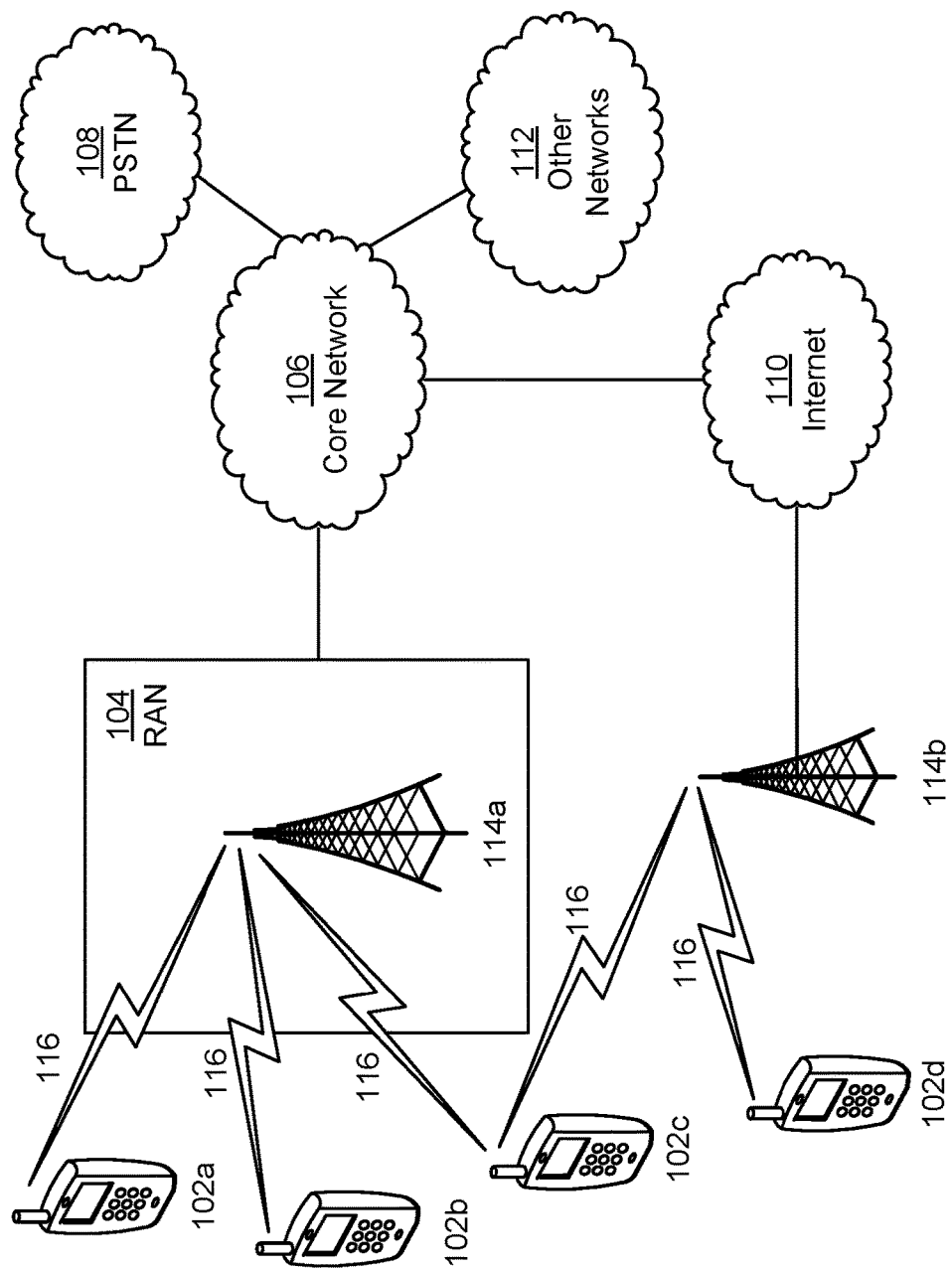
FIG. 1A is a diagram of an example communications system in which one or more embodiments may be implemented.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
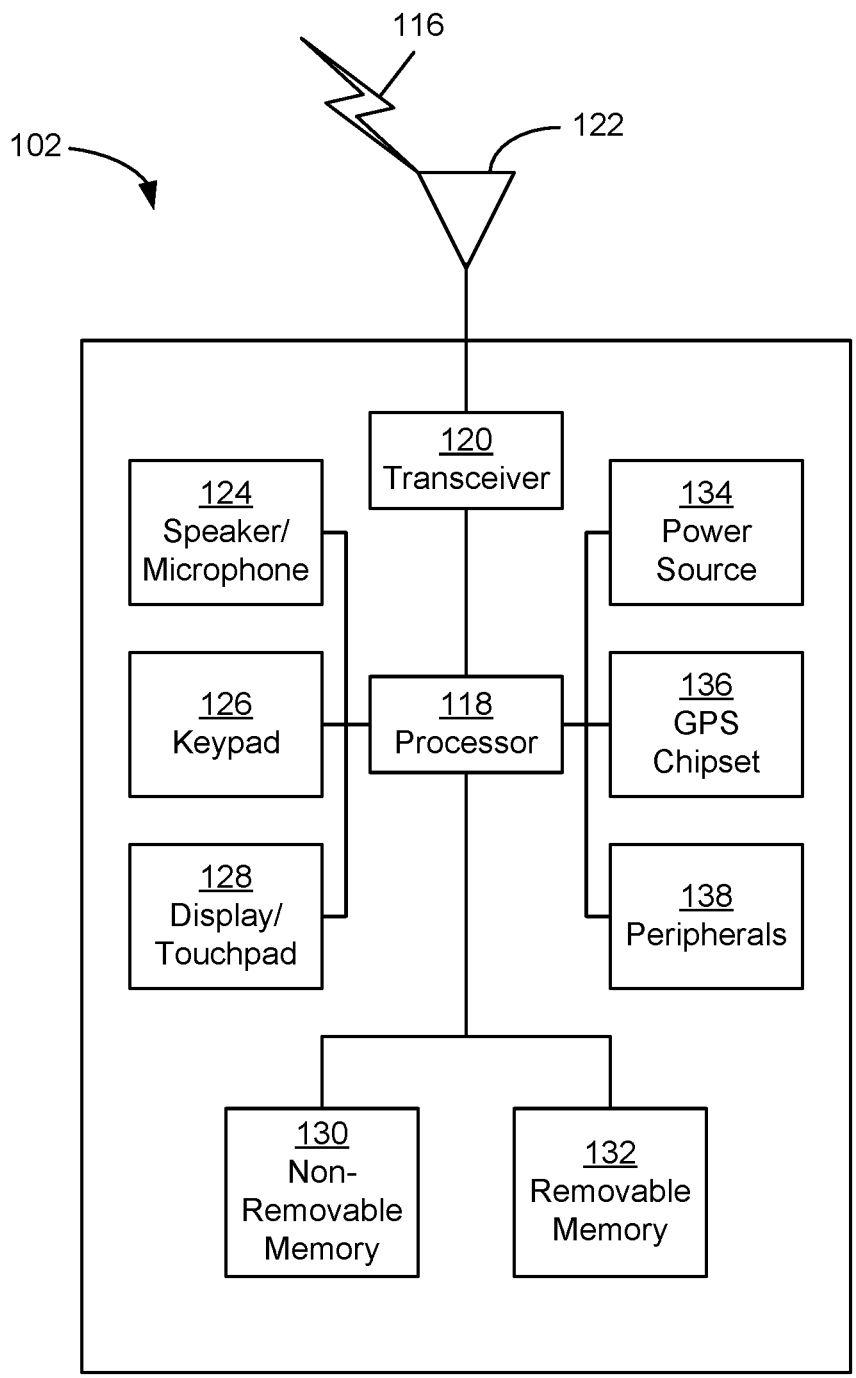
FIG. 1B is a system diagram of an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 19, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 19 and/or the removable memory 132. The non-removable memory 19 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
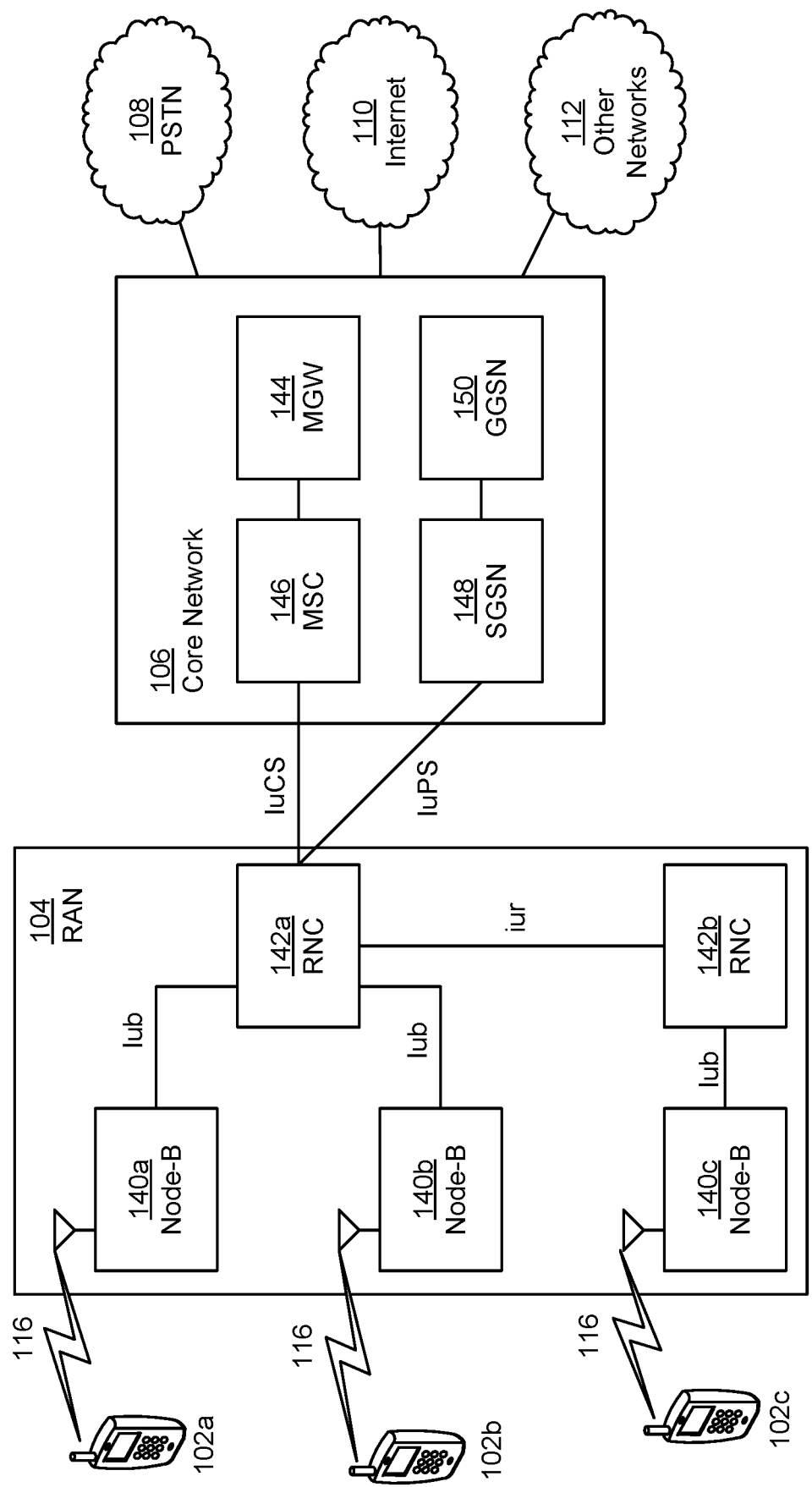
FIG. 1C is a system diagram of an example radio access network and an example core network that may be used within the communications system illustrated in FIG. 1A.

FIG. 1C is a system diagram illustrating the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
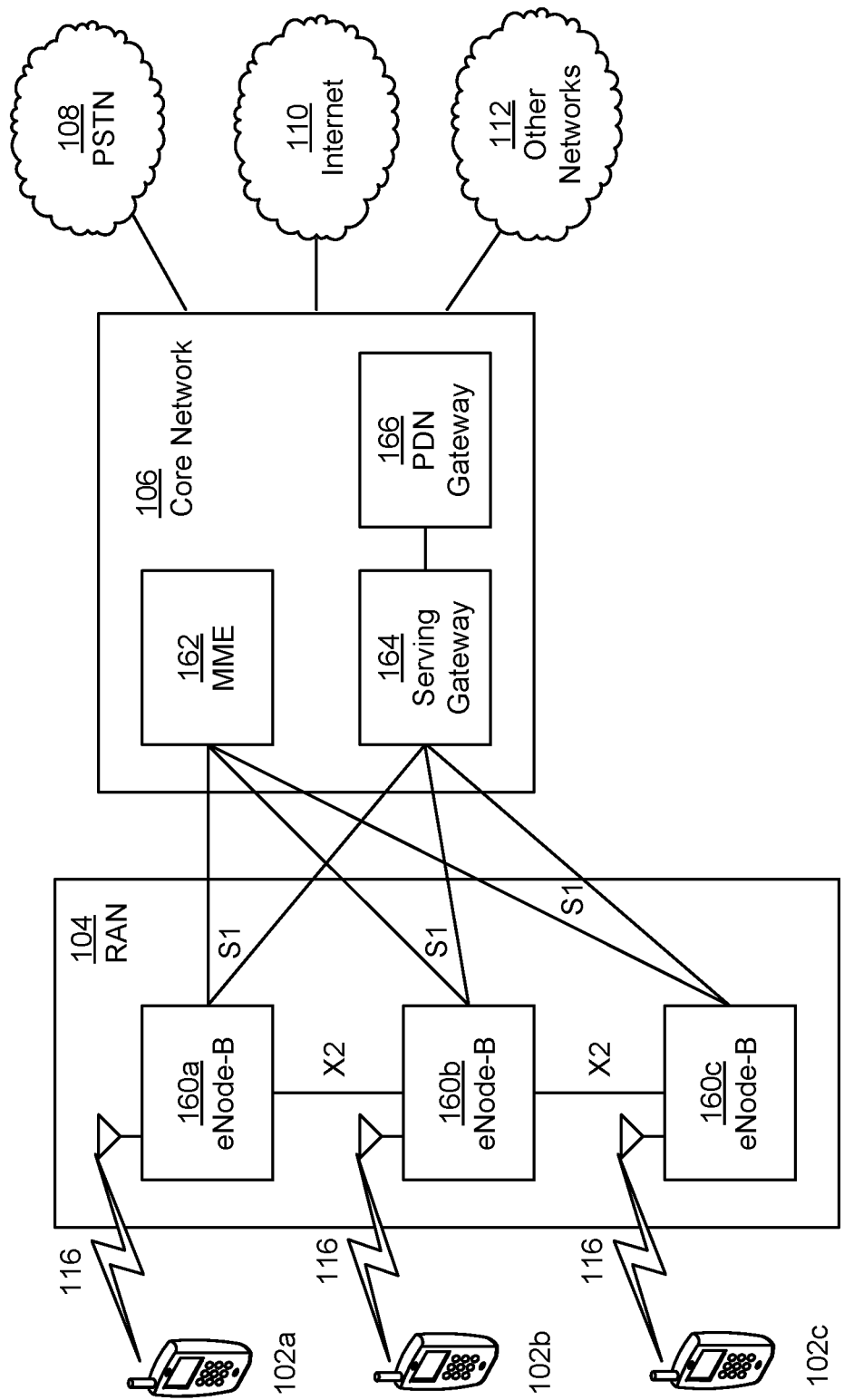
FIG. 1D is a system diagram of another example radio access network and an example core network that may be used within the communications system illustrated in FIG. 1A.

FIG. 1D is a system diagram illustrating the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
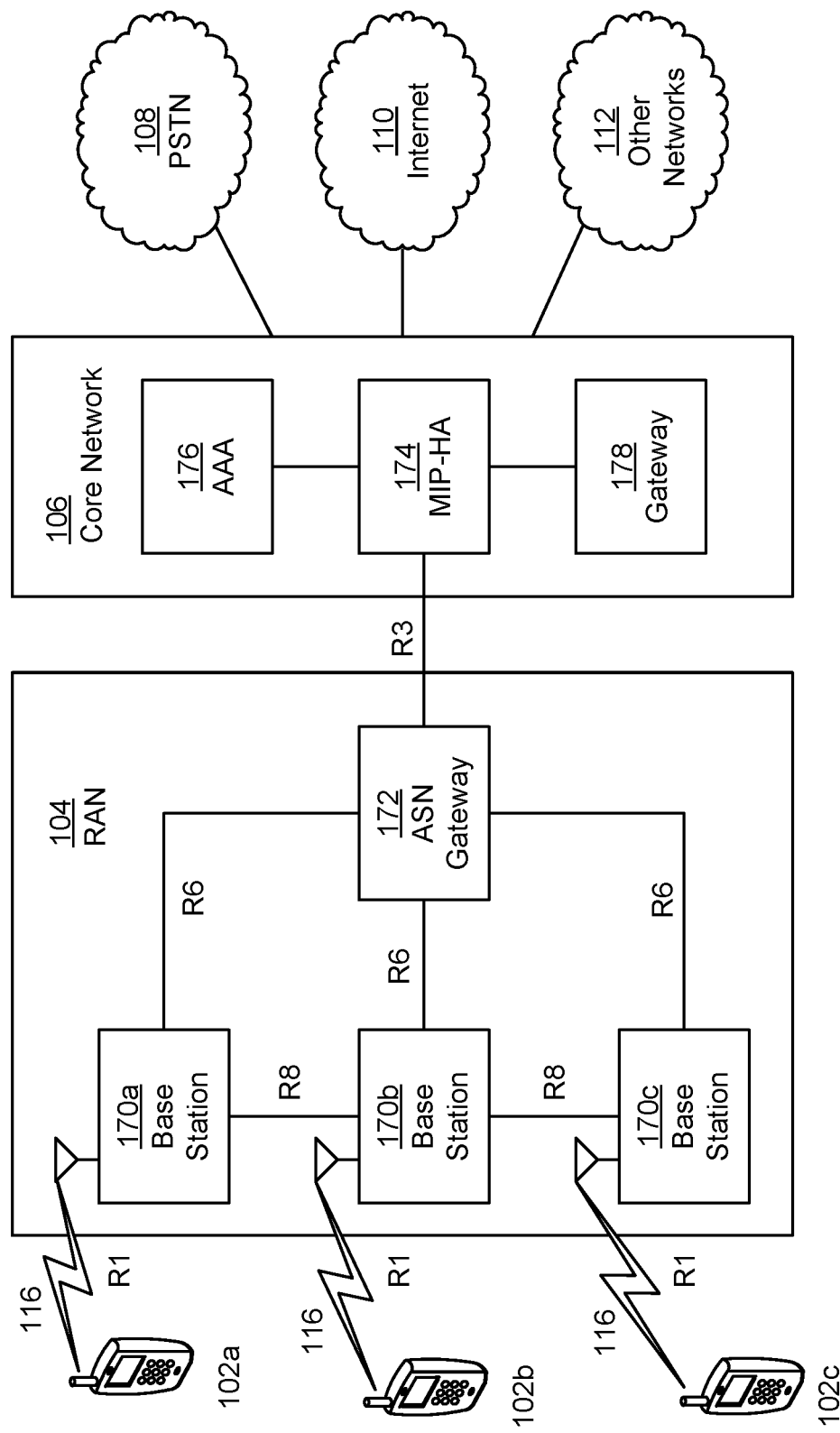
FIG. 1E is a system diagram of another example radio access network and an example core network that may be used within the communications system illustrated in FIG. 1A.

FIG. 1E is a system diagram illustrating the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In various embodiments, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

In various embodiments, the communications network 100 may be adapted for Coordinated Multi-Point transmission and reception (CoMP). CoMP, in general, may refer to a mode of transmission and reception in which multiple spatially-diverse transmission (Tx) points, through some form of coordination, transmit signals (transmissions) to a receiver, such as a WTRU, provisioned or otherwise equipped to receive such coordinated downlink transmissions. As referred to herein, the terms "Tx point" may refer to any antenna port or subset of geographically co-located antenna ports from a network that may be transmitting to, or receiving from the WTRU. A set of Tx points configured or activated for a given WTRU may or may not belong to the same physical cell identity. The Tx point may transmit one channel station information reference signal (CSI-RS) or one set of CSI-RS. The Tx point may also transmit one cell-specific reference signal (CRS) or one set of CRS. Coordination, in general, includes coordination of scheduling and/or transmission parameters, and/or coordination of data delivery, among the spatially-diverse Tx points (or a subset thereof). The form of such coordination generally falls within one of a plurality of defined categories for CoMP (CoMP categories). The form of coordination, however, may change from one CoMP category to another, as appropriate (e.g., depending on channel conditions and/or movement of the WTRU). Examples of the CoMP categories may include Joint Processing (JP) CoMP, and Coordinated Scheduling/Coordinated Beamforming (CS/CB).

The JP CoMP may include a number of sub-categories, including, for example, Joint Transmission (JT) CoMP, and dynamic point (or cell) selection (DPS). For any of the JP CoMP, JT CoMP and DPS, data may be made available at each Tx point of a CoMP cooperating set (i.e., a set of Tx points that may directly or indirectly participate in the coordinated downlink transmissions, including, for example, corresponding physical downlink shared channels (PDSCHs) of the coordinated downlink transmissions). Under JT CoMP, multiple Tx points of CoMP cooperating set may be scheduled to and actively transmit the coordinated downlink transmissions at or within a given time period (e.g., simultaneously). The multiple Tx points actively transmitting the coordinated downlink transmissions (CoMP Tx points) may be a subset of or the entire CoMP cooperating set. This transmission method may coherently or non-coherently improve the received signal quality of the WTRU 102 and/or actively cancel interference for other WTRUs. Under DPS, each of the coordinated downlink transmissions is scheduled and transmitted from one CoMP Tx point within the CoMP cooperating set at a time (e.g., every subframe). The Tx point selected to be the CoMP Tx point for the DPS coordinated downlink transmissions may change dynamically within the CoMP cooperating set.

For CS/CB, data for CS/CB transmissions may be made available at a serving cell for the WTRU 102. The serving cell or serving Tx point, as sometimes used herein, may refer to a cell (or Tx point thereof) adapted to transmit physical downlink control channel (PDCCH) or enhanced PDCCH (E-PDCCH) assignments, and such cell or Tx point may be, for example, a single cell. User scheduling and/or beamforming decisions, however, may be made with coordination among cells corresponding to the CoMP cooperating set. The WTRU 102 may decode a PDCCH or an E-PDCCH based on the knowledge of the antenna port (or set thereof) and associated reference signal (e.g., CRS or DM-RS) only, and might not require knowledge of the actual Tx point used for the transmission of such signals.

Figure 1F:
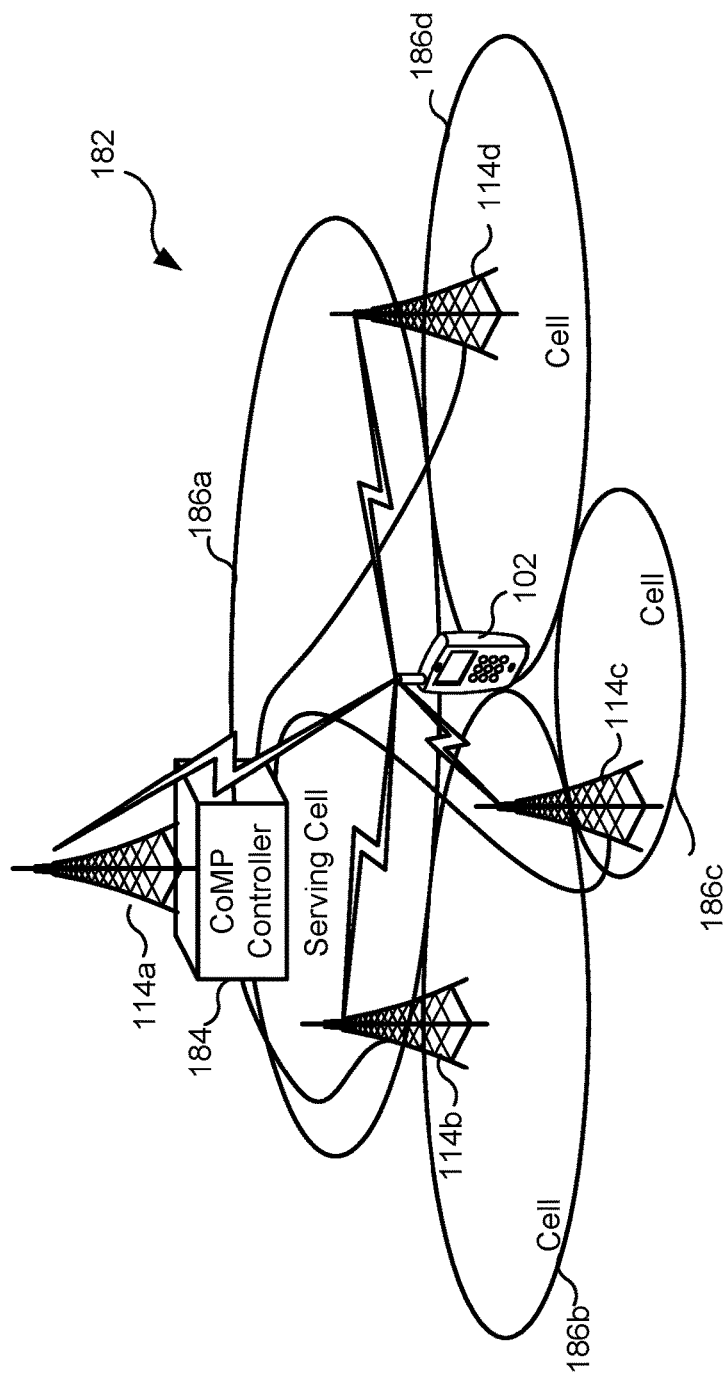
FIG. 1F is a block diagram illustrating an example Coordinated Multi-Point (CoMP) wireless communication network in which one or more embodiments may be implemented.

FIG. 1F is a block diagram illustrating an example CoMP network 180 for use with a communications system, such as, the communications system 100. The CoMP network 180 may include a CoMP cooperating set 182 and a CoMP controller 184. The CoMP cooperating set 182 may include spatially-diverse Tx points 114a-114d (e.g., geographically-separated base stations, eNBs, etc.) that may directly or indirectly participate in the coordinated downlink transmissions to the WTRU 102, including, for example, forming one or more PDSCHs of the coordinated downlink transmissions for reception by the WTRU 102. The Tx points 114a-114d may be communicatively coupled with the CoMP controller 184, via, for example, fast backhauls and/or X2 interfaces. The Tx points 114a-114d may define respective cells, namely, serving cell 186a of WTRU 102 and non-serving cells 186b-186d. Being a serving cell, the serving cell 186a (e.g., the Tx point 114a) may transmit to the WTRU 102 various information to enable the WTRU 102 to receive the coordinated downlink transmissions, such as, for example, PDCCH assignments; downlink control information (DCI); information for signaling to the WTRU 102 to receive the coordinated downlink transmissions from the CoMP Tx points, including the CoMP Tx points other than the serving cell; and the like. The Tx points 114a-114d may also logically belong to the same cell. In this case, the Tx points 114a-114d may transmit the same set of common reference signals (CRS), but transmit other reference signals (such as, CSI-RS and/or DM-RS) according to point-specific parameters.

The Tx points 114a-114d may include respective sets of cell-specific system parameters corresponding to their respective cells 182a-182d, and/or point-specific parameters. Each set of cell-specific system parameters may include, for example, a cell identifier associated with the corresponding cell (cell ID), a timeslot index within a radio frame associated with the coordinated downlink transmission and/or a scrambling identity (scrambling ID) associated with the corresponding cell (cell-specific scrambling ID). A set of point-specific parameters may include a set of CSI-RS configuration parameters, possibly including an identifier for the transmission point. For non-transparent JP CoMP, the Tx points 114a-114d may use their respective sets of cell-specific system parameters and/or point-specific parameters to generate and transmit the coordinated downlink transmissions and/or associated control information to the WTRU 102. For example, the cell-specific system parameters may be used with various processes for (i) scrambling the PDSCH of the coordinated downlink transmissions, (ii) determining appropriate usage of ports for UE-specific and/or demodulation reference signals (collectively "DM-RS"); (iii) scrambling of DM-RS sequences; (iv) precoding of the coordinated downlink transmissions and DM-RS, (v) assigning the PDCCH(s) to assign the PDSCH(s) of the coordinated downlink transmissions.

In general, the DM-RS for the PDSCH(s) of the coordinated downlink transmission may be transmitted, from each CoMP Tx point, on antenna ports p=5, p=7, p=8 or p=7, 8, . . . , υ+6, where υ may be a number of layers used for transmission of the PDSCH(s). The DM-RS may be present and/or be a valid reference for the WTRU 102 to use with performing demodulation of the PDSCH(s) if the PDSCH(s) of the coordinated downlink transmissions are associated with the corresponding antenna port(s).

For any of the antenna ports p∈{7, 8 . . . υ+6}, each CoMP Tx point may generate the DM-RS for the PDSCH(s) using a reference-signal sequence, such as:

$$r(m) = \frac{1}{\sqrt{2}}(1 - 2 \cdot c(2m)) + j\frac{1}{\sqrt{2}}(1 - 2 \cdot c(2m+1)), \quad (1)$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

where c(i) is a pseudo-random sequence. The pseudo-random sequence c(i) may be defined by, for example, a length-31 Gold sequence. This length-31 Gold sequence may be, for example, the length-31 Gold sequence set forth in LTE-A. The output sequence c(n) of length $M_{PN}$, where n=0, 1, ..., $M_{PN}$−1, may be defined by:

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad (2)$$

where $N_C$=1600, the first m-sequence may be initialized with $x_1(0)$=1, $x_1(n)$=0, n=1, 2, ..., 30, and initialization of the second m-sequence may be denoted by $c_{init}=\Sigma_{i=0}^{30} x_2(i)\cdot 2^i$ with the value depending on the application of the sequence.

A pseudo-random sequence generator of each CoMP Tx point may be initialized, at the start of each subframe, with $$c_{init}=(\lfloor n_s/2 \rfloor +1)\cdot(2N_{ID}^{cell}+1)\cdot 2^{16}+n_{SCID} \qquad (3)$$

where $N_{ID}^{cell}$ corresponds to the cell ID of the CoMP Tx point, and $n_{SCID}$ corresponds to the scrambling ID of the CoMP Tx point. In some embodiments, for antenna ports 7 and 8, the $n_{SCID}$ may be a scrambling ID specified in DCI associated with the PDSCH(s) of the coordinated downlink transmissions, such as, for example, specified in a scrambling ID field of DCI format 2B or 2C. In other embodiments, the $n_{SCID}$ may be zero for antenna ports 7 or 8, such as when there is no DCI format 2B or 2C associated with the PDSCH(s) of the coordinated downlink transmissions. The $n_{SCID}$ for antenna ports 9 to 14 may be zero, as well.

More generally, the scrambling initiator for the pseudo-random sequence generator may be expressed with:

$$c_{init}=(\lfloor n_s/2 \rfloor +1)\cdot(2X_{ID}+1)\cdot 2^{16}+Y_{ID}, \qquad (4)$$

where $X_{ID}$ may correspond to an identity of a set of one or more Tx points, or to the physical cell identity of a cell, or to a parameter specific to the WTRU, and $Y_{ID}$ may correspond to a scrambling identity possibly associated with the set of one or more transmission points.

For example, in some embodiments, the WTRU 102 may be configured with one or more values for the parameter $X_{ID}$ that may be specific to the concerned WTRU 102. Each of the $X_{ID}$ values may be part of a set of reception parameters to use for reception of a coordinated downlink transmission. The WTRU 102 may select the value for according to other methods described herein, such as those described for the selection of a set of reception parameters to use for the reception of a coordinated downlink transmission. The WTRU 102 may then use the selected value for $X_{ID}$ (e.g., instead of $N_{ID}^{cell}$). One of the configured values of $X_{ID}$ may also correspond to the identity of a specific cell.

For example, the parameter $X_{ID}$ may correspond to a configuration, or to a set of parameters, associated to one or more transmission points, such as a parameter part of, or associated to, a non-zero-power CSI-RS configuration. It may also correspond to a parameter also used in calculation of the scrambling initiator for this non-zero-power CSI-RS configuration.

For example, in some embodiments, the WTRU 102 may be configured with one or more values for the parameter $Y_{ID}$ that may be specific to the concerned WTRU. Each of the $Y_{ID}$ values may be part of a set of reception parameters to use for reception of a coordinated downlink transmission. The WTRU 102 may select the value for according to other methods described herein, such as those described for the selection of a set of reception parameters to use for the reception of a coordinated downlink transmission. The WTRU 102 may then use the selected value for $Y_{ID}$ (e.g., instead of the $n_{SCID}$). The WTRU 102, in various embodiments, may be configured with one or more values for $Y_{ID}$ only for some antenna ports. A value of the parameter $Y_{ID}$ may be expressed as a sum of a point-specific or UE-specific parameter (e.g., similar to $X_{ID}$) and of the $n_{SCID}$ parameter that may take one of the values 0 or 1.

For example, in some embodiments, the WTRU 102 may dynamically select a set of reception parameters to use for reception of a coordinated downlink transmission in a given subframe, according to methods described herein, including reception of explicit signaling information and/or implicit selection methods and/or based on what set of reception parameters is activated in the concerned subframe. The WTRU 102 may possibly use different combinations for $X_{ID}$ and $Y_{ID}$ from one subframe to another. This may have a benefit of introducing a possibility for the network of scheduling, in a flexible manner, different sets of WTRUs using orthogonal DM-RS when needed. The Orthogonal DM-RS may be scrambled using the same pair of $X_{ID}$ and $Y_{ID}$ parameters for the scrambling initiator. For instance, a pair of WTRUs that are both relatively close to a given Tx point may utilize the same pair of $X_{ID}$ and $Y_{ID}$ parameters when co-scheduled in the same resource block and subframe.

A general process for scrambling each PDSCH of the coordinated downlink transmissions using the cell-specific system parameters may be as follows. For each codeword q, a block of bits $b^{(q)}(0), \ldots, b^{(q)}(M_{bit}^{(q)}-1)$, where $M_{bit}^{(q)}$ may be the number of bits in the codeword q transmitted on the physical channel in one subframe, may be scrambled prior to modulation, resulting in a block of scrambled bits $\tilde{b}^{(q)}(0), \ldots, \tilde{b}^{(q)}(M_{bit}^{(q)}-1)$ according to:

$$\tilde{b}^{(q)}(i)=(b^{(q)}(i)+c^{(q)}(i))\bmod 2, \qquad (5)$$

where the scrambling sequence $c^{(q)}(i)$ may be derived. The scrambling sequence generator of each CoMP Tx point may be initialized at the start of each subframe with an initialization value $c_{init}$. This initialization value $c_{init}$ may depend on transport channel type, such as, for example:

$$c_{init} = \begin{cases} n_{RNTI}\cdot 2^{14} + q\cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}, \qquad (6)$$

where $N_{ID}^{cell}$ may correspond to the cell ID of the CoMP Tx point, and $n_{RNTI}$ may correspond to a radio network temporary identifier (RNTI) associated with the PDSCH(s) of the coordinated downlink transmissions. Up to two codewords may be transmitted in one subframe, i.e., q∈{0, 1}. In a single codeword transmission example, q may be equal to zero.

More generally, in some embodiments, the value used for the parameter $N_{ID}^{cell}$ may correspond to the same value used for the parameter $X_{ID}$.

A general process for PDCCH assignment using the cell-specific system parameters may be carried out in accordance with the following. A control region of a subframe k of the coordinated downlink transmissions may include a set of control channel elements (CCEs). These CCEs may be numbered from 0 to $N_{CCE,k}-1$, where $N_{CCE,k}$ may be a total number of CCEs in the control region of the subframe k. The WTRU 102 may monitor PDCCHs at least for subframes for which the WTRU 102 is in discontinuous reception (DRX) Active Time, where monitoring may imply attempting to decode each of the PDCCHs in the set according to all the monitored DCI formats.

The set of PDCCH candidates to monitor may be defined in terms of search spaces, where a search space $S_k^{(L)}$ at aggregation level L∈{1, 2, 4, 8} may be defined by a set of PDCCH candidates. The CCEs corresponding to PDCCH candidate m of the search space $S_k^{(L)}$ may be given by:

$$L \cdot \{(Y_k+m) \bmod \lfloor N_{CCE,k}/L \rfloor\}+i, \quad (7)$$

where $Y_k$ is defined below, i=0, . . . , L−1 and m=0, . . . , $M^{(L)}$−1. $W^{(L)}$ may be the number of PDCCH candidates to monitor in the search space.

The WTRU 102 may monitor one common search space at each of the aggregation levels 4 and 8 and one WTRU-specific search space at each of the aggregation levels 1, 2, 4, 8. The common and WTRU-specific search spaces may overlap. The aggregation levels defining the search spaces are listed in Table 1. The DCI formats that the WTRU 102 may monitor depend on the configured transmission mode. Table 1 shows example PDCCH candidates that may be monitored by a WTRU.

TABLE 1

| Search space $S_k^{(L)}$ | | | Number of PDCCH |
|---|---|---|---|
| Type | Aggregation level L | Size [in CCEs] | candidates $M^{(L)}$ |
| WTRU- | 1 | 6 | 6 |
| specific | 2 | 12 | 6 |
|  | 4 | 8 | 2 |
|  | 8 | 16 | 2 |
| Common | 4 | 16 | 4 |
|  | 8 | 16 | 2 |

For the common search spaces, $Y_k$ may be set to 0 for the two aggregation levels L=4 and L=8. For the WTRU-specific search space $S_k^{(L)}$ at aggregation level L, the variable $Y_k$ may be defined by:

$$Y_k=(A \cdot Y_{k-1}) \bmod D, \quad (8)$$

where $Y_{-1}=n_{RNTI}\neq 0$, A=39827, D=65537 and k=$\lfloor n_s/2 \rfloor$, and $n_s$ may be the slot number within a radio frame.

For transmission mode 9 (Tx mode 9) defined in LTE-A, the CoMP Tx points may use DM-RS based precoding and channel state information reference signal (CSI-RS) based CSI feedback. It is contemplated that the operation of DL MIMO may become more dependent on DM-RS and CSI-RS and less dependent on a common reference signal (CRS). For Tx mode 9, the WTRU 102 may be configured to monitor DCI formats 2C and 1A in the PDCCH search spaces. An example of information that may be transmitted using DCI format 2C is shown in Table 2.

TABLE 2

| Information Field | Bit Number |
|---|---|
| Carrier indicator | 0 or 3 bits |
| Resource allocation header (resource allocation type 0/type 1) | 1 bit |
| Resource block (RB) assignment | $\lceil N_{RB}^{DL}/P \rceil_{bits}$ |
| Transmission power control (TPC) command for PUCCH | 2 bits |
| Downlink Assignment Index (DAI) (for TDD examples) | 2 bits |
| HARQ process number | 3 bits (FDD example), 4 bits (TDD example) |
| Antenna port(s), scrambling identity, and number of layers | 3 bits as specified in Table 3 |

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Although not listed in Tables 2 and 3, the information that may be transmitted using DCI format 2C may include, for transport block 1, a modulation and coding scheme (MCS), which may be 5 bits; a new data indicator, which may be 1 bit; and a redundancy version, which may be 2 bits. For transport block 2, the information that may be transmitted using DCI format 2C may include a MCS, which may be 5 bits; a new data indicator, which may be 1 bit; and a redundancy version, which may be 2 bits.

An example of information that may be transmitted using DCI format 1A is shown in Table 4.

TABLE 4

| Information Field | Bit Number |
|---|---|
| Carrier indicator | 0 or 3 bits |
| Flag for format0/format1A differentiation | 1 bit, where value 0 may indicate format 0, and value 1 may indicate format 1A |
| Localized/Distributed virtual resource block (VRB) assignment flag | 1 bit |
| Resource block assignment | $\lceil \log_2(N_{RB}^{DL}(N_{RB}^{DL}+1)/2) \rceil$ bits |
| Modulation and coding scheme (MCS) | 5 bits |
| HARQ process number | 3 bits (FDD example), 4 bits (TDD example) |
| New data indicator (NDI) | 1 bit |
| Redundancy version (RV) | 2 bits |
| TPC command for PUCCH | 2 bits |
| Downlink Assignment Index (for TDD examples) | 2 bits |

Referring again to FIG. 1F, the Tx points 114a-114d may include respective CoMP controller modules (not shown) that interface with the CoMP controller 184. The CoMP controller modules may exchange information directly, via fast backhauls and/or X2 interfaces; or indirectly via the CoMP controller 184. This information may be used to facilitate configuration of the Tx points 114a-114d for CoMP, and/or to facilitate coordination and/or scheduling of coordinated downlink transmissions from the Tx points 114a-114d to the WTRU 102.

The information exchanged among the CoMP controller modules, directly or indirectly, may include configuration information for selecting (e.g., dynamically), from the CoMP cooperating set 182, the CoMP Tx points for the coordinated downlink transmissions. The information may also include, for example, scheduling information for scheduling the CoMP Tx points for JT and/or DPS CoMP, as appropriate.

The CoMP controller modules may also obtain and/or configure each of the Tx points 114a-114d (or at least each of the CoMP Tx points) with a common set of system parameters and/or point-specific parameters. The common set of parameters may be used by the Tx points 114a-114d points to generate and transmit the coordinated downlink transmissions. In some embodiments, the common set of parameters used by each of the CoMP Tx points may make the coordinated downlink transmissions from such different CoMP Tx points appear to emanate from the same source (e.g., the use of different CoMP Tx points may be transparent to the WTRU 102; and demodulation of the PDSCH(s) may be transparent as in single-cell MIMO in LTE, for example.).

By way of example, the common system parameters may include, for example, a common DM-RS sequence, a common set of DM-RS (i.e., antenna) ports, a common identifier (common ID), a common slot number and/or a common scrambling ID (common scrambling ID). Each of the common system parameters may be based on an arbitrary number, for example. When using the common system parameters, the pseudo-random sequence generator used for generating the DM-RS at each CoMP Tx point may be initialized at the start of each subframe with:

$$c_{init} = (\lfloor n_{s\_common}/2 \rfloor + 1) \cdot (2N_{ID}^{common} + 1) \cdot 2^{16} + n_{SCID\_common}. \quad (9)$$

where $n_{s\_common}$ is slot number associated with the coordinated downlink transmissions, $N_{ID}^{common}$ Corresponds to the common identifier, and $n_{SCID\_common}$ corresponds to the common scrambling ID. $N_{ID}^{common}$ may, for example, Correspond to the parameter $X_{ID}$, and $n_{SCID\_common}$ may, for example, correspond to the parameter $Y_{ID}$. When using the common system parameters, the scrambling sequence generator used by the CoMP Tx points for PDSCH scrambling may be initialized at the start of each subframe with:

$$c_{init} = n_{RNTI} \cdot 2^{14} + q \cdot 2^{13} + \lfloor n_{s\_common}/2 \rfloor \cdot 2^9 + N_{ID}^{common} \text{ for PDSCH,} \quad (10)$$

where $N_{ID}^{common}$ may correspond to the common ID of the CoMP Tx points, $n_{s\_common}$ may correspond to the timeslot index within a radio frame associated with the coordinated downlink transmission, and $n_{RNTI}$ may correspond to the RNTI of the WTRU 102 to receive the PDSCH of the coordinated downlink transmission. In one or more embodiments, $N_{ID}^{common}$ may also correspond to the parameter $X_{ID}$.

As described in more detail below, the common set of system parameters may be signaled to the WTRU 102 using a combination of physical layer and/or higher layer signaling, or alternatively, information for signaling to the WTRU to select and/or determine the common set of system parameters for use in receiving the coordinated downlink transmission may be transmitted to the WTRU 102. Such signaling and/or information transmission may occur, for example, when the CoMP cooperating set is configured or reconfigured. Responsive to such signaling, the WTRU 102 may be aware that JP CoMP is applied for each scheduled PDSCH, and the Tx points may schedule the PDSCH using the PDCCH assignment process described above. The Tx point may modify the set of parameters (e.g. the common set of system parameters) used for PDSCH scrambling depending on which WTRU or set of WTRUs it is transmitting to in a specific resource block and subframe.

Other examples of the common set of system parameters may include the cell-specific set of system parameters of the serving cell (serving-cell system parameters); a set of system parameters based on the CoMP cooperating set (CoMP-set system parameters); a set of system parameters based, at least in part, on the serving-cell system parameters and the CoMP-set system parameters; a set of system parameters based, at least in part, on the cell-specific set of system parameters of the CoMP Tx points other than the serving cell (non-serving-cell Tx point system parameters); a set of system parameters based, at least in part, on the serving-cell system parameters, the CoMP-set system parameters and the non-serving-cell Tx point system parameters; and combinations thereof. The common set of system parameters may include other parameters, as well.

The CoMP-set system parameters may include, for example, a common DM-RS sequence, a common set of DM-RS ports, an identifier associated with the CoMP cooperating set (CoMP-set ID), a timeslot index within a radio frame associated with the coordinated downlink transmission and/or a scrambling ID associated with the CoMP cooperating set (CoMP-set scrambling ID). When using CoMP-set system parameters, the pseudo-random sequence generator used for generating the DM-RS at each CoMP Tx point may be initialized at the start of each subframe with:

$$c_{init} = (\lfloor n_{s\_CoMP\ set}/2 \rfloor + 1) \cdot (2N_{ID}^{CoMP\ set} + 1) \cdot 2^{16} + n_{SCID\_CoMP\ set} \quad (11)$$

where $n_{s\_CoMP\ set}$ is timeslot index within a radio frame associated with the coordinated downlink transmission, $N_{ID}^{CoMP\ set}$ corresponds to the CoMP-set ID, and $n_{SCID\_CoMP\ set}$ corresponds to the CoMP-set scrambling ID. In various embodiments, $N_{ID}^{CoMP\ set}$ may correspond to the parameter $X_{ID}$, and $n_{SCID\_CoMP\ set}$ may correspond to the parameter YD. The scrambling sequence generator used by the CoMP Tx points for PDSCH scrambling when using the CoMP-set system parameters may be initialized at the start of each subframe with:

$$c_{init} = n_{RNTI} \cdot 2^{14} + q \cdot 2^{13} + \lfloor n_{CoMP\ set}/2 \rfloor \cdot 2^9 + N_{ID}^{CoMP\ set} \text{ for PDSCH,} \quad (12)$$

where $N_{ID}^{CoMP\ set}$ may correspond to the common ID of the CoMP Tx points, $n_{CoMP\ set}$ may correspond to the timeslot index within a radio frame associated with the coordinated downlink transmission, and $n_{RNTI}$ may correspond the RNTI of the WTRU 102 to receive the PDSCH of the coordinated downlink transmission. In various embodiments, $N_{ID}^{CoMP\ set}$ may also correspond to the parameter $X_{ID}$.

The CoMP-set system parameters may be signaled to the WTRU 102 using a combination of physical layer and/or higher layer signaling, or alternatively, information for signaling to the WTRU to select and/or determine the CoMP-set system parameters for use in receiving the coordinated downlink transmission may be transmitted to the WTRU 102. Such signaling and/or information transmission may occur, for example, when the CoMP cooperating set is configured or reconfigured. Responsive to such signaling, the WTRU 102 may be aware that JP CoMP is applied for each scheduled PDSCH, and the Tx points may schedule the PDSCH using the PDCCH assignment process described above. Any of the Tx points may modify the set of parameters (e.g., the CoMP-set system parameters, or whether the set of system parameters corresponds to the "common set" or the "CoMP-set" system parameters) used for PDSCH scrambling depending on which WTRU or set of WTRUs it is transmitting to in a specific resource block and subframe.

The serving-cell system parameters may include, for example, a common DM-RS sequence, a common set of DM-RS (i.e., antenna) ports, the cell ID, a timeslot index within a radio frame associated with the coordinated downlink transmission and/or the serving-cell scrambling ID. When using the serving-cell system parameters, the pseudo-random sequence generator used for generating the DM-RS at each CoMP Tx point may be initialized at the start of each subframe with:

$$c_{init} = (\lfloor n_{s\_serving\ cell}/2 \rfloor + 1) \cdot (2N_{ID}^{serving\ cell} + 1) \cdot 2^{16} + n_{SCID\_serving\ cell}. \quad (13)$$

where $n_{s\_serving\ cell}$ is the slot number associated with the coordinated downlink transmissions, $N_{ID}^{serving\ cell}$ corresponds to the cell ID, and $n_{SCID\_serving\ cell}$ corresponds to the serving-cell scrambling ID. In various embodiments, $N_{ID}^{serving\ cell}$ may correspond to the parameter $X_{ID}$, and $n_{SCID\_serving\ cell}$ may correspond to the parameter $Y_{ID}$. When using the serving-cell system parameters, the scrambling sequence generator used by the CoMP Tx points for PDSCH scrambling may be initialized at the start of each subframe with:

$$c_{init} = n_{RNTI} \cdot 2^{14} + q \cdot 2^{13} + \lfloor n_{servingcell}/2 \rfloor \cdot 2^9 + N_{ID}^{servingcell}$$
for PDSCH, (12)

where $N_{ID}^{serving\ cell}$ may correspond to the serving-cell ID of the CoMP Tx points, $n_{s\_serving\ cell}$ may correspond to the timeslot index within a radio frame associated with the coordinated downlink transmission, and $n_{RNTI}$ may correspond to the RNTI of the WTRU 102 to receive the PDSCH of the coordinated downlink transmission. In various embodiments, $N_{ID}^{serving\ cell}$ may correspond to the parameter $X_{ID}$.

To facilitate using the serving-cell system parameters as the common system parameters, the serving cell 182a may forward the serving-cell system parameters (e.g., its cell ID and its subframe or timeslot index within a radio frame) to the other Tx points in the CoMP cooperating set. The serving cell 182a may do so, for example, when the CoMP cooperating set is configured. The serving-cell ID and subframe or timeslot index may be forwarded over the X2 interface. The serving cell ID may be acquired during X2 setup, for example using an X2 SETUP procedure, between cells or during an X2 configuration update procedure. Alternatively, the other Tx points 114b-114d in the CoMP cooperating set 182 may acquire the information of a serving cell ID through cell planning or other signaling, via, for example, the CoMP controller modules.

The CoMP controller 184 may be a centralized CoMP controller, as shown, or, alternatively, a distributed CoMP controller, such as, for example, an autonomous distributed CoMP controller. The CoMP controller 184 may minimize interference by coordinating scheduling of the coordinated downlink transmissions within the cells, and/or actively suppressing interference using signal processing techniques. In CoMP signal processing, the coordinated downlink transmissions to each of the WTRU 102, from the CoMP Tx points may be weighted to minimize interference, maximize throughput and/or maximize the SINR of the comp-mode transmissions received at such WTRU 102a. The coordinated transmissions may allow the comp network 180 to achieve high spectral efficiencies.

The WTRU 102 may be configured with one or more sets of parameters; each of which may correspond to a DM-RS. The WTRU 102 may use one or more of the sets of parameters to receive the PDSCH(s) of the coordinated downlink transmissions. Each set of parameters may include, for example, an antenna port index, initialization values for the DM-RS generator, a transmission mode, and/or a scrambling ID that may be used (in addition to a cell or a common ID) to initialize a DM-RS sequence. This scrambling ID may be, for example, any of a scrambling ID configured by upper layers (e.g. RRC), an identity of the WTRU 102, a RNTI, a serving-cell ID, etc. The serving-cell ID may be, for example, a servCellID used by the RRC to identify the serving cell, or a Carrier Indicator Field (CIF) that may be used by the physical layer to identify the serving cell, to which serving cell may be associated with a given set of parameters, for example, to a specific DM-RS. In one embodiment, the set of parameters may be akin to a serving cell (or a PDSCH) of the WTRU configuration. As used herein, the term PDCCH may include an E-PDCCH.

Although four Tx points, namely, the Tx points 114a-114d, are shown in FIG. 1, the CoMP network 180, however, may include more of fewer Tx points. Further, the CoMP network 180 may include one or more remote radio equipments (RREs) instead of, or in addition to, the Tx points 114a-114d. Each of the RREs may include a single or multiple antennas; any one of which may be communicatively coupled to the CoMP controller 184 and available as a Tx point for CoMP transmissions. In addition, the CoMP controller 184 may coordinate the Tx points to permit various CoMP transmissions to the WTRU 102. Further, the CoMP transmission network 180 may include both a distributed CoMP controller and a centralized CoMP controller.

For simplicity of exposition herein, all of the antennas of the Tx points may 114a-114d may be assumed to be communicatively coupled to the CoMP controller 184, and available for use as the Tx points for the coordinated downlink transmissions. In some instances, less than all of the Tx point antennas in any one cell or multiple cells may be used as the Tx points for the coordinated downlink transmissions. In other instances, two or more of the Tx point antennas in any cell may be used as a single Tx point for the coordinated downlink transmission (e.g., for multiple-input multiple-output (MIMO) operation).

In various embodiments of the method and apparatus for downlink shared channel reception in cooperative multi-point transmissions disclosed, suggested and/or taught herein, a number of terms may be used with respect to CoMP transmission and reception. These terms may be described with respect to, or in accordance with, LTE and/or LTE-A, for simplicity of exposition. By way of example, the term "CoMP set" may refer to any of a CoMP operating set, a set of CoMP Tx points, and a CoMP measurement set. The CoMP measurement set may be a set of cells for which channel state and/or statistical information is reported. The channel state/statistical information may be related to the links between the WTRU 102 and one or more of the Tx points 114a-114d in the CoMP cooperating set 182. In some instances, the CoMP measurement set may be the same as the CoMP cooperating set 182. The actual WTRU reports may include feedback for a subset of cells of the CoMP measurement set 182. These cells may be deemed as reported cells.

Example Operation

Figure 2:
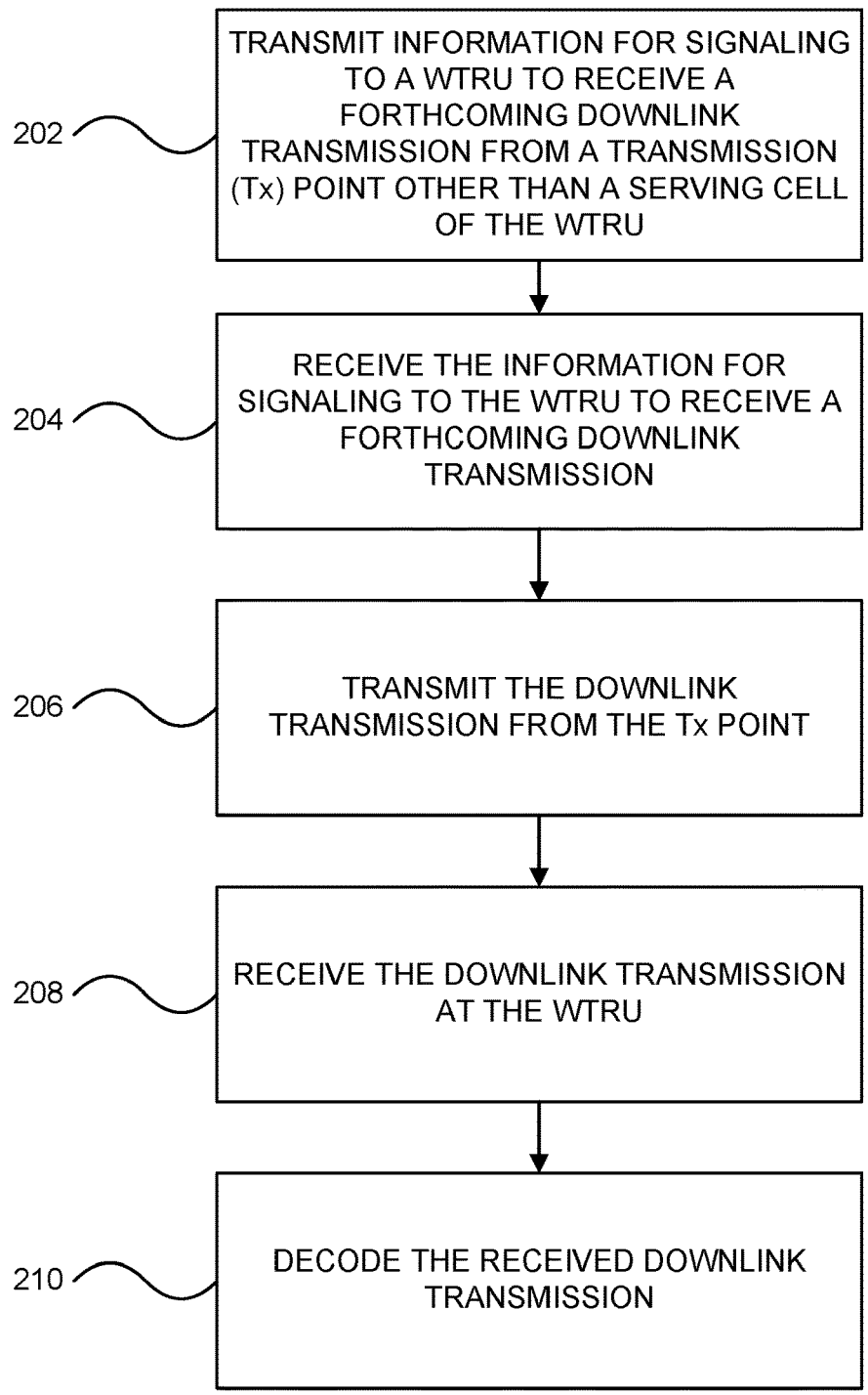
FIG. 2 is a flow diagram illustrating an example process for carrying out a joint processing (JP) CoMP transmission.

FIG. 2 is a flow diagram illustrating an example process 200 for carrying out a joint processing (JP) coordinated multi-point (CoMP) transmission. The process 200 of FIG. 2 is described with reference to FIGS. 1A-1F for ease of exposition. The process 200 may be carried out using other architectures, as well.

The process 200 may be used for various non-transparent JP CoMP transmission schemes, and to enable the WTRU 102 to determine that a forthcoming downlink transmission is a non-transparent coordinated downlink transmission from a CoMP Tx point other than the serving cell of the WTRU 102. Determining that the forthcoming downlink transmission is a non-transparent coordinated downlink transmission of a CoMP Tx point other than the serving cell (non-serving-cell CoMP Tx point) may permit the WTRU 102 to correctly receive such non-transparent coordinated downlink transmission. Receiving the forthcoming downlink transmission from the non-serving-cell CoMP Tx point may include any of (i) receiving time-domain orthogonal-frequency-division-multiplexed (OFDM) signals for a set of antenna ports, (ii) converting the time-domain OFDM signals for the set of antenna ports into corresponding modulation symbols for the set of antenna ports, (iii) performing decoding of any precoding of the modulation symbols for the set of antenna ports, (iv) performing layer mapping to map the de-precoded modulation symbols for the set of antenna ports to a set of transmission layers corresponding to the set of antenna ports; (v) demodulating the modulated symbols into scrambled bits, (vi) descrambling the scrambled bits into coded bits of one or more code words, and (vii) forming the code words from the descrambled coded bits.

As shown in process block 202, information for signaling to the WTRU 102 to receive a forthcoming downlink transmission from the non-serving-cell CoMP Tx point may be transmitted to the WTRU 102. This signaling information may be transmitted from the Tx point 114*a* of the serving cell. The Tx point 114*a* may transmit the signaling information using implicit and/or explicit signaling, such as, for example, layer 1 (L1), layer 2 (L2) and/or layer 3 (L3) signaling. Alternatively, Tx point 114*a* may transmit the signaling information in a control region of a downlink control channel (e.g., a PDCCH) for which the WTRU 102 may be configured to perform blind detection. The downlink control channel may be associated with the downlink transmission.

As shown in process block 204, the signaling information may be received at the WTRU 102. The WTRU 102 may, for example, receive the signaling information by way of implicit signaling and/or explicit signaling. Alternatively, the WTRU 102 may perform blind detection of the control region to obtain the signaling information (which may be any of an implicit and explicit indication).

Obtaining the signaling information may include the WTRU 102 receiving and/or decoding downlink control information (DCI). For example, the signaling information may be based, at least in part, on one or more characteristics, features, attributes, etc. (collectively "characteristics") of the received DCI and/or the decoded DCI. For the WTRU 102 to obtain the signaling information, the WTRU 102 may first receive and/or decode the DCI, and then recognize or otherwise interpret the characteristics of the received DCI and/or the decoded DCI. As another example, the signaling information may be based, at least in part, on information associated with, included within, identified by, and/or referenced by the received and/or decoded DCI. As above, the WTRU 102 may first receive and/or decode the DCI, and then recognize or otherwise interpret such information associated with, included within, identified by, and/or referenced by the received and/or decoded DCI to obtain the JP-CoMP indication.

Examples of the signaling information may include any of (i) an information and/or an indication (collectively "information") based, at least in part, on a resource allocation for the decoded DCI, such as an index of a (e.g., first) control channel element (CCE) of the received DCI; (ii) information based, at least in part, on a physical resource block assignment received in the decoded DCI for a given physical downlink (e.g., a PDSCH) transmission; (iii) information based, at least in part, on a physical downlink control channel (PDCCH) search space for the decoded DCI; (iv) information based, at least in part, on a RNTI used to scramble the decoded DCI; (v) information based, at least in part, on an explicit signaling of a set of parameters in a DCI; (vi) information based, at least in part, on a size of a DCI that may be decoded on a PDCCH; (vii) information based, at least in part, on DM-RS ports indices signaled inside a DCI that may be decoded on a PDCCH; (viii) information based, at least in part, on a number of Tx points; (ix) information based, at least in part, on the carrier indicator inside a DCI that may be decoded on a PDCCH; (x) information based, at least in part, on the HARQ process identifier inside a DCI that may be decoded on a PDCCH; (xi) information based, at least in part, on the activation state of the one or more set of reception parameters of the WTRU's configuration corresponding to the subframe for which the PDCCH was decoded; and (xii) the like.

The signaling information may be obtained by the WTRU 102 according to at least one of the following. For the information based, at least in part, on a resource allocation for the decoded DCI, the WTRU 102 may receive and decode the DCI, and then may interpret the resource allocation for the decoded DCI as an implicit signaling of the signaling information. For the information based, at least in part, on a physical resource block assignment received in the decoded DCI, the WTRU 102 may receive and decode the DCI, and then may interpret the physical resource block assignment as the implicit signaling.

For the information based, at least in part, on the PDCCH search space for the decoded DCI, the WTRU 102 may receive and decode the DCI, and then may interpret a characteristic of the PDCCH search space as the implicit signaling. For example, the WTRU 102 may interpret a range of CCEs within a WTRU-specific search space (WTRU-SS) where the valid DCI is received as the implicit signaling, provided that multiple (possibly non-overlapping) WTRU-SS may be defined for the WTRU 102. Alternatively, the WTRU 102 may interpret an identity of the WTRU-SS where the valid DCI is received as the implicit signaling, provided that multiple (possibly non-overlapping) WTRU-SS may be defined for the WTRU 102. As other alternatives, the WTRU 102 may interpret a range of CCEs within a common search space for the WTRU 102 where the valid DCI is received and/or an identity of the common search space for the WTRU 102 where the valid DCI as the implicit signaling.

For the information indication based, at least in part, on the RNTI used to scramble the decoded DCI, the WTRU 102 may receive the DCI. Thereafter, the WTRU 102 may select, from a plurality of RNTIs provisioned into the WTRU 102 (WTRU-specific RNTIs) for decoding the received DCI on the PDCCH, a WTRU-specific RNTI designated for JP CoMP transmissions. Then the WTRU 102 may attempt to decode the DCI using the selected WTRU-specific RNTI, and interpret a successful decoding of the received DCI using the selected WTRU-specific RNTI as the implicit signaling. As an alternative, the WTRU 102 may receive the DCI. The WTRU 102 may then attempt to decode the received DCI, iteratively, using the plurality of WTRU-specific RNTI, and interpret the received DCI being successfully decoded with the WTRU-specific RNTI designated for JP CoMP transmissions as the implicit signaling.

For the information based, at least in part, on an explicit signaling of a set of parameters in the received and decoded DCI, the WTRU 102 may receive and decode DCI having one or more indicator bits for indicating JP CoMP transmission, obtain a value for the indicator bits (indicator-bits value), and then may interpret the indicator bits as an explicit signaling to receive the forthcoming downlink transmission from the non-serving-cell CoMP Tx point, provided that the indicator-bits value is indicative of a JP CoMP transmission. For the information based, at least in part, on a size of a DCI that may be decoded on a PDCCH, the WTRU 102 may receive and decode a DCI, determine the size of the DCI (DCI size), and then interpret the DCI size as the implicit signaling, provided that the DCI size is indicative of a JP CoMP transmission. The DCI size may be indicative a JP CoMP transmission, for example, if it is different than a size of a DCI used for non-CoMP transmission.

For the information based, at least in part, on DM-RS ports indices signaled inside a DCI that may be decoded on a PDCCH, the WTRU 102 may receive and decode the DCI, obtain the DM-RS ports indices signaled inside the decoded DCI, and then interpret the obtained DM-RS ports indices as explicit signaling to receive the forthcoming downlink transmission from the non-serving-cell CoMP Tx point. The signaled indices may be according to any of (i) DM-RS port indices for all or some data and/or each or some codewords; and/or b) DM-RS port indices for each Tx point or each set of Tx points.

For the information based, at least in part, on the number of Tx points, the WTRU 102 may receive, in the downlink control signaling (e.g. DCI format) used for COMP operation, information bits that may correspond to the following information: a) number of transmission points other than serving cell; and b) DM-RS ports indices. The DM-RS port indices may be for all data or each codeword. Alternatively, the DM-RS port indices may be for each Tx point or each set of Tx points.

For the information based, at least in part, on the carrier indicator inside a DCI that may be decoded on a PDCCH, the WTRU 102 may receive and decode the DCI, obtain the carrier indicator value signaled inside the decoded DCI, and then interpret the obtained carrier indicator value as explicit signaling to receive the forthcoming downlink transmission from the non-serving-cell CoMP Tx point. The signaled carrier indicator value may be according to a configuration of the WTRU 102 that associates the value with a set of reception parameters to use for reception of a coordinated downlink transmission in a given subframe.

For the information based, at least in part, on the HARQ process identifier inside a DCI that may be decoded on a PDCCH, the WTRU 102 may receive and decode the DCI, obtain the HARQ process identifier signaled inside the decoded DCI, and then interpret the obtained HARQ process identifier as explicit signaling to receive the forthcoming downlink transmission from the non-serving-cell CoMP Tx point. The signaled HARQ process identifier may be according to a configuration of the WTRU 102 that associates the value with a set of reception parameters to use for reception of a coordinated downlink transmission in a given subframe.

For the information based, at least in part, on the activation state of the one or more set of reception parameters of the WTRU's configuration corresponding to the subframe for which the PDCCH was decoded, the WTRU 102 may receive and decode the DCI, obtain the timing of the corresponding PDCCH and/or an indication of activation and/or deactivation for an associated set of reception parameters, and then interpret the obtained information as explicit signaling to receive the forthcoming downlink transmission from the non-serving-cell CoMP Tx point. The associated set of reception parameters may be provided in the concerned or in a different DCI, for example as indicated by the carrier indicator. The WTRU 102 may determine what set of reception parameters is activated for the corresponding subframe timing and use the concerned set of parameters for reception of a coordinated downlink transmission in a given subframe.

The details of a PDCCH for PDSCH assignment may depend on the specific CoMP scheme being applied. Two examples for a PDCCH design are described below. In one of these examples, a DCI format (sometimes referred to herein as DCI format 1F) may be used to support space frequency block coding (SFBC) based open-loop precoding JT CoMP. Example details of the DCI format 1F that may be used to support JT CoMP with different data are listed in Table 5 (below).

TABLE 5

| Information Field | Bit number |
|---|---|
| Carrier indicator | 0 or 3 bits |
| Resource allocation header | 1 |
| RB assignment | $\lceil N_{RB}^{DL}/P \rceil$ or $\lceil \log_2(N_{RB}^{DL}(N_{RB}^{DL} + 1)/2) \rceil$ |
| HARQ Process number | 3 bits (FDD), 4 bits (TDD) |
| MCS of transport block | 5 |
| NDI of transport block | 1 |
| RV of transport block | 2 |
| Indicator of JT CoMP (optional) | 1 ("0" indicates no-CoMP, and "1" indicates JT CoMP) |
| Number of transmission points other than serving cell (optional) | Depends on specific CoMP scheme (only valid/meaningful if indicated as JT CoMP) |
| Indices of antenna (or DM-RS) ports used for each Tx point (optional) | 0, 1 or 2 |
| TPC for PUCCH of serving cell DAI | 2<br>2 (TDD only) |
| Cyclic redundancy cycle (CRC) | 16 |

In another example, another DCI format (sometimes referred to herein as DCI format 2D) may be used to support closed-loop precoding JT CoMP. Example details of the DCI format 2D are listed in Table 6 (below).

TABLE 6

| Information Field | Bit number |
|---|---|
| Carrier indicator | 0 or 3 bits |
| Resource allocation header | 1 |
| RB assignment | $\lceil N_{RB}^{DL}/P \rceil$ |
| HARQ Process number and MCS info for transport blocks transmitted from Tx points | Depending on specific JT CoMP scheme |
| Antenna port(s), scrambling identity and number of layers (of all Tx points) | Depending on specific JT CoMP scheme |
| Indicator of JT CoMP (optional) | 1 ("0" indicates no-CoMP, and "1" indicates JT CoMP) |
| Number of transmission points other than serving cell (optional) | Depends on specific CoMP scheme (only valid/meaningful if indicated as JT CoMP) |
| TPC for PUCCH of serving cell | 2 |
| DAI | 2 (TDD only) |
| CRC | 16 |

After obtaining the signaling information, the forthcoming coordinated downlink transmission may be transmitted to the WTRU 102 using the non-serving-cell CoMP Tx point, as shown in process block 206. The coordinated downlink transmission from the non-serving-cell CoMP Tx point may be received at the WTRU 102, as shown in process block 208. As noted above, receiving the forthcoming downlink transmission may include any of (i) receiving time-domain orthogonal-frequency-division-multiplexed (OFDM) signals for a set of antenna ports, (ii) converting the time-domain OFDM signals for the set of antenna ports into corresponding modulation symbols for the set of antenna ports, (iii) performing decoding of any precoding of the modulation symbols for the set of antenna ports, (iv) performing layer mapping to map the de-precoded modulation symbols for the set of antenna ports to a set of transmission layers corresponding to the set of antenna ports; (v) demodulating the modulated symbols into scrambled bits, (vi) descrambling the scrambled bits into coded bits of one or more code words, and (vii) forming the code words from the descrambled coded bits.

To facilitate the reception of the coordinated downlink transmission from the non-serving-cell CoMP Tx point, the WTRU 102 may select, from the WTRU-provisioned sets of reception parameters, the set of reception parameters for receiving the coordinated downlink transmission from the non-serving-cell CoMP Tx point. Selection of the set of reception parameters may be based on the signaling information for signaling to the WTRU 102 to receive a forthcoming downlink transmission from the non-serving-cell CoMP Tx point. Alternatively, the WTRU 102 may determine the set of reception parameters based on the signaling information for signaling to the WTRU 102 to receive a forthcoming downlink transmission from the non-serving-cell CoMP Tx point. The WTRU 102 may determine the set of reception parameters based on other information, as well.

After reception, the received coordinated downlink transmission may be decoded by the WTRU 102, as shown in process block 210. After the process block 210, the process 200 may terminate. Alternatively, the process 200 may be repeated periodically, in continuous fashion, or upon being triggered as a result of a condition, such as an occurrence of further coordinated downlink transmissions. As another alternative, the process blocks 206-210 may be repeated periodically, in continuous fashion, or upon being triggered as a result of a condition, so as to cause additional receptions of coordinated downlink transmissions.

Figure 3:
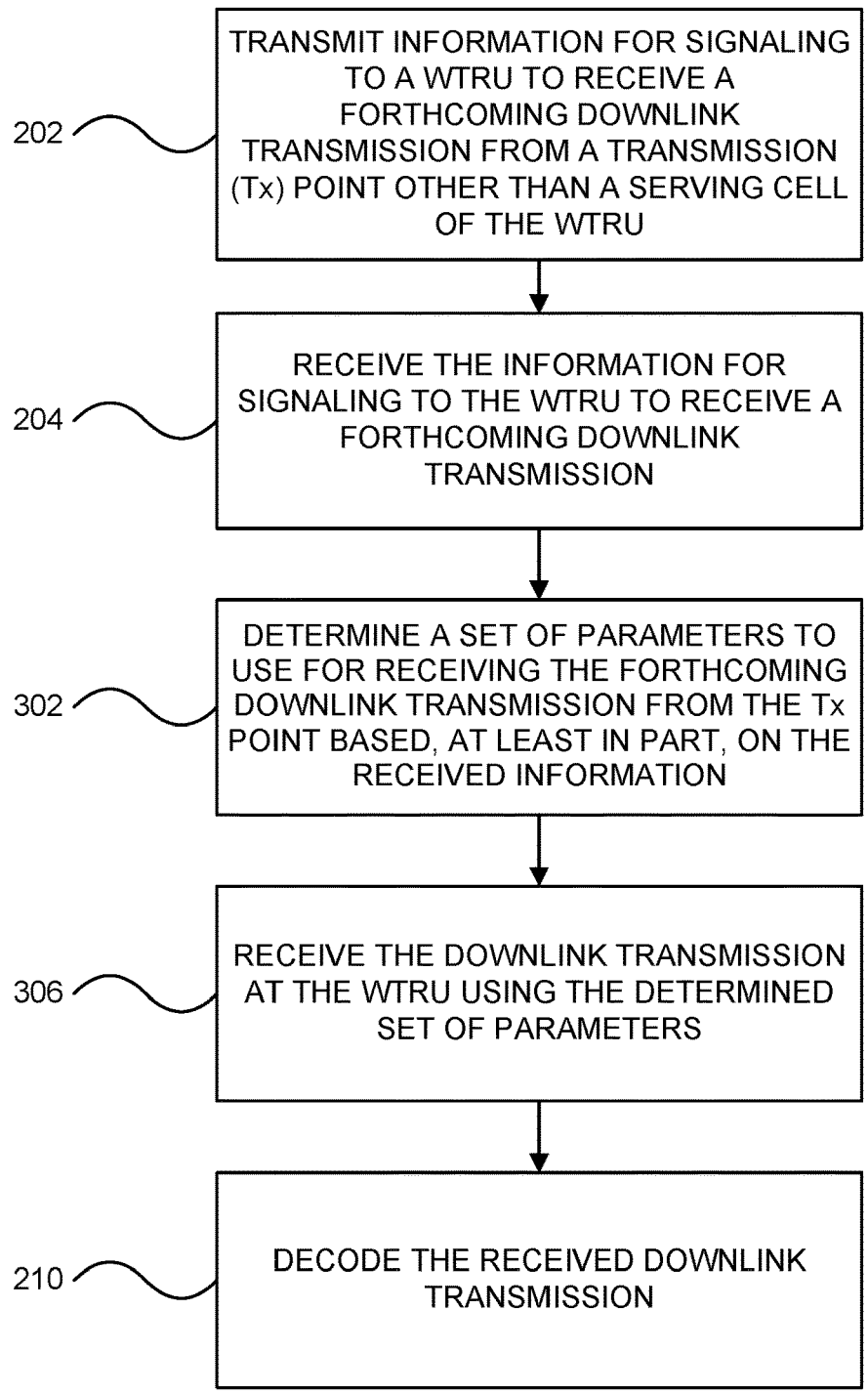
FIG. 3 is a flow diagram illustrating an example process for carrying out a JP CoMP transmission.

FIG. 3 is a flow diagram illustrating an example process 300 for carrying out a JP CoMP transmission. The process 300 of FIG. 3 is described with reference to FIGS. 1A-1F, for ease of exposition. The process 300 may be carried out using other architectures, as well. The process 300 may be used for various non-transparent JP CoMP transmission schemes to enable the WTRU 102 to select a set of parameters to use to receive a coordinated downlink transmission of a JP CoMP transmission. As described in more detail below, the WTRU 102 to obtain the set of parameters by acquiring the signaling information.

The process 300 may be used for various non-transparent JP CoMP transmission schemes, and to enable the WTRU 102 to determine that a forthcoming downlink transmission is a non-transparent coordinated downlink transmission from a non-serving-cell CoMP Tx Determining that the forthcoming downlink transmission is a non-transparent coordinated downlink transmission of the non-serving-cell CoMP Tx point may permit the WTRU 102 to correctly receive and/or decode such non-transparent coordinated downlink transmission. The process 300 of FIG. 3 is similar to the process 200 of FIG. 2, except as described herein.

After receiving the signaling information (block 204), the WTRU 102 may determine a set of reception parameters to use for receiving the forthcoming coordinated downlink transmission from the non-serving-cell CoMP Tx point based, at least in part on, the received signaling information, as shown in process block 302. The WTRU 102 may determine the set of reception parameters by, for example, selecting the set of reception parameters, from the plurality of sets of reception parameters provisioned in the WTRU, based on any of (i) a characteristic of DCI received on a downlink control channel associated with the forthcoming downlink transmission, and (ii) a characteristic of DCI decoded on the downlink control channel associated with the forthcoming downlink transmission. Alternatively, the WTRU 102 may determine the set of reception parameters by selecting the same, from a plurality of sets of parameters provisioned in the WTRU, based on any of (i) information associated with DCI received on a downlink control channel associated with the forthcoming downlink transmission, (ii) information referenced by the received DCI, (iii) information associated with DCI decoded on a downlink control channel associated with the forthcoming downlink transmission, (iv) information included within the decoded DCI, (v) information identified by the decoded DCI, and (vi) information referenced by the decoded DCI.

As other alternatives, WTRU 102 may determine the set of reception parameters by based, at least in part, on any of (i) a resource allocation of DCI decoded by the WTRU 102 received on a downlink control channel associated with the forthcoming downlink transmission; (ii) a physical resource block assignment indicated in DCI decoded on a downlink control channel associated with the forthcoming downlink transmission by the WTRU 102; (iii) a physical downlink control channel search space for where DCI decoded is received on a downlink control channel associated with the forthcoming downlink transmission by the WTRU; (iv) a RNTI used to decode DCI received on a downlink control channel associated with the forthcoming downlink transmission by the WTRU; (v) signaling indicated in DCI decoded on a downlink control channel associated with the forthcoming downlink transmission by the WTRU 102, where the signaling includes at least one bit for signaling the forthcoming downlink transmission; (vi) signaling indicated in DCI decoded on a downlink control channel associated with the forthcoming downlink transmission by the WTRU 102, where the signaling includes at least one bit for signaling a number of Tx points of a CoMP cooperating set that includes the Tx point and the serving cell; (vii) signaling indicated in DCI decoded on a downlink control channel associated with the forthcoming downlink transmission by the WTRU 102, where the signaling includes at least one bit for signaling antenna port indexes; (viii) signaling indicated in DCI decoded on a downlink control channel associated with the forthcoming downlink transmission by the WTRU, where the signaling includes at least one bit for signaling antenna port indexes, and where the antenna port indexes include any of (a) antenna port indexes for all data, (b) antenna port indexes for each code word, (c) antenna port indexes for each Tx point of a CoMP cooperating set that includes the Tx point and the serving cell, and (d) antenna port indexes for the CoMP cooperating set; (ix) a size of DCI decoded on a downlink control channel associated with the forthcoming downlink transmission by the WTRU 102; (x) a size of DCI decoded on a downlink control channel associated with the forthcoming downlink transmission by the WTRU 102, where the size of DCI is indicative of a CoMP transmission (xi) a size of DCI decoded on a downlink control channel associated with the forthcoming downlink transmission by the WTRU 102, where the size of DCI is that is not indicative of a non-CoMP transmission; (xii) an antenna port index; (xiii) an antenna port index signaled in DCI decoded on a downlink control channel associated with the forthcoming downlink transmission by the WTRU 102; (xiv) on a subframe type; (xv) on timing information; (xvi) a carrier frequency of a physical downlink shared channel (PDSCH)

of the forthcoming downlink transmission; (xvii) on a carrier index; (xviii) on a cell index; (xix) a number of transmission points of the CoMP cooperating set 182; (xx) on the HARQ process identifier; (xxi) on the activation indication of one or more of the sets of reception parameters of the WTRU's configuration; and (xxii) the like.

After determining the set of reception parameters, the coordinated downlink transmission from the non-serving-cell CoMP Tx point may be received at the WTRU 102 using such set of reception parameters, as shown in process block 208. After reception, the received coordinated downlink transmission may be decoded by the WTRU 102, as shown in process block 210.

After the process block 210, the process 300 may terminate. Alternatively, the process 300 may be repeated periodically, in continuous fashion, or upon being triggered as a result of a condition, such as an occurrence of further coordinated downlink transmissions. As another alternative, the process blocks 306 and 208-210 may be repeated periodically, in continuous fashion, or upon being triggered as a result of a condition, so as to cause additional receptions of coordinated downlink transmissions.

Figure 4:
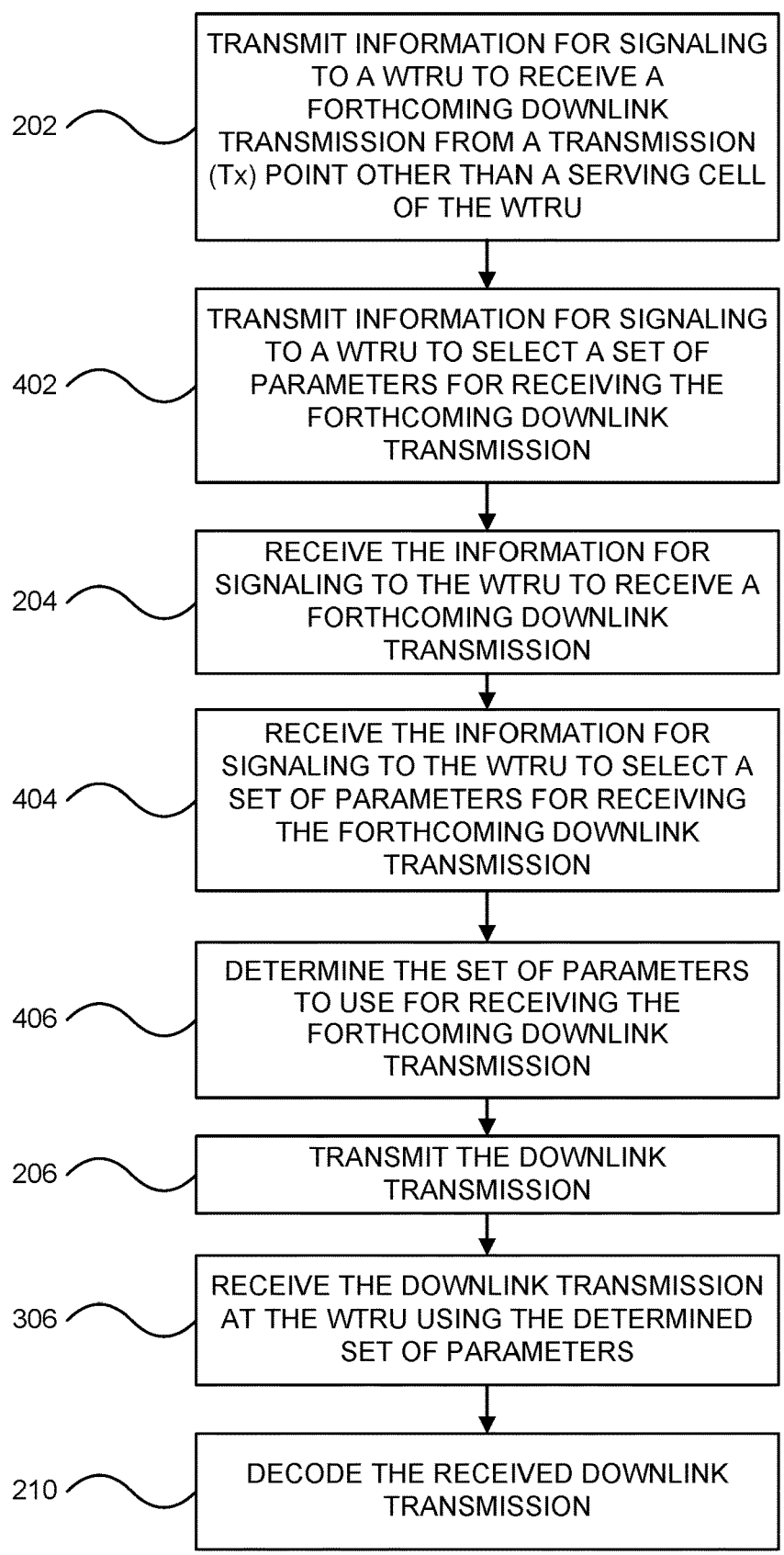
FIG. 4 is a flow diagram illustrating an example process for carrying out a JP CoMP transmission.

FIG. 4 is a flow diagram illustrating an example process 400 for carrying out a JP CoMP transmission. The process 400 of FIG. 4 is described with reference to FIGS. 1A-1F, for ease of exposition. The process 400 may be carried out using other architectures, as well. The process 400 may be used for various non-transparent JP CoMP transmission schemes to enable the WTRU 102 to select and/or determine the set of reception parameters to use to receive a coordinated downlink transmission of a JP CoMP transmission.

The process 400 may be used for various non-transparent JP CoMP transmission schemes, and to enable the WTRU 400 to determine that a forthcoming downlink transmission is a non-transparent coordinated downlink transmission from a non-serving-cell CoMP Tx Determining that the forthcoming downlink transmission is a non-transparent coordinated downlink transmission of the non-serving-cell CoMP Tx point may permit the WTRU 102 to correctly receive and/or decode such non-transparent coordinated downlink transmission. The process 400 of FIG. 4 is similar to the processes 200, 300 of FIGS. 2, 3 respectfully, except as described herein.

After transmitting the signaling information (block 202), information for signaling to the WTRU 102 to select a set of reception parameters to use to receive a forthcoming downlink transmission from the non-serving-cell CoMP Tx point may be transmitted to the WTRU 102, as shown in process block 402. This reception-parameter signaling information may be transmitted from the Tx point 114a of the serving cell. The Tx point 114a may transmit the reception-parameter signaling information using implicit and/or explicit signaling, such as, for example, L1, L2 and/or L3 signaling. Alternatively, Tx point 114a may transmit the reception-parameter signaling information in a control region of a downlink control channel (e.g., a PDCCH) for which the WTRU 102 may be configured to perform blind detection.

After receiving the signaling information (block 204) the reception-parameter signaling information may be received at the WTRU 102, as shown in process block 404. The WTRU 102 may, for example, receive the reception-parameter signaling information by way of implicit signaling and/or explicit signaling. Alternatively, the WTRU 102 may perform blind detection of the control region to obtain the reception-parameter signaling information (which may be any of an implicit and explicit indication). The reception-parameter signaling information may be the same information as the signaling information for signaling to the WTRU 102 to receive a forthcoming downlink transmission from the non-serving-cell CoMP Tx point. In which case, the reception-parameter signaling information may be sent and received with such signaling information. Alternatively, the reception-parameter signaling information may be different from such information, as described in more detail below.

As shown in process block 406, the WTRU 102 may determine the set of reception parameters to use for receiving the forthcoming coordinated downlink transmission from the non-serving-cell CoMP Tx point based, at least in part on, the received reception-parameter signaling information. The WTRU 102 may determine the set of reception parameters by, for example, selecting the set of reception parameters, from the plurality of sets of reception parameters provisioned in the WTRU, as described above with respect to process block 302 of FIG. 3. Alternatively, the WTRU 102 may determine the set of reception parameters for decoding the corresponding PDSCH transmission based on the timing of the subframe where the PDSCH transmission takes place. The timing may be defined using at least one of a frame number, a subframe number, a periodicity and/or an offset. The WTRU 102 may also determine the set of reception parameters based on the type of subframe, where the type of subframe may be one of at least a specific subset of Multimedia Broadcast/Multicast Service (MBMS) over a Single Frequency Network (MBSFN) subframes, Almost Blank Subframes (ABS), or "normal" (e.g., neither MBSFN or ABS) subframes, As another alternative, the WTRU 102 may also determine the set of reception parameters based on a carrier frequency of the PDSCH transmission (or carrier index or cell index):

The WTRU may determine the set of reception parameters (e.g. a reference signal) to use for the decoding of a corresponding PDSCH transmission based on an identity applicable to the concerned PDSCH transmission. For example, the WTRU may receive explicit indication of the serving-cell ID (e.g. corresponding to a servCellID used by RRC to identify the serving cell, and/or to a CIF that may be used by the physical layer to identify the serving cell). For example, a set of parameters (e.g. a reference signal) may be associated with a CIF value in a DCI format.

The WTRU 102 may determine the set of reception parameters (and/or the other signaling information) based on the reception of a medium access control (MAC) Control Element, for example, instead of DCI received on a PDCCH. For example, the WTRU 102 may determine the set of reception parameters based on a state associated to one or more PDCCH(s). By way of example, the WTRU 102 may determine the set of reception parameters (and/or the whether to receive the coordinated downlink transmission) based on the most recently received DCI on a PDCCH, where at least one field of the DCI indicates the set of reception parameters to use until another indication is provided. Alternatively, the WTRU may the set of reception parameters (and/or the whether to receive the coordinated downlink transmission) based on reception of a MAC control element, where at least one field of the MAC CE indicates the set of reception parameters to use until another indication is provided.

As another example, the WTRU 102 may determine the set of reception parameters (and/or whether to receive the coordinated downlink transmission) based on an activation state for the corresponding set of parameters (e.g. corresponding to a reference signal). The WTRU 102 may associate the set of reception parameters with an activation state that may indicate whether such set of parameters is activated or deactivated for the concerned PDSCH. The WTRU 102 may receive control signaling that cause the WTRU 102 to activate and/or deactivate one or more sets of parameters for one or more PDSCH of the configuration of the WTRU 102.

The control signaling received by the WTRU 102 may include one or at least one of the following.

The received signaling may be L1 signaling, where the WTRU 102 may receive a DCI on a PDCCH that indicates activation or deactivation of the set of reception parameters for one or more PDSCH(s). The indication received may be according to at least one of the following: (i) the WTRU 102 may successfully decode the DCI using a configured RNTI, which RNTI corresponds to the set of reception parameters and/or to a given PDSCH; and (ii) the WTRU determining that DCI is of a certain type and/or includes an explicit indication (e.g. a field and/or flag and/or any other indication) that allows the WTRU 102 to determine how to decode the concerned PDSCH, e.g. possibly according to other methods described herein. The WTRU may transmit a Hybrid Automatic Repeat Request (HARQ) acknowledgement (ACK) feedback to acknowledge the reception of the DCI interpreted as the activation/deactivation command. For example, for DCI signaling received in subframe n, the WTRU 102 may transmit HARQ ACK on an uplink channel in subframe n+k, where k may represent a WTRU processing delay, e.g., k=4 subframes.

The received signaling may be L2 signaling, where the WTRU may receive a MAC Control Element (CE) that indicates activation and/or deactivation of the set of reception parameters for one or more PDSCH. The MAC CE may be received on any PDSCH of the configuration of the WTRU 102. The WTRU 102 may activates or deactivate the set of parameters corresponding to the concerned PDSCH based on an explicit indication (e.g. a bitmap, or an antenna port) included in the MAC CE. Alternatively, the WTRU 102 may activate (or deactivate) the set of reception parameters corresponding to the concerned PDSCH on which PDSCH the MAC CE was received, by activating (or deactivating) another (e.g., the next) set of reception parameters in, for example, a sequence.

The received signaling may be L3 signaling, where the WTRU 102 may receive a configuration for one or more sets of reception parameters for a given PDSCH, upon which the default set may be placed in the activated state. The activation (or deactivation) of the use of the default (or follow-on) set of reception parameters for a given PDSCH may be applied immediately (e.g. in case of layer 1 signaling) or possibly after a fixed delay of e.g. k subframes (e.g. in case of layer 2/3 signaling). For layer 2 signaling received at subframe n, for example, the WTRU 102 may consider the set of reception parameters in the activated (or deactivated) state from subframe n+k, where k may be equal to 8 subframes; alternatively, in the subframe after the transmission of a HARQ ACK for the transport block in which the MAC CE was received. The WTRU may further delay using a follow-on set of reception parameters for a given ongoing HARQ process until the HARQ process successfully completes and/or until the control signaling received indicates a new data transmission (e.g. from the New Data Indicator NDI field in the DCI format).

After determining the set of reception parameters, the forthcoming coordinated downlink transmission may be transmitted to the WTRU 102 using the non-serving-cell CoMP Tx point, as shown in process block 206. The coordinated downlink transmission from the non-serving-cell CoMP Tx point may be received at the WTRU 102 using the determined set of reception parameters, as shown in process block 306. After reception, the received coordinated downlink transmission may be decoded by the WTRU 102, as shown in process block 210.

After the process block 210, the process 400 may terminate. Alternatively, the process 400 may be repeated periodically, in continuous fashion, or upon being triggered as a result of a condition, such as an occurrence of further coordinated downlink transmissions. As another alternative, the process blocks 206, 306 and 210 may be repeated periodically, in continuous fashion, or upon being triggered as a result of a condition, so as to cause additional receptions of coordinated downlink transmissions.

Figure 5:
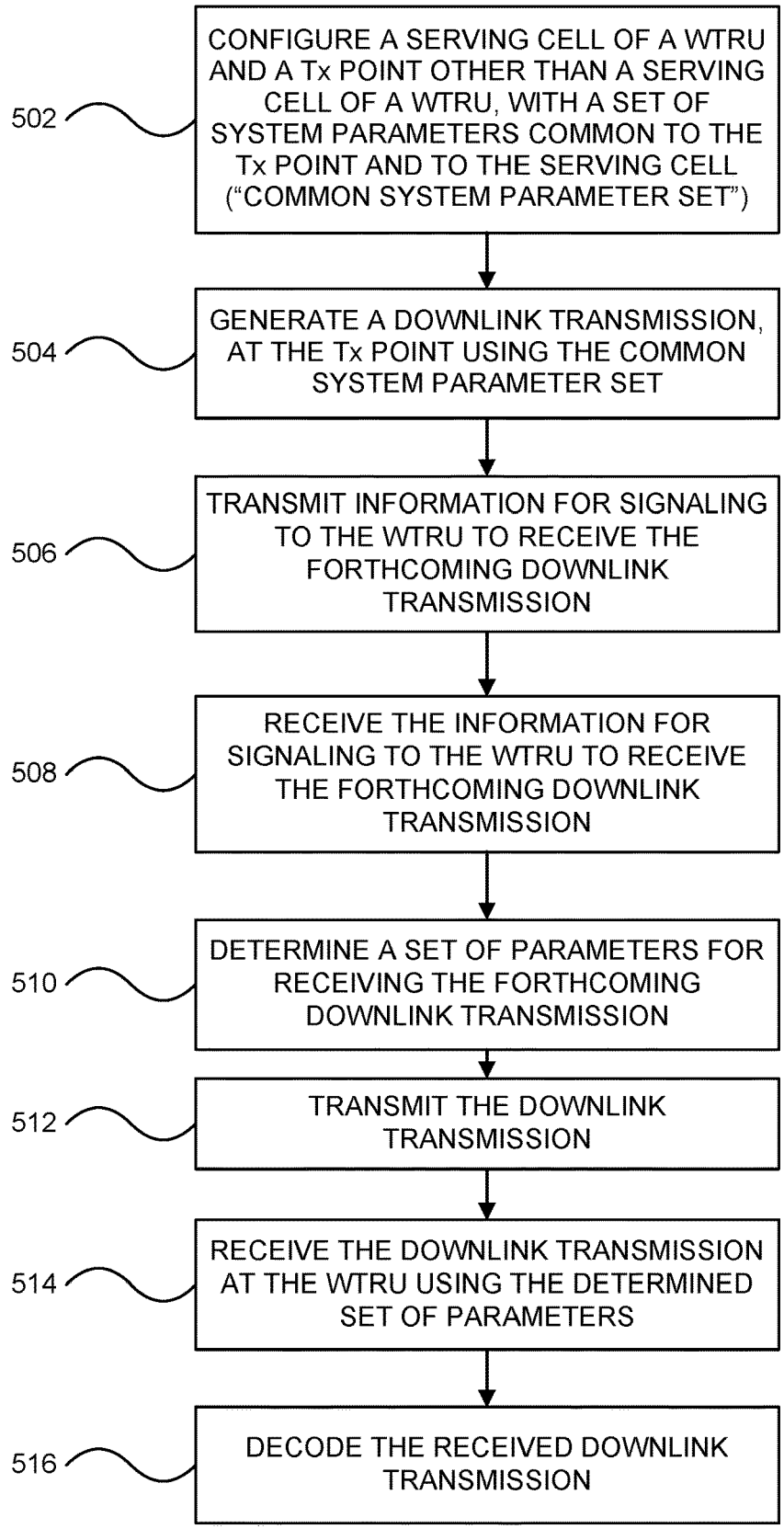
FIG. 5 is a flow diagram illustrating an example process for carrying out a CoMP transmission.

FIG. 5 is a flow diagram illustrating an example process 500 for carrying out a CoMP transmission. The process 500 may be carried out using other architectures, as well. The process 500 may be applicable to various CoMP schemes, such as JT CoMP schemes with same data (including, for example, system frame number (SFN) precoding and/or local/global precoding) or different data across transmission points, open-loop JT CoMP and dynamic cell selection based CoMP schemes. The process 500 of FIG. 5 is described with reference to FIGS. 1A-1F, for ease of exposition. The process 500 may be carried out using other architectures, as well. As noted above, the DM-RS port indices and sequences used for PDSCH(s) may be semi-statically (pre)configured or dynamically signaled using PDCCH. In some instances, as detailed above, the WTRU 102 may decode PDCCH to obtain DM-RS indices and sequences information for demodulation.

As shown in process block 502, a serving cell of the WTRU 102 and a non-serving-cell CoMP Tx point may be configured with the common system parameters. The common system parameters may be, for example, any of the examples provided above. Thereafter, the non-serving-cell CoMP Tx point may generate a coordinated downlink transmission using the common system parameters, as shown in process block 504.

As shown in process block 506, signaling information for signaling to the WTRU 102 to receive the forthcoming coordinated downlink transmission from the non-serving-cell CoMP Tx point may be transmitted to the WTRU 102. Thereafter, the signaling information may be received at the WTRU 102, as shown in process block 508. The WTRU 102 may then determine a set of reception parameters for receiving the forthcoming coordinated downlink transmission. The set of reception parameters may be determined and/or selected based on signaling indicative of the non-serving-cell CoMP Tx point, serving cell and other Tx points of the CoMP cooperating set using the common system parameters to generate coordinated downlink transmissions, such as described above, for example.

The non-serving-cell CoMP Tx point may transmit the coordinated downlink transmission, as shown in process block 512. Thereafter, the WTRU 102 may receive the coordinated downlink transmission using the determined set of reception parameters, as shown in process block 514. After reception, the received coordinated downlink transmission may be decoded by the WTRU 102, as shown in process block 516.

After the process block 516, the process 500 may terminate. Alternatively, the process 500 may be repeated periodically, in continuous fashion, or upon being triggered as a result of a condition, such as an occurrence of further coordinated downlink transmissions. As another alternative, the process blocks 512-516 may be repeated periodically, in continuous fashion, or upon being triggered as a result of a condition, so as to cause additional receptions of coordinated downlink transmissions.

The process 500 may be carried out for each CoMP Tx point of the CoMP cooperating set 182. Each CoMP Tx point for a WTRU may use a common DM-RS sequence and the same DM-RS ports as other Tx points of the CoMP cooperating set 182.

As an example, the pseudo-random sequence generators at each CoMP Tx point may be initialized using the serving-cell system parameters, or alternatively, the CoMP-set system parameters. For the latter, the pseudo-random sequence generators may be initialized with $c_{init}=(\lfloor n_{s\_CoMP\_set}/2 \rfloor+1)\cdot(2N_{ID}^{CoMP\ set}+1)\cdot 2^{16}+n_{SCID\_CoMP\_set}$, at the start of each subframe, and the CoMP-set system parameters may be signaled to the WTRU 102 when the CoMP cooperating set is configured or reconfigured. In various embodiments, $N_{ID}^{CoMP\ set}$ may correspond to the parameter $X_{ID}$, and $n_{SCID\_CoMP\_set}$ may correspond to the parameter $Y_{ID}$.

For the serving-cell system parameters, the pseudo-random sequence generators may be initialized with $c_{init}=(\lfloor n_{s\_serving\ cell}/2 \rfloor+1)\cdot(2N_{ID}^{serving\ cell}+1)\cdot 2^{16}+n_{SCID\_serving\ cell}$, at the start of each subframe. In various embodiments, $N_{ID}^{serving\ cell}$ may correspond to the parameter $X_{ID}$, and $n_{SCID\_serving\ cell}$ may correspond to the parameter $Y_{ID}$. The serving cell may forward the serving-cell ID and subframe or time slot index within a radio frame to other Tx points of the CoMP cooperating set 182 when the CoMP set is configured. Alternatively, the Tx points of the CoMP cooperating set 182 may acquire the serving-cell system parameters through cell planning or other signaling.

In some instances, all of the Tx points of the CoMP cooperating set 182 may have synchronized sub-frame indexes within a radio frame, which allows the CoMP cooperating set 182 to not exchange the information of sub-frame index within a radio frame. The serving cell may forward the DM-RS scrambling ID applied to DM-RS sequence associated with any jointly transmitted PDSCH and associated HARQ process ID to other Tx points of the CoMP cooperating set. This transmission may occur over the X2 interface in the case of inter-NB CoMP. In this way, demodulation by the WTRU may be transparent of whether JT CoMP is applied or not.

In another embodiment, each Tx point of the CoMP cooperating set 182 may use a set of DM-RS ports orthogonal to other transmission points, for example, on different routing entities (RE)s or time and frequency locations or using different orthogonal cover code. The DM-RS ports may be predefined. Dynamic DM-RS port assignment may be used and signaled in the PDCCH for each PDSCH assignment. Such signaling may be carried out using any of the processes 200, 300, 400 and 500, for example.

Alternatively, DM-RS ports with a predefined pattern may be used among transmission points to save DL control signaling overhead. The predefined DM-RS ports pattern may be specified or established between transmission points over X2 interface when a CoMP cooperation set is formed and/or configured or reconfigured. For example, for 2-Tx points JT CoMP, a simple DM-RS ports usage pattern for ports 7 and 8 may be used in the serving cell, and ports 9 and 10 may be used in the other transmission point. Each Tx point may use a common timeslot index and a common cell ID (e.g., CoMP set ID) to initialize the pseudo-random sequence generator of a DM-RS sequence.

Alternatively, each Tx point of the CoMP cooperating set may use its own timeslot index and cell ID to initialize the pseudo-random sequence generator of DM-RS sequence, and this cell-specific information (e.g., a relative timeslot or subframe index and cell ID of the non-serving-cell Tx points) may be signaled to the WTRU 102 via higher layer signaling (such as RRC signaling or MAC control element header) when the CoMP cooperating set 182 is configured or reconfigured for the WTRU 102.

After being configured in a Tx mode that may allow dynamic switching between JT CoMP and single-cell MIMO operation, the WTRU 102 may monitor a PDCCH format that supports (e.g., JT) CoMP operation (hereinafter "CoMP-PDCCH") and other appropriate fall-back PDCCH formats, such as, for example, DCI format 1A, in the common and WTRU-specific search spaces. For a valid CoMP-PDCCH that is detected, the WTRU 102 may obtain the information of whether (e.g., JT) CoMP is applied based on, for example, any of the aforementioned signaling information (e.g., a CCE index of the received DCI, etc.)

If (e.g., JT) CoMP is applied, then the WTRU 102 may obtain the number of the non-serving-cell Tx points (if the number is not fixed) and the information regarding the DM-RS ports used by each of the non-serving-cell Tx points. The WTRU 102 may use the information of DM-RS ports used in each of non-serving-cell Tx points to perform channel estimation of each non-serving-cell Tx points on corresponding DM-RS ports. The WTRU 102 may also obtain information such as resource block (RB) allocation, HARQ process number, MCS, NDI and RV from decoding of the received PDCCH. The WTRU 102 may apply this information to receive the PDSCH(s), and process (e.g., decode) the demodulated data accordingly.

As yet another alternative, each Tx point of the CoMP cooperating set 182 for the WTRU 102 may use the same DM-RS ports as the other Tx points of the CoMP cooperating set 182, but may use different initialization parameters for the DM-RS sequence. The pseudo-random sequence generator of a DM-RS sequence of each of the Tx points of the CoMP cooperating set 182 may be initialized, at the start of each subframe, with its own cell-specific system information, such that in $c_{init}=(\lfloor n_s/2 \rfloor+1)\cdot(2N_{ID}^{cell}+1)\cdot 2^{16}+n_{SCID}$, the $n_{SCID}$ of each of the Tx points may be equal to 0. This cell-specific system information (e.g., the relative timeslot or subframe index and cell ID of the non-serving-cell Tx points) may be signaled to the WTRU 102 via higher layer signaling (such as RRC signaling or MAC control element header) when the CoMP cooperating set 182 is configured or reconfigured for the WTRU 102.

Alternatively, each Tx point n may use the CoMP-set ID in place of the cell ID and a common timeslot index for DM-RS sequence generator, and apply a unique $n_{SCID}=n-1$ out of range of $\{0, 1, \ldots, N-1\}$. In one embodiment, the range of $n_{SCID}$ may be derived, for example, from a number of transmission points for JT CoMP, and might not be signaled explicitly. Alternatively, the range of $n_{SCID}$ may be obtained by the WTRU by performing blind detection on the common DM-RS ports with different hypotheses on $n_{SCID}$ value.

To facilitate reception, the WTRU 102, after being configured in a Tx mode that allows dynamic switching between (e.g., JT) CoMP and single-cell MIMO operation, may monitor for the CoMP-PDCCH and other appropriate fall-back PDCCH formats (for example, format 1A) in the common and WTRU-specific search spaces. For a valid CoMP-PDCCH that is detected, the WTRU 102 may obtain the information of whether JT CoMP is applied based on, for example, any of the aforementioned signaling information (e.g., a CCE index of the received DCI, etc.). If (e.g., JT) CoMP is applied, the WTRU may obtain the number of non-serving-cell Tx points (if the number is not fixed) and the information of DM-RS ports used by each Tx point. The WTRU 102 may use the information of DM-RS ports used in each of non-serving-cell Tx points to perform channel estimation of each non-serving-cell Tx points on corresponding DM-RS ports. The WTRU 102 may also obtain information such as RB allocation, HARQ process number, MCS, NDI and RV from decoding of the received PDCCH. The WTRU 102 may apply this information to receive the PDSCH(s), and process (e.g., decode) the demodulated data accordingly.

One example for DPS may include using a downlink assignment in the DCI, such as in DCI format 1G, with an information field indicating the index of the instantaneous Tx point within the CoMP cooperating set, which may point to a combination of cell ID and timeslot or subframe index within a radio frame. For example, for a DPS CoMP set with 3 cells (or Tx points), the index of the instantaneous Tx point within the CoMP set may be 1, 2 or 3.

Example details of the DCI format 1G that may be used to support JT CoMP with different data is listed in Table 7 (below).

TABLE 7

| Information Field | Bit number |
| --- | --- |
| Carrier indicator | 0 or 3 bits |
| Resource allocation header | 1 |
| RB assignment | $\lceil N_{RB}^{DL}/P \rceil$ or $\lceil \log_2(N_{RB}^{DL}(N_{RB}^{DL} + 1)/2) \rceil$ |
| HARQ Process number | 3 bits (FDD), 4 bits (TDD) |
| MCS of transport block | 5 |
| NDI of transport block | 1 |
| RV of transport block | 2 |
| The index of the instantaneous Tx point within the CoMP set | $\lceil \log_2(\text{size of CoMP set}) \rceil$ |
| Antenna port(s), scrambling identity and number of layers of the instantaneous Tx point | 3 |
| TPC for PUCCH of serving cell | 2 |
| DAI | 2 (TDD only) |
| CRC | 16 |

Alternatively, the WTRU 102 may perform blind detection to determine whether JT CoMP is applied. On each predefined DM-RS port of each Tx points of the CoMP cooperating set 182, the DM-RS sequence may be scrambled using cell-specific system parameters. The WTRU 102 may then perform blind detection of the DM-RS by using a specific parameter of a potential Tx point, for example, a cell ID and/or timeslot index, to descramble the DM-RS sequence received on the DM-RS port. If a valid DM-RS sequence is detected after descrambling, the WTRU 102 interprets such result to receive the forthcoming JT CoMP downlink transmissions.

In one or more embodiments, the Tx points of the CoMP cooperating set 182 may use cell-specific system parameters to initialize the DM-RS sequence of the WTRU 102 that receives PDSCH from such Tx point (or cell). In the following, various processes are provided to support efficient multi-user (MU)-MIMO operation so that a non-CoMP WTRU in this Tx point (or cell) may detect a presence of a co-scheduled CoMP equipped WTRU(s), such as the WTRU 102. These processes may be used in MU-MIMO detection.

In one embodiment, in any of the CoMP Tx points or cells, the eNB may not co-schedule any downlink transmission to the non-CoMP WTRU with coordinated downlink transmission the WTRU 102 in the same RB or sub-band. Alternatively, in any of the CoMP Tx points or cells, the eNB may not co-schedule any two WTRUs whose DM-RS sequences are initialized with different system parameters, such as, cell-specific cell ID and timeslot index. Such WTRUs may be separated in time domain, for example, in different sub-frames.

In another embodiment, where the CoMP-set system parameters may be used for initialization, each WTRU may be signaled or configured with such information, although not all of such WTRUs may be operating in CoMP in every TTI. To support such configuration, each non-CoMP WTRU may perform one extra blind detection of other DM-RS ports or sequences using a DM-RS sequence initialization of the CoMP-set system parameters.

Alternatively, where a cell-specific system parameter of a first Tx point of the CoMP cooperating set 182 may be used for DM-RS sequence initialization of a second TX point for the WTRU 102, then a relative index within the CoMP cooperating set that may be used to identify the second Tx point may be signaled to the non-CoMP WTRU of interest via, for example, either L1/L2 dedicated signaling or broadcast. To support this configuration, the non-CoMP WTRU may perform one extra blind detection of other DM-RS ports or sequences using the cell-specific system parameters of the second Tx point based DM-RS sequence initialization. Alternatively, the relative index of the second Tx point might not be signaled to the WTRU 102. Instead, the WTRU 102 may be configured with the information of all (or all within a given vicinity) of the sets of cell-specific system parameters of the Tx points (e.g., cell ID, relative timeslot index) via higher layer signaling (such as RRC signalings or MAC control element header) when the CoMP cooperating set 182 is configured or reconfigured for the WTRU 102. If there are K Tx points in the CoMP cooperating set 182, then the non-CoMP WTRU of interest may perform extra K−1 blind detections, each using the set of cell-specific system parameters of a potential Tx point based DM-RS sequence initialization.

For a DPS based CoMP scheme, where the serving-cell system parameters are used for DM-RS sequence initialization by the instantaneous transmission point, the same DM-RS ports used by the instantaneous transmission point might not be used in the serving cell.

In various embodiments, for various CoMP schemes, processes for PDSCH scrambling to support the operation of CoMP and allow the (e.g., CoMP) WTRU 102 to efficiently descramble the received CoMP PDSCH.

As noted above, the WTRU 102 may be configured with the common set of system parameters for all of the Tx points of the CoMP cooperating set 182 when the WTRU is configured in a Tx mode that allows dynamic switching between JT CoMP and single-cell MIMO operation. Using such configuration allows for PDSCH scrambling to support the operation of CoMP and allows WTRU 102 to efficiently descramble the received CoMP PDSCH In another embodiment, each CoMP Tx point may have its PDSCH scrambling sequence initialized by its own unique (e.g., cell-specific) cell ID and timeslot index within a radio frame. Assuming that there are K CoMP Tx points jointly transmitting PDSCH to the WTRU. 102, the WTRU 102 may descramble K times using the scrambling sequence of each cell and then combine.

In various embodiments, for various CoMP schemes, such as for JT CoMP with different data across Tx points, various processes are provided herein to facilitate and/or maintain HARQ processes across the multiple Tx points of the CoMP cooperating set 182.

HARQ may be performed for JT CoMP with different data across Tx points. For JT CoMP that uses closed-loop MIMO based precoding with different data across CoMP Tx points, for example, data blocks from different CoMP Tx points may be considered different codewords. MIMO based precoding includes local precoding, global precoding, and multicast/broadcast over single frequency network (MB-SFN) precoding, etc. Assuming K Tx points for the WTRU 102, the number of codewords (CW)s may be limited by the number of receive antennas of the WTRU 102 (or a standard maximum restriction).

HARQ for JT CoMP with different data across Tx points may be implemented using various example processes. In one of these processes, each TX point maintains an independent set of HARQ processes for the (e.g., JT CoMP) WTRU 102. Such maintenance may allow flexible scheduling at the network, for example, at each Tx point, but may introduce complexity at the WTRU 102 for implementing multiple sets of HARQ processes for each of the CoMP Tx point. The following PDCCH formats may be used to support JT CoMP and signal PDSCH assignment to the WTRU 102.

In one embodiment, a DCI format (referred to herein as "DCI format 2E") may be used to convey control information of parameters (e.g., MCS, DM-RS ports, HARQ information etc.) of PDSCH transmitted from all CoMP Tx points. Example details of the DCI format 2E that may be used to support JT CoMP with different data are listed in Table 8 (below).

TABLE 8

| Information Field | Bit number |
| --- | --- |
| Carrier indicator | 0 or 3 bits |
| Resource allocation header | 1 |
| RB assignment | $\lceil N_{RB}^{DL}/P \rceil$ |
| HARQ Process number and MCS info for transport blocks transmitted from the first transmission point (or point) | 11 or 19 bits (See table 6) |
| HARQ Process number and MCS info for transport blocks transmitted from the second transmission point (or point) | 11 or 19 bits (See table 6) |
| ... | ... |
| HARQ Process number and MCS info for transport blocks transmitted from the Kth transmission point (or point) | 11 or 19 bits (See table 6) |
| Antenna port(s), scrambling identity and number of layers of the first transmission point (or point) | 3 or less |
| Antenna port(s), scrambling identity and number of layers of the second transmission point (or point) | 3 or less |
| ... | ... |
| Antenna port(s), scrambling identity and number of layers of the Kth transmission point (or point) | 3 or less |
| TPC for PUCCH of serving cell | 2 |
| DAI | 2 (TDD only) |
| CRC | 16 |

Example details of a HARQ process number and MCS information for transport blocks transmitted from each of the CoMP Tx point is listed in Table 9 (below)

TABLE 9

| HARQ Process number | 3 (FDD), 4 (TDD) |
| --- | --- |
| MCS transport block 1 | 5 |
| NDI transport block 1 | 1 |
| RV transport block 1 | 2 |
| MCS transport block 2 (only if 2 CWs are transmitted) | 5 |
| NDI transport block 2 (only if 2 CWs are transmitted) | 1 |
| RV transport block 2 (only if 2 CWs are transmitted) | 2 |

If each of the cells or Tx points signaling of antenna port(s), scrambling identity and number of layers is coded independent of other cells' signaling, then the maintenance of the HARQ processes across the multiple cells or Tx points may follow Table 1.

In another embodiment, jointly coding the signaling of antenna port(s), scrambling ID and number of layers for all Tx points may be carried since the total number of layers may be limited by the number of receive antennas of the WTRU 102. The number of antennas may be limited by the maximum number of layers in a single cell/Tx point.

This PDCCH scheme may increase the size of downlink assignment PDCCH dramatically, which may require a larger search space. To facilitate the larger search space, at least one larger aggregation level X (X>8) may be added to the PDCCH search space of the WTRU 102, which may create a search space $S_k^{(L)}$ at aggregation level $L \in \{1, 2, 4, 8, X\}$. The CCEs corresponding to PDCCH candidate m of the search space $S_k^{(L)}$ may be determined, for example, in the same way as in LTE, but with a larger value of L. The WTRU 102 may monitor one common search space at each of the aggregation levels 4 and 8 and optionally X, and monitor one WTRU-specific search space at each of the aggregation levels 1, 2, 4, 8, X. The aggregation levels defining the search spaces are listed in Table 10 (below).

TABLE 10

| | Search space $S_k^{(L)}$ | | Number of PDCCH |
| --- | --- | --- | --- |
| Type | Aggregation level L | Size [in CCEs] | candidates $M^{(L)}$ |
| WTRU-specific | 1 | 6 | 6 |
| | 2 | 12 | 6 |
| | 4 | 8 | 2 |
| | 8 | 16 | 2 |
| | X | Y | 1 or 2 |
| Common | 4 | 16 | 4 |
| | 8 | 16 | 2 |
| | X (optional) | Y | 1 or 2 |

As shown, Table 10 lists example PDCCH candidates that may be monitored by the WTRU 102. For the common search spaces, $Y_k$ may be set to 0 for the two aggregation levels L=4 and L=8, and set to 0 for the optional aggregation level X as well.

After being configured in a Tx mode that allows dynamic switching between JT CoMP with different data across transmission points and single-cell MIMO operation, the WTRU 102 may monitor PDCCH format 2E and other appropriate fall-back PDCCH formats, for example, format 1A or 2C, in the common and WTRU-specific search spaces defined above. If a valid PDCCH format 2E is detected, then the WTRU 102 may apply this PDSCH assignment in its demodulation of PDSCH and may not process any other PDSCH assignment. From the received PDCCH format 2E, the WTRU 102 may obtain the information of HARQ process number of each Tx point, MCS, NDI and RV of each transport block of each of the Tx points, antenna port(s), scrambling ID and number of layers of each of the Tx points. The WTRU 102 may apply this information to demodulate its PDSCH for each HARQ process per cell or Tx point, and process the demodulated data accordingly. In some embodiments, there may be K (at least two) HARQ processes being demodulated at the WTRU 102 on the same frequency carrier.

In another alternative, K separate PDCCHs may be used, with each PDCCH may signal one CoMP cell or Tx point PDSCH parameters. For example, for the case where up to two codewords are allowed per Tx point, DCI format 2C as defined in LTE-A may be used. For the case where only one codeword is allowed per transmission point, then a DCI format (referred to herein as DCI format 1E) may be used. Example details of DCI format 1E that may be used to support JT CoMP with different data are listed in Table 11 (below).

TABLE 11

| Information Field | Bit number |
|---|---|
| Carrier indicator | 0 or 3 bits |
| Resource allocation header | 1 |
| RB assignment | $\lceil N_{RB}^{DL}/P \rceil_{or} \lceil \log_2(N_{RB}^{DL}(N_{RB}^{DL}+1)/2) \rceil$ |
| HARQ Process number | 3 bits (FDD), 4 bits (TDD) |
| MCS of transport block | 5 |
| NDI of transport block | 1 |
| RV of transport block | 2 |
| Antenna port index and scrambling identity | 2 |
| TPC for PUCCH of serving cell | 2 (if transmitted from serving cell) or 0 (if transmitted from non-serving cell) |
| DAI | 2 (TDD only) |
| CRC | 16 |

Alternatively, the PDCCH format used for other transmission points other than the serving cell may use less payload than DCI format 2C or 1E by not including information fields that are common to all transmission points, and PDCCH format used for the serving cell should include the common information fields, such as RB assignment, resource allocation header, TPC and DAI.

Example details of a bitfield of antenna port index and scrambling identity are shown in Table 12 (below).

TABLE 12

| Value | Message |
|---|---|
| 0 | 1 layer, port 7, $n_{SCID} = 0$ |
| 1 | 1 layer, port 7, $n_{SCID} = 1$ |
| 2 | 1 layer, port 8, $n_{SCID} = 0$ |
| 3 | 1 layer, port 8, $n_{SCID} = 1$ |

Using the foregoing may cause elevated PDCCH blind detection complexity at the WTRU 102. To reduce the blind decoding complexity, a predefined relationship between the K PDCCHs transmitted to the same WTRU 102 may be used so that the WTRU 102 may be aware of which indices of the set of CCEs to decode for a second PDCCH after successfully decoding a first PDCCH. If the WTRU 102 successfully decodes the kth (1≤k≤K) PDCCH, then the set of CCEs indices for the ith (i≠k) PDCCH may be a predefined function of the set of CCE indices of the kth PDCCH. That is, for example:

$$[CCE\ index]_{PDCCH_i} = F_1(\{CCE\ index\}_{PDCCH_k}) \quad (15)$$

Alternatively, the set of CCEs indices for the ith (i≠k) PDCCH may be a predefined function of the set of the index of the first CCE of the kth PDCCH. That is, for example:

$$[CCE\ index]_{PDCCH_i} = F_2(1stCCE\ index_{PDCCH_k}) \quad (16)$$

After being configured in a Tx mode that allows dynamic switching between JT CoMP with different data across transmission points and single-cell MIMO operation, the WTRU 102 may monitor PDCCH format 2C or 1E (or 2C/1E with reduced payload) and other appropriate PDCCH formats, for example, format 1A, in the common and WTRU-specific search spaces. The WTRU may receive and process up to K PDSCH assignments on the same carrier (unlike where only one PDSCH assignment may be applied/processed by the WTRU 102 per frequency carrier at any TTI). If a predefined relationship between the K PDCCHs is applied, then the WTRU may be aware of which indices of the set of CCEs to decode for a second PDCCH after successfully decoding the first PDCCH using equations (15) or (16).

After receiving and processing K valid PDSCH assignments, the WTRU 102 might not process any other PDSCH assignment. For each valid PDCCH format 2C or 1E that is detected, the WTRU 102 may obtain the information of an RB assignment, HARQ process number, MCS, NDI and RV of each transport block, antenna port(s), scrambling ID and number of layers of the corresponding transmission point. The WTRU 102 may apply this information to demodulate its PDSCH for the HARQ process of the corresponding transmission point, and process the demodulated data accordingly.

Alternatively, the WTRU may apply the common DL related information contained in the PDCCH received for the serving cell demodulation of PDSCH in all Tx points, and apply the common UL related information included in the PDCCH received for the serving cell, such as TPC etc., to the uplink of its serving cell. The common DL related information include in the PDCCH received for the serving cell may include information such as RB assignment, etc. There may be K (at least two) HARQ processes being demodulated at the WTRU on the same frequency carrier.

In another alternative, one set of HARQ processes may be maintained across all Tx points for the (e.g., JT CoMP) WTRU 102. In an embodiment, a DCI format (referred to herein as "DCI format 2F") may be used convey control information of parameters (e.g., MCS, DM-RS ports etc.) of PDSCH transmitted from all CoMP Tx points. Example details of the DCI format 2F that may be used to support JT CoMP with different data are listed in Table 13 (below).

TABLE 13

| Information Field | Bit number |
|---|---|
| Carrier indicator | 0 or 3 bits |
| Resource allocation header | 1 |
| RB assignment | $\lceil N_{RB}^{DL}/P \rceil$ |
| HARQ Process number | 3 (FDD), 4 (TDD) |
| MCS, NDI and RV info for transport blocks transmitted from the first transmission point | 8 or 16 bits (See table 11) |
| MCS, NDI and RV info for transport blocks transmitted from the second transmission point | 8 or 16 bits (See table 11) |
| ... | ... |
| MCS, NDI and RV info for transport blocks transmitted from the Kth transmission point | 8 or 16 bits (See table 11) |
| Antenna port(s), scrambling identity and number of layers of the first transmission point (or point) | 3 or less |
| Antenna port(s), scrambling identity and number of layers of the second transmission point (or point) | 3 or less |
| ... | ... |
| Antenna port(s), scrambling identity and number of layers of the Kth transmission point (or point) | 3 or less |

TABLE 13-continued

| Information Field | Bit number |
| --- | --- |
| TPC for PUCCH of serving cell | 2 |
| DAI | 2 (TDD only) |
| CRC | 16 |

Example MCS, NDI, and RV information for transport blocks that may be transmitted from each Tx point are listed in Table 14 (below).

TABLE 14

| | |
| --- | --- |
| MCS transport block 1 | 5 |
| NDI transport block 1 | 1 |
| RV transport block 1 | 2 |
| MCS transport block 2 (only if 2 CWs are transmitted) | 5 |
| NDI transport block 2 (only if 2 CWs are transmitted) | 1 |
| RV transport block 2 (only if 2 CWs are transmitted) | 2 |

If each cell or Tx points signaling of antenna port(s), scrambling identity and number of layers is coded independent of other cells' signaling, then the maintenance of the one set of HARQ processes across the multiple cells or Tx points may follow Table 1.

Similar to PDCCH scheme above, the signaling of antenna port(s), scrambling identity and number of layers for all transmission points may be jointly coded and signaled. This PDCCH scheme may has the same impact of PDCCH search space as PDCCH scheme above.

After being configured in a Tx mode that allows dynamic switching between JT CoMP with different data across transmission points and single-cell MIMO operation, the WTRU 102 may monitor PDCCH format 2F and other appropriate PDCCH formats, for example, format 1A or 2C, in the common and WTRU-specific search spaces defined above. If a valid PDCCH format 2F is detected, then the WTRU 102 may apply this PDSCH assignment in its demodulation and may not process any other PDSCH assignment. From the received PDCCH format 2F, the WTRU 102 may obtain the information of MCS, NDI and RV of each transport block, antenna port(s), scrambling identity and number of layers of each transmission point. The WTRU 102 may apply this information to demodulate its PDSCH for one HARQ process across all transmission points, and process the demodulated data. Note that one HARQ process may contain up to 2K transport blocks (or codewords) instead of up to two in LTE.

In a second example solution, K separate PDCCHs may be used, and each PDCCH may signal one CoMP cell or Tx point PDSCH parameters. For example, for the case where up to two codewords are allowed per transmission point, DCI format 2C as defined in LTE-A may be used; for the case where only one codeword is allowed per transmission point, then the DCI format 1E defined in Table 8 maybe used.

Alternatively, the PDCCH format used for other transmission points other than the serving cell may use less payload than DCI format 2C or 1E by not including information fields that are common to all transmission points, and the PDCCH format used for the serving cell may include the common information fields such as HARQ process ID, RB assignment, resource allocation header, TPC and DAI.

Similar to PDCCH solution 2 of Method 1, in order to reduce the blind decoding complexity, a predefined relationship between the K PDCCHs WTRU may be used so that the WTRU may know which indices of the set of CCEs to decode for a second PDCCH once it successfully decodes the first PDCCH.

After being configured in a Tx mode that allows dynamic switching between JT CoMP with different data across transmission points and single-cell MIMO operation, the WTRU may monitor PDCCH format 2C or 1E (or 2C/1E with reduced payload) and other appropriate PDCCH formats, for example, format 1A, in the common and WTRU-specific search spaces. Unlike LTE, where only one PDSCH assignment may be applied/processed by the WTRU per frequency carrier at any TTI, in this example, the WTRU may receive and process up to K PDSCH assignments on the same frequency carrier.

If a predefined relationship between the K PDCCHs is applied, then the WTRU may know which indices of the set of CCEs to decode for a second PDCCH once it successfully decodes the first PDCCH by following the rule in equations (7) or (8). After receiving and processing K valid PDSCH assignments, the WTRU may not process any other PDSCH assignment. For each valid PDCCH format 2C or 1E that is detected, the WTRU may obtain the information of RB assignment, HARQ process number, MCS, NDI and RV of each transport block, antenna port(s), scrambling identity and number of layers of the corresponding transmission point. The WTRU may apply this information to demodulate its PDSCH for the HARQ process of the corresponding transmission point, and process the demodulated data accordingly. Alternatively, the WTRU may apply the common DL related information contained in the PDCCH received for the serving cell (such as HARQ process ID, RB assignment, etc.) to demodulation of PDSCH in all transmission points, and may apply the common UL related information contained in the PDCCH received for the serving cell (such as TPC etc.) to the uplink of its serving cell. There may be K (at least two) HARQ processes being demodulated at the WTRU on the same frequency carrier.

A timing adjustment for JT-PDSCH may be performed at the receiver of the WTRU 102. In an example where DM-RS is used for jointly transmitted PDSCH with the same data from different CoMP Tx points, for example, orthogonal in time and frequency domain, the WTRU 102 may compensate the timing offset between the different CoMP Tx points at the receiver using the following method.

The received DM-RS from the Tx-point m at subcarrier k may be denoted as:

$$\tilde{Y}_{p,k}^{(m,\tau)} = e^{\frac{-j2\pi k}{N}} y_{p,k}^{(m)}, \qquad (17)$$

where (m, τ) may be the timing offset from Tx-point m, $y_{p,k}^{(m)}$ may be the received RS symbol at subcarrier k without timing offset and N is the FFT points. Therefore, the received signals on two subcarriers with Δk subcarriers of distance may be presented as:

$$\tilde{Y}_{p,k}^{(m,\tau)} = e^{\frac{-j2\pi\tau k}{N}} Y_{p,k}^{(m)} \qquad (18)$$

$$\tilde{Y}_{p,k+\Delta k}^{(m,\tau)} = e^{\frac{-j2\pi\tau(k+\Delta k)}{N}} Y_{p,k+\Delta k}^{(m)}.$$

The received RS at subcarrier k may be expanded as:

$$\tilde{Y}_{p,k+\Delta k}^{(m,r)} = e^{\frac{-j\pi r(k+\Delta k)}{N}} Y_{p,k+\Delta k}^{(m)} = e^{\frac{-j\pi r(k+\Delta k)}{N}} H_{p,k}^{(m)} W_{p,k}^{(m)} X_{p,k}^{(m)}, \quad (19)$$

where $X_{p,k}^{(m)}$ may be the transmit RS symbol, $W_{p,k}^{(m)}$ may be the precoder for RS and $H_{p,k}^{(m)}$ may be the channel information.

Using equations 18 and 19, the WTRU 102 may calculate the timing offset τ by using a pair of RS with Δk subcarriers of distance:

$$\theta = (\tilde{Y}_{p,k+\Delta k}^{(m,r)} (X_{p,k+\Delta k}^{(m)})^*)(\tilde{Y}_{p,k}^{(m,r)} (X_{p,k}^{(m)})^*)^* \quad (20)$$

$$\theta = (e^{\frac{-j\pi r(k+\Delta k)}{N}} H_{p,k+\Delta k}^{(m)} W_{p,k+\Delta k}^{(m)} X_{p,k+\Delta k}^{(m)} (X_{p,k+\Delta k}^{(m)})^*)$$

$$(e^{\frac{-j\pi rk}{N}} H_{p,k}^{(m)} W_{p,k}^{(m)} X_{p,k}^{(m)} (X_{p,k}^{(m)})^*)^*$$

$$\theta = e^{\frac{-j\pi r\Delta k}{N}} (H_{p,k+\Delta k}^{(m)} W_{p,k+\Delta k}^{(m)})(H_{p,k}^{(m)} W_{p,k}^{(m)})^*$$

Since $W_{p,k+\Delta k}^{(m)} = W_{p,k}^{(m)}$, if they are at the same RB (or certain RBs), Equation (20) may be rewritten as:

$$\theta = e^{\frac{-j\pi r\Delta k}{N}} H_{p,k+\Delta k}^{(m)} (H_{p,k}^{(m)})^*. \quad (21)$$

If Δk is small, the channel coefficients may be further assumed $W_{p,k+\Delta k}^{(m)} \cong W_{p,k}^{(m)}$, therefore, Equation (21) may be approximated as:

$$\theta = |H_{p,k}^m|^2 = c_k e^{\frac{-j\pi r\Delta k}{N}} \quad (22)$$

where $c_k \in \mathbb{R}^+$ may be a positive number, therefore, the timing offset τ may be estimated as:

$$\hat{\tau} = \frac{-N}{2\pi \Delta k} \angle \theta \quad (23)$$

In general, to achieve a better estimation, Equation (22) may average multiple received RS, i.e., $$\hat{\tau} = \frac{-N}{2\pi \Delta k} \angle \mathbb{E}\{\Theta\} \quad (24)$$

The above derivation may not depend on information of precoder $W_{p,k}^{(m)}$, it may rely on $W_{p,k+\Delta k}^{(m)} \cong W_{p,k}^{(m)}$ and known RS symbols $X_{p,k}^{(m)}$.

CONCLUSION

Example Embodiments

In one embodiment, a method for carrying out CoMP reception may include receiving, at a WTRU, information for signaling to the WTRU to receive a forthcoming downlink transmission from a Tx point other than a serving cell of the WTRU; and responsive to the information, receiving the downlink transmission from the Tx point.

A method as in the preceding embodiment, wherein receiving the downlink transmission from the Tx point may include: any of (i) receiving time-domain orthogonal-frequency-division-multiplexed (OFDM) signals for a set of antenna ports, (ii) convert the time-domain OFDM signals for the set of antenna ports into corresponding modulation symbols for the set of antenna ports, (iii) performing decoding of any precoding of the modulation symbols for the set of antenna ports, (iv) performing layer mapping to map the de-precoded modulation symbols for the set of antenna ports to a set of transmission layers corresponding to the set of antenna ports; (v) demodulating the modulated symbols into scrambled bits, (vi) descrambling the scrambled bits into coded bits of one or more code words, and (vii) forming the code words from the descrambled coded bits.

A method as in one or more of the preceding embodiments, further including: receiving, at the WTRU, information for signaling to the WTRU to select a set of parameters for use with receiving the forthcoming downlink transmission from the Tx point.

A method as in one or more of the preceding embodiments, wherein the information for signaling to the WTRU to receive a forthcoming downlink transmission from a Tx point and the information for signaling to the WTRU to select a set of parameters for use with receiving the forthcoming downlink transmission is the same information.

A method as in one or more of the preceding embodiments, further including: using the information for signaling to the WTRU to receive a forthcoming downlink transmission as a signal to select a set of parameters for use with receiving the forthcoming downlink transmission from the Tx point.

A method as in one or more of the preceding embodiments, wherein the set of parameters may include: any of an index of antenna ports, a value for an initialization sequence for reference signal generation, a transmission mode, and a scrambling identity for use with initializing a reference-signal sequence.

A method as in one or more of the preceding embodiments, wherein the scrambling identity may include: any of a scrambling identity configured using layers above a physical layer, an identity of the WTRU, a radio network temporary identifier (RNTI) of the WTRU, an identity of the serving cell, an identity of a cell of the Tx point, and a carrier indicator field (CIF).

A method as in one or more of the preceding embodiments, wherein the information for signaling to the WTRU to receive a forthcoming downlink transmission may include: information explicitly signaling to the WTRU to receive the forthcoming downlink transmission from the Tx point.

A method as in one or more of the preceding embodiments, wherein the information for signaling to the WTRU to receive a forthcoming downlink transmission may include: information implicitly signaling to the WTRU to receive the forthcoming downlink transmission from the Tx point.

A method as in one or more of the preceding embodiments, wherein the information for signaling to the WTRU to receive a forthcoming downlink transmission may include: any of an explicit and implicit signal obtained by way of blind detection of a downlink control channel associated with the forthcoming downlink transmission.

A method as in one or more of the preceding embodiments, wherein the information for signaling to the WTRU to receive a forthcoming downlink transmission may include: a characteristic of downlink control information (DCI) received on a downlink control channel associated with the forthcoming downlink transmission.

A method as in one or more of the preceding embodiments, wherein the information for signaling to the WTRU to receive a forthcoming downlink transmission may include: a characteristic of DCI decoded on a downlink control channel associated with the forthcoming downlink transmission.

A method as in one or more of the preceding embodiments, wherein the information for signaling to the WTRU to receive a forthcoming downlink transmission may include: any of (i) a characteristic of DCI received on a downlink control channel associated with the forthcoming downlink transmission, and (ii) a characteristic of DCI decoded on the downlink control channel associated with the forthcoming downlink transmission.

A method as in one or more of the preceding embodiments, wherein the information for signaling to the WTRU to receive a forthcoming downlink transmission may include: any of (i) information associated with DCI received on a downlink control channel associated with the forthcoming downlink transmission, and (ii) information referenced by the received DCI.

A method as in one or more of the preceding embodiments, wherein the information for signaling to the WTRU to receive a forthcoming downlink transmission may include: any of (i) information associated with DCI decoded on a downlink control channel associated with the forthcoming downlink transmission, (ii) information included within the decoded DCI, (iii) information identified by the decoded DCI, and (iv) information referenced by the decoded DCI.

A method as in one or more of the preceding embodiments, wherein the information for signaling to the WTRU to receive a forthcoming downlink transmission may include: any of (i) information associated with DCI received on a downlink control channel associated with the forthcoming downlink transmission, (ii) information referenced by the received DCI, (iii) information associated with DCI decoded on a downlink control channel associated with the forthcoming downlink transmission, (iv) information included within the decoded DCI, (v) information identified by the decoded DCI, and (vi) information referenced by the decoded DCI.

A method as in one or more of the preceding embodiments, wherein the information for signaling to the WTRU to receive a forthcoming downlink transmission may include: a resource allocation of DCI received on a downlink control channel associated with the forthcoming downlink transmission.

A method as in one or more of the preceding embodiments, wherein the resource allocation may include: an index of a control channel element (CCE) of the downlink control channel associated with the downlink transmission.

A method as in one or more of the preceding embodiments, wherein the information for signaling to the WTRU to receive a forthcoming downlink transmission may include: a physical resource block assignment for the downlink transmission indicated in DCI decoded on a downlink control channel associated with the forthcoming downlink transmission.

A method as in one or more of the preceding embodiments, wherein the information for signaling to the WTRU to receive a forthcoming downlink transmission may include: a range of CCEs within a control channel search space where DCI is received on a downlink control channel associated with the forthcoming downlink transmission.

A method as in one or more of the preceding embodiments, wherein the control channel search space may include any of a WTRU-specific search space and a common search space.

A method as in one or more of the preceding embodiments, wherein the information for signaling to the WTRU to receive a forthcoming downlink transmission may include: an identity of a control channel search space where DCI is received on a downlink control channel associated with the forthcoming downlink transmission.

A method as in one or more of the preceding embodiments, wherein the control channel search space may include any of a WTRU-specific search space and a common search space.

A method as in one or more of the preceding embodiments, wherein the information for signaling to the WTRU to receive a forthcoming downlink transmission may include: DCI received on a downlink control channel associated with the forthcoming downlink transmission being decodable using a RNTI designated for CoMP transmissions.

A method as in one or more of the preceding embodiments, wherein the information for signaling to the WTRU to receive a forthcoming downlink transmission may include: signaling indicated in DCI decoded on a downlink control channel associated with the forthcoming downlink transmission.

A method as in one or more of the preceding embodiments, wherein the signaling may include at least one bit for signaling CoMP transmissions.

A method as in one or more of the preceding embodiments, wherein the information for signaling to the WTRU to receive a forthcoming downlink transmission may include: a size of DCI decoded on a downlink control channel associated with the forthcoming downlink transmission.

A method as in one or more of the preceding embodiments, wherein the size of DCI may include: any of (i) a size that is indicative of a CoMP transmission, and (ii) a size that is not indicative of a non-CoMP transmission.

A method as in one or more of the preceding embodiments, wherein the information for signaling to the WTRU to receive a forthcoming downlink transmission may include: a number of transmission points of a CoMP cooperating set that may include the Tx point and the serving cell.

A method as in one or more of the preceding embodiments, wherein the information for signaling to the WTRU to receive a forthcoming downlink transmission may include: an antenna port index.

A method as in one or more of the preceding embodiments, further including: detecting a presence of a co-scheduled coordinated multi-point (CoMP) transmission device.

A method as in one or more of the preceding embodiments, further including: initializing a demodulation reference signal (DM-RS) sequence of the CoMP transmission device.

A method as in one or more of the preceding embodiments, wherein detecting a presence of a co-scheduled coordinated multi-point (CoMP) transmission device is performed in a multi-user multiple input multiple output (MU-MIMO) operation.

A method as in one or more of the preceding embodiments, further including: initializing a demodulation reference signal (DM-RS) sequence of a CoMP transmission device.

A method as in one or more of the preceding embodiments, further including: receiving a physical downlink shared channel (PDSCH) from a transmission (Tx) point.

A method as in one or more of the preceding embodiments, further including: determining a set of parameters to use for receiving the forthcoming downlink transmission.

A method as in one or more of the preceding embodiments, wherein determining a set of parameters to use for receiving the forthcoming downlink transmission may include: selecting a set of parameters, from a plurality of sets of parameters provisioned in the WTRU, based on a characteristic of DCI received on a downlink control channel associated with the forthcoming downlink transmission.

A method as in one or more of the preceding embodiments, wherein determining a set of parameters to use for receiving the forthcoming downlink transmission may include: selecting a set of parameters, from a plurality of sets of parameters provisioned in the WTRU, based on a characteristic of DCI decoded on a downlink control channel associated with the forthcoming downlink transmission.

A method as in one or more of the preceding embodiments, wherein determining a set of parameters to use for receiving the forthcoming downlink transmission may include: selecting a set of parameters, from a plurality of sets of parameters provisioned in the WTRU, based on any of (i) a characteristic of DCI received on a downlink control channel associated with the forthcoming downlink transmission, and (ii) a characteristic of DCI decoded on the downlink control channel associated with the forthcoming downlink transmission.

A method as in one or more of the preceding embodiments, wherein determining a set of parameters to use for receiving the forthcoming downlink transmission may include: selecting a set of parameters, from a plurality of sets of parameters provisioned in the WTRU, based on any of (i) information associated with DCI received on a downlink control channel associated with the forthcoming downlink transmission, and (ii) information referenced by the received DCI.

A method as in one or more of the preceding embodiments, wherein determining a set of parameters to use for receiving the forthcoming downlink transmission may include: selecting a set of parameters, from a plurality of sets of parameters provisioned in the WTRU, based on any of (i) information associated with DCI decoded on a downlink control channel associated with the forthcoming downlink transmission, (ii) information included within the decoded DCI, (iii) information identified by the decoded DCI, and (iv) information referenced by the decoded DCI.

A method as in one or more of the preceding embodiments, wherein determining a set of parameters to use for receiving the forthcoming downlink transmission may include: selecting a set of parameters, from a plurality of sets of parameters provisioned in the WTRU, based on any of (i) information associated with DCI received on a downlink control channel associated with the forthcoming downlink transmission, (ii) information referenced by the received DCI, (iii) information associated with DCI decoded on a downlink control channel associated with the forthcoming downlink transmission, (iv) information included within the decoded DCI, (v) information identified by the decoded DCI, and (vi) information referenced by the decoded DCI.

A method as in one or more of the preceding embodiments, wherein determining a set of parameters to use for receiving the forthcoming downlink transmission may include: determining the set of parameters based, at least in part, on a resource allocation of DCI received on a downlink control channel associated with the forthcoming downlink transmission.

A method as in one or more of the preceding embodiments, wherein determining a set of parameters to use for receiving the forthcoming downlink transmission may include: determining the set of parameters based, at least in part, a physical resource block assignment indicated in DCI decoded on a downlink control channel associated with the forthcoming downlink transmission.

A method as in one or more of the preceding embodiments, wherein determining a set of parameters to use for receiving the forthcoming downlink transmission may include: determining the set of parameters based, at least in part, on a physical downlink control channel search space where DCI is received on a downlink control channel associated with the forthcoming downlink transmission.

A method as in one or more of the preceding embodiments, wherein determining a set of parameters to use for receiving the forthcoming downlink transmission may include: determining the set of parameters based, at least in part, on a RNTI used to decode DCI received on a downlink control channel associated with the forthcoming downlink transmission.

A method as in one or more of the preceding embodiments, wherein determining a set of parameters to use for receiving the forthcoming downlink transmission may include: determining the set of parameters based, at least in part, on signaling indicated in DCI decoded on a downlink control channel associated with the forthcoming downlink transmission.

A method as in one or more of the preceding embodiments, wherein the signaling may include at least one bit for signaling the forthcoming downlink transmission.

A method as in one or more of the preceding embodiments, wherein the signaling may include at least one bit for signaling a number of Tx points of a CoMP cooperating set that may include the Tx point and the serving cell.

A method as in one or more of the preceding embodiments, wherein the signaling may include at least one bit for signaling antenna port indexes.

A method as in one or more of the preceding embodiments, wherein the antenna port indexes comprise: any of (i) antenna port indexes for all data, (ii) antenna port indexes for each code word, (iii) antenna port indexes for each Tx point of a CoMP cooperating set that may include the Tx point and the serving cell, and (iv) antenna port indexes for the CoMP cooperating set.

A method as in one or more of the preceding embodiments, wherein determining a set of parameters to use for receiving the forthcoming downlink transmission may include: determining the set of parameters based, at least in part, on a size of DCI decoded on a downlink control channel associated with the forthcoming downlink transmission.

A method as in one or more of the preceding embodiments, wherein the size of DCI may include: any of (i) a size that is indicative of a CoMP transmission, and (ii) a size that is not indicative of a non-CoMP transmission.

A method as in one or more of the preceding embodiments, wherein determining a set of parameters to use for receiving the forthcoming downlink transmission may include: determining the set of parameters based, at least in part, on an antenna port index.

A method as in one or more of the preceding embodiments, wherein determining a set of parameters to use for receiving the forthcoming downlink transmission may include: determining the set of parameters based, at least in part, on an antenna port index signaled in DCI decoded on a downlink control channel associated with the forthcoming downlink transmission.

A method as in one or more of the preceding embodiments, wherein determining a set of parameters to use for receiving the forthcoming downlink transmission may include: determining the set of parameters based, at least in part, on a subframe type.

A method as in one or more of the preceding embodiments, wherein determining a set of parameters to use for receiving the forthcoming downlink transmission may include: determining the set of parameters based, at least in part, on timing information.

A method as in one or more of the preceding embodiments, wherein determining a set of parameters to use for receiving the forthcoming downlink transmission may include: determining the set of parameters based, at least in part, on a carrier frequency of a physical downlink shared channel (PDSCH) of the forthcoming downlink transmission.

A method as in one or more of the preceding embodiments, wherein determining a set of parameters to use for receiving the forthcoming downlink transmission may include: determining the set of parameters based, at least in part, on a carrier index.

A method as in one or more of the preceding embodiments, wherein determining a set of parameters to use for receiving the forthcoming downlink transmission may include: determining the set of parameters based, at least in part, on a cell index.

A method as in one or more of the preceding embodiments, wherein determining a set of parameters to use for receiving the forthcoming downlink transmission may include: determining the set of parameters based, at least in part, on a number of transmission points of a CoMP cooperating set that may include the Tx point and the a serving cell.

A method as in one or more of the preceding embodiments, wherein the forthcoming downlink transmission may include: a physical downlink shared channel (PDSCH) of the WTRU; wherein determining a set of parameters to use for receiving the forthcoming downlink transmission may include: determining the set of parameters to receive the PDSCH of the WTRU; and wherein receiving the downlink transmission from the Tx point may include: receiving the PDSCH of the WTRU using the determined set of parameters.

A method as in one or more of the preceding embodiments, wherein the forthcoming downlink transmission may include: a PDSCH of the WTRU, and wherein receiving the downlink transmission from the Tx point may include: receiving the PDSCH of the WTRU.

In an embodiment, a wireless transmit and/or receive unit (WTRU) may include a receiver and a processor, wherein the receiver is adapted to: receive information for signaling to the WTRU to receive a forthcoming downlink transmission from a transmission (Tx) point other than a serving cell of the WTRU; and receive the downlink transmission from the Tx point; and wherein the processor is adapted to process the information, and instruct the receiver to receive the downlink transmission from the Tx point.

A WTRU as in the preceding embodiment, wherein the receiver is further adapted to receive information for signaling to the WTRU to select a set of parameters to use for receiving the forthcoming downlink transmission from the Tx point.

A WTRU as in one or more of the preceding embodiments, wherein the information for signaling to the WTRU to receive a forthcoming downlink transmission from a Tx point and the information for signaling to the WTRU to select a set of parameters to use for receiving the forthcoming downlink transmission is the same information.

A WTRU as in one or more of the preceding embodiments, wherein the processor is further adapted to use the information for signaling to the WTRU to receive a forthcoming downlink transmission from a Tx point as a signal to select, and provide to the receiver, a set of parameters to use for receiving the forthcoming downlink transmission.

A WTRU as in one or more of the preceding embodiments, wherein the set of parameters may include: any of an index of antenna ports, a value for an initialization sequence for reference signal generation, a transmission mode, and a scrambling identity for use with initializing a reference-signal sequence.

A WTRU as in one or more of the preceding embodiments, wherein the scrambling identity may include: any of a scrambling identity configured using layers above a physical layer, an identity of the WTRU, a RNTI, an identity of the serving cell, and a CIF.

A WTRU as in one or more of the preceding embodiments, wherein the information for signaling to the WTRU to receive a forthcoming downlink transmission may include: information explicitly signaling to the WTRU to receive the forthcoming downlink transmission.

A WTRU as in one or more of the preceding embodiments, wherein the information for signaling to the WTRU to receive a forthcoming downlink transmission may include: information implicitly signaling to the WTRU to receive the forthcoming downlink transmission.

A WTRU as in one or more of the preceding embodiments, wherein the information for signaling to the WTRU to receive a forthcoming downlink transmission may include: any of an explicit and implicit signal obtained by way of blind detection of a downlink control channel associated with the forthcoming downlink transmission.

In an embodiment, a method for carrying out CoMP reception may include receiving, at a WTRU, information for signaling to the WTRU to receive a forthcoming downlink transmission from a Tx point other than a serving cell of the WTRU; determining, at the WTRU, a set of parameters to use for receiving the forthcoming downlink transmission from the Tx point based, at least in part, on the received information; and receiving the downlink transmission from the Tx point using the determined set of parameters.

A method as in the preceding embodiment, wherein the determined set of parameters may include: any of an index of antenna ports, a value for an initialization sequence for reference signal generation, a transmission mode, and a scrambling identity for use with initializing a reference-signal sequence.

A method as in one or more of the preceding embodiments, wherein the scrambling identity may include: any of a scrambling identity configured using layers above a physical layer, an identity of the WTRU, a RNTI, an identity of the serving cell, and a CIF.

A method as in one or more of the preceding embodiments, wherein the information for signaling to the WTRU to receive a forthcoming downlink transmission may include: information explicitly signaling to the WTRU to receive the forthcoming downlink transmission.

A method as in one or more of the preceding embodiments, wherein the information for signaling to the WTRU to receive a forthcoming downlink transmission may include: information implicitly signaling to the WTRU to receive the forthcoming downlink transmission.

A method as in one or more of the preceding embodiments, wherein the information for signaling to the WTRU to receive a forthcoming downlink transmission may include: any of an explicit and implicit signal obtained by way of blind detection of a downlink control channel associated with the forthcoming downlink transmission.

A method as in one or more of the preceding embodiments, wherein the information for signaling to the WTRU to receive a forthcoming downlink transmission may include: a resource allocation of DCI decoded on a downlink control channel associated with the forthcoming downlink transmission.

A method as in one or more of the preceding embodiments, wherein the resource allocation may include: an index to a CCE of the downlink control channel associated with the downlink transmission.

A method as in one or more of the preceding embodiments, wherein the information for signaling to the WTRU to receive a forthcoming downlink transmission may include: a physical resource block assignment indicated in DCI decoded on a downlink control channel associated with the forthcoming downlink transmission.

A method as in one or more of the preceding embodiments, wherein the information for signaling to the WTRU to receive a forthcoming downlink transmission may include: a range of CCEs within a control channel search space where DCI is received on a downlink control channel associated with the forthcoming downlink transmission.

A method as in one or more of the preceding embodiments, wherein the control channel search space may include any of a WTRU-specific search space and a common search space.

A method as in one or more of the preceding embodiments, wherein the information for signaling to the WTRU to receive a forthcoming downlink transmission may include: an identity of a control channel search space where DCI is received on a downlink control channel associated with the forthcoming downlink transmission.

A method as in one or more of the preceding embodiments, wherein the control channel search space may include any of a WTRU-specific search space and a common search space.

A method as in one or more of the preceding embodiments, wherein the information for signaling to the WTRU to receive a forthcoming downlink transmission may include: DCI received on a downlink control channel associated with the forthcoming downlink transmission being decodable using a RNTI designated for CoMP transmissions.

A method as in one or more of the preceding embodiments, wherein determining a set of parameters to use for receiving the forthcoming downlink transmission may include: determining the set of parameters based, at least in part, the RNTI designated for CoMP transmissions.

A method as in one or more of the preceding embodiments, wherein the information for signaling to the WTRU to receive a forthcoming downlink transmission may include: signaling indicated in DCI decoded on a downlink control channel associated with the forthcoming downlink transmission.

A method as in one or more of the preceding embodiments, wherein the signaling may include at least one bit for signaling the forthcoming downlink transmission.

A method as in one or more of the preceding embodiments, wherein the information for signaling to the WTRU to receive a forthcoming downlink transmission may include: a size of DCI decoded on a downlink control channel associated with the forthcoming downlink transmission.

A method as in one or more of the preceding embodiments, wherein the size of DCI may include: any of (i) a size that is indicative of a CoMP transmission, and (ii) a size that is not indicative of a non-CoMP transmission.

A method as in one or more of the preceding embodiments, wherein the information for signaling to the WTRU to receive a forthcoming downlink transmission may include: a number of transmission points of a CoMP cooperating set that may include the Tx point and the a serving cell.

A method as in one or more of the preceding embodiments, wherein the information for signaling to the WTRU to receive a forthcoming downlink transmission may include: an antenna port index.

A method as in one or more of the preceding embodiments, further including: detecting a presence of a co-scheduled coordinated multi-point (CoMP) transmission device.

A method as in one or more of the preceding embodiments, further including: initializing a demodulation reference signal (DM-RS) sequence of the CoMP transmission device.

A method as in one or more of the preceding embodiments, wherein detecting a presence of a co-scheduled coordinated multi-point (CoMP) transmission device is performed in a multi-user multiple input multiple output (MU-MIMO) operation.

A method as in one or more of the preceding embodiments, further including: initializing a demodulation reference signal (DM-RS) sequence of a CoMP transmission device.

A method as in one or more of the preceding embodiments, further including: receiving a physical downlink shared channel (PDSCH) from a transmission (Tx) point.

A method as in one or more of the preceding embodiments, wherein the information for signaling to the WTRU to receive a forthcoming downlink transmission may include: a subframe type.

A method as in one or more of the preceding embodiments, wherein the information for signaling to the WTRU to receive a forthcoming downlink transmission may include: timing information.

A method as in one or more of the preceding embodiments, wherein the information for signaling to the WTRU to receive a forthcoming downlink transmission may include: a carrier frequency of a PDSCH of the forthcoming downlink transmission.

A method as in one or more of the preceding embodiments, wherein the information for signaling to the WTRU to receive a forthcoming downlink transmission may include: a carrier index.

A method as in one or more of the preceding embodiments, wherein the information for signaling to the WTRU to receive a forthcoming downlink transmission may include: a cell index.

A method as in one or more of the preceding embodiments, wherein the information for signaling to the WTRU to receive a forthcoming downlink transmission may include: a number of transmission points of a CoMP cooperating set that may include the Tx point and the a serving cell.

A method as in one or more of the preceding embodiments, wherein the forthcoming downlink transmission may include: a physical downlink shared channel (PDSCH) of the WTRU; wherein determining a set of parameters to use for receiving the forthcoming downlink transmission may include: determining the set of parameters to receive the PDSCH of the WTRU; and wherein receiving the downlink transmission from the Tx point may include: receiving the PDSCH of the WTRU using the determined set of parameters.

A method as in one or more of the preceding embodiments, wherein the forthcoming downlink transmission may include: a PDSCH of the WTRU, and wherein receiving the downlink transmission from the Tx point may include: receiving the PDSCH of the WTRU.

In an embodiment, a WTRU may include a receiver and a processor, wherein the receiver is adapted to receive information for signaling to the WTRU to receive a forthcoming downlink transmission from a Tx point other than a serving cell of the WTRU, and receive the downlink transmission from the Tx point; and the processor is adapted to determine a set of parameters to use for receiving the forthcoming downlink transmission from the Tx based, at least in part, on the received information, and instruct the receiver to receive the downlink transmission from the Tx point using the determined set of parameters.

A WTRU as in the preceding embodiment, wherein the determined set of parameters may include: any of an index of antenna ports, a value for an initialization sequence for reference signal generation, a transmission mode, and a scrambling identity for use with initializing a reference-signal sequence.

A WTRU as in one or more of the preceding embodiments, wherein the scrambling identity may include: any of a scrambling identity configured using layers above a physical layer, an identity of the WTRU, a RNTI, an identity of the serving cell, and a CIF.

A WTRU as in one or more of the preceding embodiments, wherein the information for signaling to the WTRU to receive a forthcoming downlink transmission may include: information explicitly signaling to the WTRU to receive the forthcoming downlink transmission.

A WTRU as in one or more of the preceding embodiments, wherein the information for signaling to the WTRU to receive a forthcoming downlink transmission may include: information implicitly signaling to the WTRU to receive the forthcoming downlink transmission.

A WTRU as in one or more of the preceding embodiments, wherein the information for signaling to the WTRU to receive a forthcoming downlink transmission may include: any of an explicit and implicit signal obtained by way of blind detection of a downlink control channel associated with the forthcoming downlink transmission.

Method Claims from Network Side

In an embodiment, a method for carrying out CoMP transmission may include generating a downlink transmission, at a Tx point other than a serving cell of a WTRU) using a set of system parameters of the Tx point; transmitting, from the serving cell, information, information for signaling to the WTRU to receive the downlink transmission from the Tx point; and transmitting the downlink transmission from the Tx point to the WTRU.

A method as in the preceding embodiment, further including: transmitting information for signaling to the WTRU to select a set of parameters to use for receiving the downlink transmission from the Tx point.

A method as in one or more of the preceding embodiments, wherein the information for signaling to the WTRU to receive the downlink transmission and the information for signaling to the WTRU to select a set of parameters to use for receiving the downlink transmission are the same information.

In an embodiment, a system may include a serving cell of a WTRU and a Tx point other than the serving cell, wherein the Tx point is configured to generate a downlink transmission using a set of system parameters of the Tx point, and to transmit the downlink transmission to the WTRU; and wherein the serving cell is configured to transmit information for signaling to the WTRU to receive the downlink transmission from the Tx point.

A system as in the preceding embodiment, wherein the serving cell is further configured to: transmit information for signaling to the WTRU to select a set of parameters to use for receiving the downlink transmission.

A system as in one or more of the preceding embodiments, wherein the information for signaling to the WTRU to receive the CoMP downlink transmission and the information for signaling to the WTRU to select a set of parameters to use for receiving the CoMP downlink transmission are the same information.

In an embodiment, a method may include generating a downlink transmission, at a Tx point other than a serving cell of a WTRU, using a set of system parameters common to the Tx point and to serving cell; and transmitting the downlink transmission from the Tx point to the WTRU.

A method as in the preceding embodiment, further including: provisioning the Tx point with the set of system parameters.

A method as in one or more of the preceding embodiments, wherein provisioning the Tx point with the set of system parameters may include: configuring a CoMP cooperating set including the Tx point and the serving cell.

A method as in one or more of the preceding embodiments, wherein the set of system parameters may include: a set of system parameters of the serving cell.

A method as in one or more of the preceding embodiments, wherein provisioning the Tx point with the set of system parameters may include: provisioning the Tx point a set of system parameters of the serving cell transmitted from serving cell.

A method as in one or more of the preceding embodiments, further including: provisioning the serving cell with the set of system parameters.

A method as in one or more of the preceding embodiments, further including: transmitting information for signaling to the WTRU to receive the downlink transmission.

A method as in one or more of the preceding embodiments, further including: transmitting, from the serving cell, information for signaling to the WTRU to receive the downlink transmission.

A method as in one or more of the preceding embodiments, wherein the downlink transmission is a joint transmission (JT) CoMP transmission including first and second downlink transmissions, and wherein transmitting the downlink transmission may include: transmitting the first and second downlink transmissions to the WTRU from the Tx point and the serving cell, respectively.

A method as in one or more of the preceding embodiments, further including: transmitting information for signaling to the WTRU to receive the first and second downlink transmissions.

A method as in one or more of the preceding embodiments, further including: transmitting, from the serving cell, information for signaling to the WTRU to receive the first and second downlink transmissions.

A method as in one or more of the preceding embodiments, wherein the set of system parameters may include: a set of system parameters for use with scrambling the downlink transmission.

A method as in one or more of the preceding embodiments, wherein the set of system parameters for use with scrambling the downlink transmission may include: any of (i) a Tx point identifier, (ii) a timeslot index within a radio frame, and (iii) a RNTI of the WTRU.

A method as in one or more of the preceding embodiments, wherein the Tx identifier is a cell identifier of the serving cell.

A method as in one or more of the preceding embodiments, wherein generating a downlink transmission may include: initializing a scrambling sequence generator with an initialization sequence, wherein the initialization sequence is based on the set of system parameters for use with scrambling the downlink transmission; and scrambling, at the Tx point, the downlink transmission using the initialized scrambling sequence generator.

A method as in one or more of the preceding embodiments, wherein the initialization sequence may include: any of (i) an identifier common to the Tx point and to the serving cell, (ii) a timeslot index within a radio frame, and (iii) a RNTI of the WTRU.

A method as in one or more of the preceding embodiments, wherein the initialization sequence may include: any of (i) an identifier of the serving cell, (ii) a timeslot index within a radio frame, and (iii) a RNTI of the WTRU.

A method as in one or more of the preceding embodiments, wherein the set of system parameters common to the Tx point and to the serving cell may include: at least one system parameter for use with designating an antenna port.

A method as in one or more of the preceding embodiments, wherein the set of system parameters common to the Tx point and to the serving cell may include: at least one system parameter for use with scrambling a reference-signal sequence for generating reference signals specific to the WTRU.

A method as in one or more of the preceding embodiments, wherein the at least one system parameter for use with scrambling a reference-signal sequence may include: any of (i) an identifier common to the Tx point and to the serving cell, (ii) a slot number associated with the downlink transmission, and (iii) a scrambling identifier common to the Tx point and to the serving cell.

A method as in one or more of the preceding embodiments, wherein generating a downlink transmission may include: generating, at the Tx point, the reference signals specific to the WTRU using a pseudorandom sequence generator initialized with an initialization sequence that is based on the at least one system parameter for use with scrambling a reference-signal sequence.

A method as in one or more of the preceding embodiments, wherein the at least one system parameter for use with scrambling a reference-signal sequence may include: any of (i) an identifier common to the Tx point and to the serving cell, (ii) a slot number associated with the downlink transmission, and (iii) a scrambling identifier common to Tx point and to the serving cell.

A method as in one or more of the preceding embodiments, wherein the at least one system parameter for use with scrambling a reference-signal sequence may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init}=(\lfloor n_{s\_common}/2 \rfloor +1) \cdot (2N_{ID}^{common}+1) \cdot 2^{16} + n_{SCID\_common}.$$

A method as in one or more of the preceding embodiments, further including: configuring a CoMP cooperating set including the Tx point and the serving cell, wherein the at least one system parameter for use with scrambling a reference-signal sequence may include: (i) an identifier of the CoMP cooperating set, $N_{ID}^{CoMP\ set}$; (ii) a slot number associated with the downlink transmission, $n_{s\_CoMP\ set}$; and (iii) a scrambling identifier of the CoMP cooperating set, $n_{SCID\_CoMP\ set}$, and wherein the initialization sequence may include:

$$c_{init}=(\lfloor n_{s\_CoMP\ set}/2 \rfloor +1) \cdot (2N_{ID}^{CoMP\ set}+1) \cdot 2^{16} + n_{SCID\_CoMP\ set}.$$

A method as in one or more of the preceding embodiments, wherein the at least one system parameter for use with scrambling a reference-signal sequence may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$, and wherein the initialization sequence may include:

$$c_{init}=(\lfloor n_{s\_serving\ cell}/2 \rfloor +1) \cdot (2N_{ID}^{serving\ cell}+1) \cdot 2^{16} + n_{SCID\_serving\ cell}.$$

A method as in one or more of the preceding embodiments, wherein the set of system parameters common to the Tx point and to the serving cell may include: at least one system parameter for use with precoding of any of the downlink transmission and reference signals specific to the WTRU.

A method as in one or more of the preceding embodiments, wherein the set of system parameters common to the Tx point and to the serving cell may include: at least one system parameter for use with assigning a physical downlink control channel (PDCCH) of with the downlink transmission.

In and embodiment, a method may include generating a downlink transmission, at a Tx point other than a serving cell of a WTRU, using a set of system parameters common to the Tx point and to the serving cell; transmitting, from the serving cell, information for signaling to the WTRU to receive the downlink transmission; and transmitting the downlink transmission from the Tx point to the WTRU.

A method as in the preceding embodiment, further including: transmitting information for signaling to the WTRU to select a set of parameters for receiving the downlink transmission.

A method as in one or more of the preceding embodiments, wherein the information for signaling to the WTRU to receive the downlink transmission and the information for signaling to the WTRU to select a set of parameters for receiving the downlink transmission are the same information.

In an embodiment, a method may include generating a first downlink transmission, at a Tx point other than a serving cell of a WTRU, using a set of system parameters common to the Tx point and to the serving cell; generating, at the serving cell, a second downlink transmission using the set of system parameters common to the Tx point and to the serving cell; transmitting, from the serving cell, information for signaling to the WTRU to receive the first and second downlink transmissions; and transmitting, to the WTRU, the first and second downlink transmissions from the Tx point and the serving cell, respectively.

A method as in one or more of the preceding embodiments, further including: transmitting information for signaling to the WTRU to select a set of parameters for receiving the first and second downlink transmissions.

A method as in one or more of the preceding embodiments, wherein the information for signaling to the WTRU to receive the first and second downlink transmissions and the information for signaling to the WTRU to select a set of parameters for receiving the first and second downlink transmissions are the same information.

In an embodiment, a system may include a serving cell of a WTRU and a Tx point other than the serving cell, wherein the Tx point is configured to generate a downlink transmission using a set of system parameters common to the Tx point and to the serving cell, and to transmit the downlink transmission to the WTRU.

A system as in the preceding embodiment, wherein the Tx point is configured with the set of system parameters common to the Tx point and to the serving cell.

A system as in one or more of the preceding embodiments, further including: a CoMP controller configured to: configure a CoMP cooperating set including the Tx point and the serving cell.

A system as in one or more of the preceding embodiments, wherein the Tx point is further configured to receive a set of system parameters of the serving cell, and use the set of system parameters of the serving cell as the set of system parameters common to the Tx point and to the serving cell.

A system as in one or more of the preceding embodiments, wherein the set of system parameters of the serving cell is transmitted from the serving cell.

A system as in one or more of the preceding embodiments, wherein the serving cell is configured with the set of system parameters common to the Tx point and to the serving cell.

A system as in one or more of the preceding embodiments, wherein any of the Tx point and serving cell are configured to: transmit information for signaling to the WTRU to receive the downlink transmission.

A system as in one or more of the preceding embodiments, wherein the downlink transmission is a joint transmission (JT) CoMP downlink transmission, and wherein the Tx point and serving cell are configured to transmit first and second downlink transmissions to the WTRU, respectively.

A system as in one or more of the preceding embodiments, wherein any of the Tx point and serving cell are configured to: transmit information for signaling to the WTRU to receive the first and second downlink transmissions.

A system as in one or more of the preceding embodiments, wherein the set of system parameters common to the Tx point and to the serving cell may include: at least one system parameter for use with scrambling the CoMP downlink transmission.

A system as in one or more of the preceding embodiments, wherein the at least one system parameter for use with scrambling the CoMP downlink transmission may include: any of (i) an identifier common to the Tx point and to the serving cell, (ii) a timeslot index within a radio frame, and (iii) a radio network temporary identifier (RNTI) of the WTRU.

A system as in one or more of the preceding embodiments, wherein the at least one system parameter for use with scrambling the CoMP downlink transmission may include: any of (i) an identifier of the serving cell, (ii) a timeslot index within a radio frame, and (iii) a RNTI of the WTRU.

A system as in one or more of the preceding embodiments, wherein the Tx point may include a scrambling sequence generator initialized with an initialization sequence that is based on the at least one system parameter for use with scrambling the CoMP downlink transmission.

A system as in one or more of the preceding embodiments, wherein the initialization sequence may include: any of (i) an identifier common to the Tx point and to the serving cell, (ii) a timeslot index within a radio frame, and (iii) a RNTI of the WTRU.

A system as in one or more of the preceding embodiments, wherein the initialization sequence may include: any of (i) an identifier of the serving cell, (ii) a timeslot index within a radio frame, and (iii) a RNTI of the WTRU.

A system as in one or more of the preceding embodiments, wherein the set of system parameters common to the Tx point and to the serving cell may include: at least one system parameter for use with designating an antenna port.

A system as in one or more of the preceding embodiments, wherein the set of system parameters common to the Tx point and to the serving cell may include: at least one system parameter for use with scrambling a reference-signal sequence for generating reference signals specific to the WTRU.

A system as in one or more of the preceding embodiments, wherein the at least one system parameter for use with scrambling a reference-signal sequence may include: any of (i) an identifier common to the Tx point and to the serving cell, (ii) a slot number associated with the downlink transmission, and (iii) a scrambling identifier common to the Tx point and to the serving cell.

A system as in one or more of the preceding embodiments, wherein the Tx point may include a pseudorandom sequence generator initialized with an initialization sequence that is based on the at least one system parameter for use with scrambling a reference-signal sequence.

A system as in one or more of the preceding embodiments, wherein the at least one system parameter for use with scrambling a reference-signal sequence may include: any of (i) an identifier common to the Tx point and to the serving cell, (ii) a slot number associated with the downlink transmission, and (iii) a scrambling identifier common to the Tx point and to the serving cell.

A system as in one or more of the preceding embodiments, wherein the at least one system parameter for use with scrambling a reference-signal sequence may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init} = (\lfloor n_{s\_common}/2 \rfloor + 1) \cdot (2N_{ID}^{common} + 1) \cdot 2^{16} + n_{SCID\_common}.$$

A system as in one or more of the preceding embodiments, further including: configuring a CoMP cooperating set including the Tx point and the serving cell, wherein the at least one system parameter for use with scrambling a reference-signal sequence may include: (i) an identifier of the CoMP cooperating set, $N_{ID}^{CoMP\ set}$; (ii) a slot number associated with the downlink transmission, $n_{SCID\_CoMP\ set}$; and (iii) a scrambling identifier of the CoMP cooperating set, n and wherein the initialization sequence may include:

$$c_{init} = (\lfloor n_{s\_CoMP\ set}/2 \rfloor + 1) \cdot (2N_{ID}^{CoMP\ set} + 1) \cdot 2^{16} + n_{SCID\_CoMP\ set}$$

A system as in one or more of the preceding embodiments, wherein the at least one system parameter for use with scrambling a reference-signal sequence may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$, and wherein the initialization sequence may include:

$$c_{init} = (\lfloor n_{s\_serving\ cell}/2 \rfloor + 1) \cdot (2N_{ID}^{serving\ cell} + 1) \cdot 2^{16} + n_{SCID\_serving\ cell}.$$

A system as in one or more of the preceding embodiments, wherein the set of system parameters common to the Tx point and to the serving cell may include: at least one system parameter for use with precoding of any of the downlink transmission and reference signals specific to the WTRU.

A system as in one or more of the preceding embodiments, wherein the set of system parameters common to the Tx point and to the serving cell may include: at least one system parameter for use with assigning a physical downlink control channel (PDCCH) associated with the downlink transmission.

In an embodiment, a system may include a serving cell of a WTRU and a Tx point other than the serving cell, wherein the Tx point is configured to generate a downlink transmission using a set of system parameters common to the Tx point and to the serving cell, and to transmit the downlink transmission to the WTRU; and wherein the serving cell is configured to transmit information for signaling to the WTRU to receive the downlink transmission.

A system as in the preceding embodiment\, wherein the serving cell is further configured to: transmit information for signaling to the WTRU to select a set of parameters for receiving the downlink transmission.

A system as in one or more of the preceding embodiments, wherein the information for signaling to the WTRU to receive the downlink transmission and the information for signaling to the WTRU to select a set of parameters for receiving the downlink transmission are the same information.

In an embodiment, a system may include a serving cell of a WTRU and a Tx point other than the serving cell, wherein the Tx point is configured to generate a first downlink transmission using a set of system parameters common to the Tx point and to the serving cell, and to transmit the first CoMP downlink transmission to the WTRU; and the serving cell is configured to generate a second downlink transmission using the set of system parameters common to the Tx point and to the serving cell, transmit the second CoMP downlink transmission to the WTRU, and transmit information for signaling to the WTRU to receive the first and second downlink transmissions.

A system as in the preceding embodiment, wherein the serving cell is further configured to: transmit information for signaling to the WTRU to select a set of parameters for receiving the first and second downlink transmissions.

A system as in one or more of the preceding embodiments, wherein the information for signaling to the WTRU to receive the first and second downlink transmissions and the information for signaling to the WTRU to select a set of parameters for receiving the first and second downlink transmission are the same information.

In an embodiment, a method may include receiving, at a WTRU, information for signaling to the WTRU to receive a forthcoming downlink transmission generated using a set of system parameters common to a serving cell of the WTRU and a Tx point other than the serving cell; and receiving the downlink transmission from the Tx point at the WTRU.

A method as in the preceding embodiment, further including: receiving, at the WTRU, information for signaling to the WTRU to select a set of parameters for receiving the forthcoming downlink transmission.

A method as in one or more of the preceding embodiments, wherein the information for signaling to the WTRU to receive a forthcoming downlink transmission and the information for signaling to the WTRU to select a set of parameters for receiving the forthcoming downlink transmission is the same information.

A method as in one or more of the preceding embodiments, further including: using the information for signaling to the WTRU to receive a forthcoming downlink transmission as a signal to select a set of parameters for receiving the forthcoming downlink transmission.

A method as in one or more of the preceding embodiments, wherein the set of parameters for receiving the forthcoming downlink transmission correspond to the set of system parameters common to the Tx point and the serving cell.

A method as in one or more of the preceding embodiments, wherein the set of parameters may include: any of an index of antenna ports, a value for an initialization sequence for reference signal generation, a transmission mode, and a scrambling identity for use with initializing a reference-signal sequence.

A method as in one or more of the preceding embodiments, wherein the scrambling identity may include: any of a scrambling identity configured using layers above a physical layer, an identity of the WTRU, a radio network temporary identifier (RNTI), an identity of the serving cell, and a carrier indicator field (CIF).

A method as in one or more of the preceding embodiments, wherein the information for signaling to the WTRU to receive a forthcoming downlink transmission may include: an explicit signal to the WTRU to receive the forthcoming downlink transmission.

A method as in one or more of the preceding embodiments, wherein the information for signaling to the WTRU to receive a forthcoming downlink transmission may include: an implicit signal to the WTRU to receive the forthcoming downlink transmission.

A method as in one or more of the preceding embodiments, wherein the information for signaling to the WTRU to receive a forthcoming downlink transmission may include: any of an explicit and implicit signal obtained by way of blind detection of a downlink control channel associated with the forthcoming downlink transmission.

A method as in one or more of the preceding embodiments, wherein the set of system parameters common to the Tx point and to the serving cell may include: a set of system parameters of the serving cell.

A method as in one or more of the preceding embodiments, wherein the downlink transmission is a joint transmission (JT) CoMP downlink transmission, and wherein receiving the downlink transmission may include: receiving first and second downlink transmissions from the Tx point and the serving cell, respectively.

A method as in one or more of the preceding embodiments, wherein the set of parameters for receiving the forthcoming downlink transmission may include: at least one parameter for use with descrambling the downlink transmission.

A method as in one or more of the preceding embodiments, wherein the at least one parameter for use with descrambling the downlink transmission may include: any of (i) an identifier common to the Tx point and to the serving cell, (ii) a timeslot index within a radio frame, and (iii) a RNTI of the WTRU.

A method as in one or more of the preceding embodiments, wherein the at least one parameter for use with descrambling the downlink transmission may include: any of (i) an identifier of the serving cell, (ii) a timeslot index within a radio frame, and (iii) a RNTI of the WTRU.

A method as in one or more of the preceding embodiments, wherein receiving a downlink transmission may include: descrambling the downlink transmission using a scrambling sequence generator initialized with an initialization sequence that is based on the at least one parameter for use with descrambling the downlink transmission.

A method as in one or more of the preceding embodiments, wherein the initialization sequence may include: any of (i) an identifier common to the Tx point and to the serving cell, (ii) a timeslot index within a radio frame, and (iii) a RNTI of the WTRU.

A method as in one or more of the preceding embodiments, wherein the initialization sequence may include: any of (i) an identifier of the serving cell, (ii) a timeslot index within a radio frame, and (iii) a RNTI of the WTRU.

A method as in one or more of the preceding embodiments, wherein the set of parameters for receiving the forthcoming downlink transmission may include: at least one parameter for use with determining an antenna port.

A method as in one or more of the preceding embodiments, wherein the set of parameters for receiving the forthcoming downlink transmission may include: at least one parameter for use with descrambling a reference-signal sequence for generating reference signals specific to the WTRU.

A method as in one or more of the preceding embodiments, wherein the at least one parameter for use with descrambling a reference-signal sequence may include: any of (i) an identifier common to the Tx point and to the serving cell, (ii) a slot number associated with the downlink transmission, and (iii) a scrambling identifier common to the Tx point and to the serving cell.

A method as in one or more of the preceding embodiments, wherein receiving a downlink transmission may include: determining the reference signals specific to the WTRU using a pseudorandom sequence generator initialized with an initialization sequence that is based on the at least one parameter for use with descrambling a reference-signal sequence.

A method as in one or more of the preceding embodiments, wherein the at least one parameter for use with descrambling a reference-signal sequence may include: any of (i) an identifier common to the Tx point and to the serving cell, (ii) a slot number associated with the downlink transmission, and (iii) a scrambling identifier common to Tx point and to the serving cell.

A method as in one or more of the preceding embodiments, wherein the at least one system parameter for use with descrambling a reference-signal sequence may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init} = (\lfloor n_{s\_common}/2 \rfloor + 1) \cdot (2N_{ID}^{common} + 1) \cdot 2^{16} + n_{SCID\_common}.$$

A method as in one or more of the preceding embodiments, wherein the at least one parameter for use with descrambling a reference-signal sequence may include: (i) an identifier of a CoMP cooperating set, $N_{ID}^{CoMP\ set}$; (ii) a slot number associated with the downlink transmission, $n_{SCID\_CoMP\ set}$; and (iii) a scrambling identifier of the CoMP cooperating set, $n_{SCID\_CoMP\ set}$, and wherein the initialization sequence may include:

$$c_{init} = (\lfloor n_{s\_CoMP\ set}/2 \rfloor + 1) \cdot (2N_{ID}^{CoMP\ set} + 1) \cdot 2^{16} + n_{SCID\_CoMP\ set}$$

A method as in one or more of the preceding embodiments, wherein the at least one system parameter for use with descrambling a reference-signal sequence may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$, and wherein the initialization sequence may include:

$$c_{init} = (\lfloor n_{s\_serving\ cell}/2 \rfloor + 1) \cdot (2N_{ID}^{serving\ cell} + 1) \cdot 2^{16} + n_{SCID\_serving\ cell}.$$

A method as in one or more of the preceding embodiments, wherein the set of parameters for receiving the forthcoming downlink transmission may include: at least one parameter for use with removing precoding of any of the downlink transmission and reference signals specific to the WTRU.

In an embodiment, a method may include receiving, at a WTRU, information for signaling to the WTRU to receive forthcoming downlink transmissions generated using a set of system parameters common to a serving cell of the WTRU and a Tx point other than the serving cell; and receiving first and second downlink transmissions at the WTRU from the Tx point and the serving cell, respectively.

A method as in one or more of the preceding embodiments, further including: receiving, at the WTRU, information for signaling to the WTRU to select a set of parameters for receiving the first and second downlink transmissions.

A method as in one or more of the preceding embodiments, wherein the information for signaling to the WTRU to receive the first and second downlink transmissions and the information for signaling to the WTRU to select a set of parameters for receiving the first and second downlink transmissions are the same information.

In an embodiment, a WTRU may include a receiver and a processor, wherein the receiver is adapted to receive information for signaling to the WTRU to receive a forthcoming downlink transmission generated using a set of system parameters common to a serving cell of the WTRU and a transmission (Tx) point other than the serving cell, and to receive the downlink transmission from the Tx point at the WTRU; and wherein the processor is adapted to instruct the receiver to receive the downlink transmission from the Tx.

A WTRU as in the preceding embodiment, wherein the receiver is further adapted to: receive information for signaling to the WTRU to select a set of parameters for receiving the forthcoming downlink transmission.

A WTRU as in one or more of the preceding embodiments, wherein the information for signaling to the WTRU to receive a forthcoming downlink transmission and the information for signaling to the WTRU to select a set of parameters for receiving the forthcoming downlink transmission is the same information.

A WTRU as in one or more of the preceding embodiments, wherein the processor is further adapted to use the information for signaling to the WTRU to receive a forthcoming downlink transmission as a signal to select, and instruct the WTRU to use, a set of parameters for receiving the forthcoming downlink transmission.

A WTRU as in one or more of the preceding embodiments, wherein the set of parameters for receiving the forthcoming downlink transmission correspond to the set of system parameters common to the Tx point and the serving cell.

A WTRU as in one or more of the preceding embodiments, wherein the set of parameters may include: any of an index of antenna ports, a value for an initialization sequence for reference signal generation, a transmission mode, and a scrambling identity for use with initializing a reference-signal sequence.

A WTRU as in one or more of the preceding embodiments, wherein the scrambling identity may include: any of a scrambling identity configured using layers above a physical layer, an identity of the WTRU, a radio network temporary identifier (RNTI), an identity of the serving cell, and a carrier indicator field (CIF).

A WTRU as in one or more of the preceding embodiments, wherein the information for signaling to the WTRU to receive a forthcoming downlink transmission may include: an explicit signal to the WTRU to receive the forthcoming downlink transmission.

A WTRU as in one or more of the preceding embodiments, wherein the information for signaling to the WTRU to receive a forthcoming downlink transmission may include: an implicit signal to the WTRU to receive the forthcoming downlink transmission.

A WTRU as in one or more of the preceding embodiments, wherein the information for signaling to the WTRU to receive a forthcoming downlink transmission may include: any of an explicit and implicit signal obtained by way of blind detection of a downlink control channel associated with the forthcoming downlink transmission.

A WTRU as in one or more of the preceding embodiments, wherein the set of system parameters common to the Tx point and to the serving cell may include: a set of system parameters of the serving cell.

A WTRU as in one or more of the preceding embodiments, wherein the downlink transmission is a joint transmission (JT) CoMP downlink transmission, and wherein the receiver is further adapted to receive first and second downlink transmissions from the Tx point and the serving cell, respectively.

In an embodiment, a method may include generating, at a Tx point other than a serving cell of a WTRU, a first set of reference signals specific to the WTRU based on a reference-signal sequence common to the Tx point and to the serving cell, wherein the first set of reference signals specific to the WTRU are associated with a first downlink transmission forthcoming from the Tx point; generating, at the serving cell, a second set of reference signals specific to the WTRU based on the reference-signal sequence common to the Tx point and to the serving cell, wherein the second set of reference signals specific to the WTRU are associated with a second downlink transmission forthcoming from the serving cell; and transmitting the first and second sets of reference signals specific to the WTRU using the same set of antenna ports.

A method as in the preceding embodiment, further including: transmitting information for signaling to the WTRU to use the same set of antenna ports for the first and second sets of reference signals specific to the WTRU.

A method as in one or more of the preceding embodiments, further including: configuring the Tx point and the serving cell to use (i) the reference-signal sequence common to the Tx point and the serving cell for generating the first and second sets of reference signals specific to the WTRU, respectively; and (ii) the same set of antenna ports for transmitting the first and second sets of reference signals specific to the WTRU.

A method as in one or more of the preceding embodiments, wherein generating the first and second sets of reference signals specific to the WTRU may include: generating each of the first and second sets of reference signals specific to the WTRU using a pseudorandom sequence generator initialized with an initialization sequence that is based on a set of system parameters common to the Tx point and the serving cell.

A method as in one or more of the preceding embodiments, wherein the set of system parameters common to the Tx point and the serving cell may include: any of (i) an identifier common to the Tx point and to the serving cell, (ii) a slot number in which the first and second sets of reference signals, and (iii) a scrambling identifier common to Tx point and to the serving cell.

A method as in one or more of the preceding embodiments, wherein the first and second downlink transmission forthcoming from the Tx point and the service cell, respectively, are Joint Transmission (JT) Coordinated Multi-Point (CoMP) transmissions to the WTRU, and wherein the set of system parameters common to the Tx point and the serving cell may include: any of (i) an identifier common to the Tx point and to the serving cell, (ii) a slot number associated with the first and second downlink transmissions, and (iii) a scrambling identifier common to Tx point and to the serving cell.

A method as in one or more of the preceding embodiments, wherein the set of system parameters common to the Tx point and the serving cell may include: any of (i) an identifier of the serving cell, and (ii) a scrambling identifier of the serving cell.

A method as in one or more of the preceding embodiments, wherein the first and second downlink transmission forthcoming from the Tx point and the service cell, respectively, are JT CoMP transmissions to the WTRU, and wherein the set of system parameters common to the Tx point and the serving cell may include: any of (i) an identifier of the serving cell, (ii) a slot number associated with the first and second downlink transmissions, and (iii) a scrambling identifier of the serving cell.

A method as in one or more of the preceding embodiments, wherein the set of system parameters common to the Tx point and the serving cell may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init} = (\lfloor n_{s\_common}/2 \rfloor + 1) \cdot (2N_{ID}^{common} + 1) \cdot 2^{16} + n_{SCID\_common}.$$

A method as in one or more of the preceding embodiments, further including: configuring a CoMP cooperating set including the Tx point and the serving cell, wherein the set of system parameters common to the Tx point and the serving cell may include: (i) an identifier of the CoMP cooperating set, $N_{ID}^{CoMP\ set}$; (ii) a slot number associated with the downlink transmission, $n_{s\_CoMP\ set}$; and (iii) a scrambling identifier of the CoMP cooperating set, $n_{SCID\_CoMP\ set}$, and wherein the initialization sequence may include:

$$c_{init}=(\lfloor n_{s\_CoMP\ set}/2\rfloor+1)\cdot(2N_{ID}^{CoMP\ set}+1)\cdot 2^{16}+n_{SCID\_CoMP\ set}$$

A method as in one or more of the preceding embodiments, wherein the set of system parameters common to the Tx point and the serving cell may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$, and wherein the initialization sequence may include:

$$c_{init}=(\lfloor n_{s\_serving\ cell}/2\rfloor+1)\cdot(2N_{ID}^{serving\ cell}+1)\cdot 2^{16}+n_{SCID\_serving\ cell}.$$

In an embodiment, a method may include generating, at a Tx point other than a serving cell of a WTRU, reference signals specific to the WTRU based, at least in part, on a reference-signal sequence common to the Tx point and to the serving cell and on first and second sets of antenna ports assigned to the Tx point and the serving cell, respectively, wherein the reference signals specific to the WTRU are for an; and transmitting reference signals specific to the WTRU.

A method as in the preceding embodiment, wherein the first set of antenna ports is orthogonal to the second set of antenna ports.

A method as in one or more of the preceding embodiments, wherein first and second sets of antenna ports assigned to the Tx point and the serving cell, respectively, are based on a default pattern.

A method as in one or more of the preceding embodiments, further including: configuring the Tx point with the reference-signal sequence common to the Tx point and the serving cell and on antenna ports common to the Tx point and to the serving cell.

A method as in one or more of the preceding embodiments, wherein generating reference signals specific to the WTRU may include: generating, at the Tx point, the reference signals specific to the WTRU using a pseudorandom sequence generator initialized with an initialization sequence that is based on a set of system parameters common to the Tx point and the serving cell.

A method as in one or more of the preceding embodiments, wherein the set of system parameters common to the Tx point and the serving cell may include: any of (i) an identifier common to the Tx point and to the serving cell, (ii) a slot number associated with a downlink transmission, and (iii) a scrambling identifier common to Tx point and to the serving cell.

A method as in one or more of the preceding embodiments, wherein the set of system parameters common to the Tx point and the serving cell may include: any of (i) an identifier of the serving cell, (ii) a slot number associated with a downlink transmission, and (iii) a scrambling identifier of the serving cell.

A method as in one or more of the preceding embodiments, wherein the set of system parameters common to the Tx point and the serving cell may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init}=(\lfloor n_{s\_common}/2\rfloor+1)\cdot(2N_{ID}^{common}+1)\cdot 2^{16}+n_{SCID\_common}.$$

A method as in one or more of the preceding embodiments, further including: configuring a CoMP cooperating set including the Tx point and the serving cell, wherein the set of system parameters common to the Tx point and the serving cell may include: (i) an identifier of the CoMP cooperating set, $N_{ID}^{CoMP\ set}$; (ii) a slot number associated with the downlink transmission, $n_{s\_CoMP\ set}$; and (iii) a scrambling identifier of the CoMP cooperating set, $n_{SCID\_CoMP\ set}$ and wherein the initialization sequence may include:

$$c_{init}=(\lfloor n_{s\_CoMP\ set}/2\rfloor+1)\cdot(2N_{ID}^{CoMP\ set}+1)\cdot 2^{16}+n_{SCID\_CoMP\ set}$$

A method as in one or more of the preceding embodiments, wherein the set of system parameters common to the Tx point and the serving cell may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$ and wherein the initialization sequence may include:

$$c_{init}=(\lfloor n_{s\_serving\ cell}/2\rfloor+1)\cdot(2N_{ID}^{serving\ cell}+1)\cdot 2^{16}+n_{SCID\_serving\ cell}.$$

In an embodiment, a method may include generating, at a Tx point other than a serving cell of a WTRU, reference signals specific to the WTRU based, at least in part, on a reference-signal sequence common to the Tx point and to the serving cell and on first and second sets of antenna ports assigned to the Tx point and the serving cell, respectively; and transmitting reference signals specific to the WTRU.

A method as in the preceding embodiment, wherein the first set of antenna ports is orthogonal to the second set of antenna ports.

A method as in one or more of the preceding embodiments, wherein first and second sets of antenna ports assigned to the Tx point and the serving cell, respectively, are based on a default pattern.

A method as in one or more of the preceding embodiments, further including: configuring the Tx point with the reference-signal sequence common to the Tx point and the serving cell and on antenna ports common to the Tx point and to the serving cell.

A method as in one or more of the preceding embodiments, wherein generating reference signals specific to the WTRU may include: generating, at the Tx point, the reference signals specific to the WTRU using a pseudorandom sequence generator initialized with an initialization sequence that is based on a set of system parameters common to the Tx point and the serving cell.

A method as in one or more of the preceding embodiments, wherein the set of system parameters common to the Tx point and the serving cell may include: any of (i) an identifier common to the Tx point and to the serving cell, (ii) a slot number associated with a downlink transmission, and (iii) a scrambling identifier common to Tx point and to the serving cell.

A method as in one or more of the preceding embodiments, wherein the set of system parameters common to the Tx point and the serving cell may include: any of (i) an identifier of the serving cell, (ii) a slot number associated with a downlink transmission, and (iii) a scrambling identifier of the serving cell.

A method as in one or more of the preceding embodiments, wherein the set of system parameters common to the Tx point and the serving cell may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init}=(\lfloor n_{s\_common}/2 \rfloor+1)\cdot(2N_{ID}^{common}+1)\cdot 2^{16}+n_{SCID\_common}.$$

A method as in one or more of the preceding embodiments, further including: configuring a CoMP cooperating set including the Tx point and the serving cell, wherein the set of system parameters common to the Tx point and the serving cell may include: (i) an identifier of the CoMP cooperating set, $N_{ID}^{CoMP\ set}$; ii) a slot number associated with the downlink transmission, $n_{s\_CoMP\ set}$; and (iii) a scrambling identifier of the CoMP cooperating set, $n_{SCID\_CoMP\ set}$, and wherein the initialization sequence may include:

$$c_{init}=(\lfloor n_{s\_CoMP\ set}/2 \rfloor+1)\cdot(2N_{ID}^{CoMP\ set}+1)\cdot 2^{16}+n_{SCID\_CoMP\ set}.$$

A method as in one or more of the preceding embodiments, wherein the set of system parameters a cell; common to the Tx point and the serving cell may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$, and wherein the initialization sequence may include:

$$c_{init}=(\lfloor n_{s\_serving\ cell}/2 \rfloor+1)\cdot(2N_{ID}^{serving\ cell}+1)\cdot 2^{16}+n_{SCID\_serving\ cell}.$$

In an embodiment, a method may include generating a downlink transmission, at a Tx point other than a serving cell of a WTRU, using a set of system parameters common to the Tx point and to the serving cell; transmitting, from the serving cell, information for signaling to the WTRU to receive the downlink transmission; and transmitting the downlink transmission from the Tx point to the WTRU.

A method as in the preceding embodiment, further including: transmitting information for signaling to the WTRU to select a set of parameters for receiving the downlink transmission.

A method as in one or more of the preceding embodiments, wherein the information for signaling to the WTRU to receive the downlink transmission and the information for signaling to the WTRU to select a set of parameters for receiving the downlink transmission are the same information.

In an embodiment, a method may include generating a first downlink transmission, at a transmission (Tx) point other than a serving cell of a wireless transmit and/or receive unit (WTRU), using a set of system parameters common to the Tx point and to the serving cell; generating, at the serving cell, a second downlink transmission using the set of system parameters common to the Tx point and to the serving cell; transmitting, from the serving cell, information for signaling to the WTRU to receive the first and second downlink transmissions; and transmitting, to the WTRU, the first and second downlink transmissions from the Tx point and the serving cell, respectively.

A method as in the preceding embodiment, further including: transmitting information for signaling to the WTRU to select a set of parameters for receiving the first and second downlink transmissions.

A method as in one or more of the preceding embodiments, wherein the information for signaling to the WTRU to receive the first and second downlink transmissions and the information for signaling to the WTRU to select a set of parameters for receiving the first and second downlink transmissions are the same information.

A method as in one or more of the preceding embodiments receiving, at a WTRU, a downlink transmission from a Tx point other than a serving cell of the WTRU; and decoding the downlink transmission using WTRU-specific reference signals that are based, at least in part, on a set of system parameters common to the Tx point and to the serving cell.

A method as in the preceding embodiment, wherein the set of parameters for receiving the forthcoming downlink transmission may include: at least one parameter for use with descrambling a reference-signal sequence for generating reference signals specific to the WTRU.

A method as in one or more of the preceding embodiments, wherein the at least one parameter for use with descrambling a reference-signal sequence may include: any of (i) an identifier common to the Tx point and to the serving cell, (ii) a slot number associated with the downlink transmission, and (iii) a scrambling identifier common to the Tx point and to the serving cell.

A method as in one or more of the preceding embodiments, wherein receiving a downlink transmission may include: determining the reference signals specific to the WTRU using a pseudorandom sequence generator initialized with an initialization sequence that is based on the at least one parameter for use with descrambling a reference-signal sequence.

A method as in one or more of the preceding embodiments, wherein the at least one parameter for use with descrambling a reference-signal sequence may include: any of (i) an identifier common to the Tx point and to the serving cell, (ii) a slot number associated with the downlink transmission, and (iii) a scrambling identifier common to Tx point and to the serving cell.

A method as in one or more of the preceding embodiments, wherein the at least one system parameter for use with descrambling a reference-signal sequence may include: (i) an identifier common to the Tx point and to the serving cell, $N_{ID}^{common}$; (ii) a slot number associated with the downlink transmission, $n_{s\_common}$; and (iii) a scrambling identifier common to the Tx point and to the serving cell, $n_{SCID\_common}$, and wherein the initialization sequence may include:

$$c_{init}=(\lfloor n_{s\_common}/2 \rfloor+1)\cdot(2N_{ID}^{common}+1)\cdot 2^{16}+n_{SCID\_common}.$$

A method as in one or more of the preceding embodiments, wherein the at least one parameter for use with descrambling a reference-signal sequence may include: (i) an identifier of a CoMP cooperating set, $N_{ID}^{CoMP\ set}$; (ii) a slot number associated with the downlink transmission, $n_{s\_CoMP\ set}$; and (iii) a scrambling identifier of the CoMP cooperating set, $n_{SCID\_CoMP\ set}$, and wherein the initialization sequence may include:

$$c_{init}=(\lfloor n_{s\_CoMP\ set}/2 \rfloor+1)\cdot(2N_{ID}^{CoMP\ set}+1)\cdot 2^{16}+n_{SCID\_CoMP\ set}.$$

A method as in one or more of the preceding embodiments, wherein the at least one system parameter for use with descrambling a reference-signal sequence may include: (i) an identifier of the serving cell, $N_{ID}^{serving\ cell}$; (ii) a slot number associated with the downlink transmission, $n_{s\_serving\ cell}$; and (iii) a scrambling identifier of the serving cell, $n_{SCID\_serving\ cell}$, and wherein the initialization sequence may include:

$$c_{init}=(\lfloor n_{s\_serving\ cell}/2 \rfloor+1)\cdot(2N_{ID}^{serving\ cell}+1)\cdot 2^{16}+n_{SCID\_serving\ cell}.$$

A method as in one or more of the preceding embodiments, wherein the set of parameters for receiving the forthcoming downlink transmission may include: at least one parameter for use with removing precoding of any of the downlink transmission and reference signals specific to the WTRU.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit (CPU) and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method implemented in a wireless transmit/receive unit (WTRU), the method comprising:
   receiving radio resource control (RRC) signaling including multiple sets of reception parameters, wherein each set of the multiple sets of reception parameters comprises information referring to a set of downlink reference signals for use in connection with decoding a physical downlink shared channel (PDSCH);
   receiving signaling for activating a subset of the multiple sets of reception parameters;
   activating the subset of the multiple sets of reception parameters based on the signaling;
   receiving, on a downlink control channel, downlink control information associated with a PDSCH;
   selecting one set of the activated subset based on information indicated by the downlink control information;
   determining a downlink reference signal to use in connection with decoding the PDSCH using the information from the selected set; and
   decoding the PDSCH based on the determined downlink reference signal.

2. The method of claim 1, wherein each set of the multiple sets of reception parameters comprises: any of an index of antenna ports, a value for an initialization sequence for reference-signal generation, a transmission mode, and identifiers for use with initializing a reference-signal sequence.

3. A wireless transmit and/or receiver unit (WTRU) comprising circuitry, including a receiver and processor, configured to:
   receive radio resource control (RRC) signaling including multiple sets of reception parameters, wherein each set of the multiple sets of reception parameters comprises information referring to a set of downlink reference signals for use in connection with decoding a physical downlink shared channel (PDSCH)
   receive signaling for activating a subset of the multiple sets of reception parameters;
   activate the subset of the multiple sets of reception parameters based on the signaling;

receive, on a downlink control channel, downlink control information associated with a PDSCH;

select one set of the activated subset based on information indicated by the downlink control information;

determine a downlink reference signal to use in connection with decoding the PDSCH using the information from the selected set; and decode the PDSCH based on the determined downlink reference signal.

4. The WTRU of claim 3, wherein each of the multiple sets of reception parameters comprises: any of an index of antenna ports, a value for an initialization sequence for reference-signal generation, a transmission mode, and identifiers for use with initializing a reference-signal sequence.

5. The method of claim 1, further comprising:

prior to receiving the signaling for activating a subset of the multiple sets of reception parameters:

receiving, on a second downlink control channel, a second downlink control information associated with a second PDSCH;

selecting one of the multiple sets of reception parameters based on the second downlink control information;

determining a second downlink reference signal to use in connection with decoding the second PDSCH using the information from the selected set; and decoding the second PDSCH based on the determined reference signals.

6. The method of claim 1, wherein the multiple sets of reception parameters comprise a default set of reception parameters, and the method further comprises:

prior to receiving the signaling for activating a subset of the multiple sets of reception parameters:

determining a second downlink reference signal to use in connection with decoding a second PDSCH based on the default set; and decoding the second PDSCH based on the second downlink reference signal.

7. The method of claim 1, wherein the signaling for activating a subset of the multiple sets of reception parameters comprises a medium access control (MAC) control element (CE) including information for activating the subset of the multiple sets of reception parameters.

8. The method of claim 7, wherein the information for activating a subset of the multiple sets of reception parameters is a bitmap.

9. The method of claim 1, wherein the information indicated by the downlink control information is multiple bits.

10. The method of claim 1, wherein the information indicated by the downlink control information comprises an explicit indication indicating which one of the activated subset to select.

11. The method of claim 1, wherein selecting one set of the activated subset is further based on a timing offset between reception of the downlink control information and reception of the PDSCH.

12. The WTRU of claim 3, wherein the circuitry is configured to:

prior to receiving the signaling for activating a subset of the multiple sets of reception parameters:

receive, on a second downlink control channel, a second downlink control information associated with a second PDSCH;

select one of the multiple sets of reception parameters based on the second downlink control information;

determine a second downlink reference signal to use in connection with decoding the second PDSCH using the information from the selected set; and decode the second PDSCH based on the determined reference signals.

13. The WTRU of claim 3, wherein the multiple sets of reception parameters comprises a default set of reception parameters, and wherein the circuitry is configured to:

prior to receiving the signaling for activating a subset of the multiple sets of reception parameters:

determine a second downlink reference signal to use in connection with decoding a second PDSCH based on the default set; and decode the second PDSCH based on the second downlink reference signal.

14. The WTRU of claim 3, wherein the signaling for activating a subset of the multiple sets of reception parameters comprises a medium access control (MAC) control element (CE) including information for activating the subset of the multiple sets of reception parameters.

15. The WTRU of claim 14, wherein the information for activating a subset of the multiple sets of reception parameters is a bitmap.

16. The WTRU of claim 3, wherein the information indicated by the downlink control information is multiple bits.

17. The WTRU of claim 3, wherein the information indicated by the downlink control information comprises an explicit indication indicating which one of the activated subset to select.

18. The WTRU of claim 3, wherein the circuitry is configured to select one set of the activated subset based on the information indicated by the downlink control information and a timing offset between reception of the downlink control information and reception of the PDSCH.

* * * * *

UNITED STATES PATENT AND TRADEMARK OFFICE
CERTIFICATE OF CORRECTION

Page 1 of 2

PATENT NO.         : 10,701,678 B2
APPLICATION NO.    : 15/864667
DATED              : June 30, 2020
INVENTOR(S)        : Guodong Zhang et al.

It is certified that error appears in the above-identified patent and that said Letters Patent is hereby corrected as shown below:

In the Specification

At Column 2, Line 34, delete "the" and insert --that--
At Column 3, Line 26, delete "transmission;" and insert --transmission.--
At Column 7, Line 58, delete "Tub;" and insert --Iub.--
At Column 10, Line 16, delete "may" and insert --may be--
At Column 13, Line 5, delete "mod 2" and insert --mod 2,--
At Column 13, Line 15, delete "$n_{SCID}$" and insert --$n_{SCID}$,--
At Column 15, Line 8, delete "$W^{(L)}$" and insert --$M^{(L)}$--
At Column 17, Line 24, delete "Corresponds" and insert --corresponds--
At Column 17, Lines 26-27, delete "Correspond" and insert --correspond--
At Column 18, Line 28, delete "YD." and insert --$Y_{ID}$.--
At Column 19, Line 6, delete "$N_{ID}^{serving\ cell}$" and insert --$N_{ID}^{serving\ cell}$--
At Column 19, Line 17, delete "(12)" and insert --(14)--
At Column 19, Line 24, delete "may" and insert --may also--
At Column 28, Line 32, delete "index):" and insert --index).--
At Column 31, Line 27, delete "time slot" and insert --timeslot--
At Column 34, Line 55, delete "PDSCH" and insert --PDSCH.--
At Column 35, Line 59, delete "(below)" and insert --(below).--
At Column 41, Line 32, delete "$W_{p,k+\Delta k}^{(m)} \cong W_{p,k}^{(m)}$," and insert --$H_{p,k+\Delta k}^{(m)} \cong H_{p,k}^{(m)}$,--
At Column 41, Line 55, delete "$W_{p,k+\Delta k}^{(m)} \cong W_{p,k}^{(m)}$" and insert --$H_{p,k+\Delta k}^{(m)} \cong H_{p,k}^{(m)}$--
At Column 47, Line 37, delete "the a" and insert --the--
At Column 50, Line 15, delete "the a" and insert --the--
At Column 50, Line 66, delete "the a" and insert --the--
At Column 56, Line 65, delete "$n_{SCID\_CoMP\ set}$;" and insert --$n_{S\_CoMP\ set}$;--
At Column 57, Line 27, delete "Txpoint" and insert --Tx point--
At Column 57, Line 34, delete "\"
At Column 64, Line 19, delete "$n_{SCID\_serving\ cell}$" and insert --$n_{SCID\_serving\ cell}$,--
At Column 65, Line 11, delete "ii)" and insert --(ii)--

Signed and Sealed this
Twentieth Day of August, 2024

Katherine Kelly Vidal
*Director of the United States Patent and Trademark Office*

CERTIFICATE OF CORRECTION (continued)
U.S. Pat. No. 10,701,678 B2

At Column 65, Line 20, delete "parameters a cell;" and insert --parameters--
At Column 68, Lines 15-16, delete "of" multiples of" and insert --"of multiples of"--